United States Patent
Kasper et al.

(10) Patent No.: US 10,549,739 B2
(45) Date of Patent: Feb. 4, 2020

(54) TOWING VEHICLE CONTROLLER USING TRAILER BRAKING STRATEGY AND TRAILER BRAKING CONTROL METHOD

(71) Applicant: Bendix Commercial Vehicle Systems LLC, Elyria, OH (US)

(72) Inventors: Phillip J. Kasper, Elyria, OH (US); Andrew J. Pilkington, Avon Lake, OH (US); Subashish Sasmal, Elyria, OH (US); Jeffrey M. Carbaugh, Avoh Lake, OH (US); Timothy Carritte, Avon Lake, OH (US); Nicholas A. Broyles, Elyria, OH (US); Michael D. Tober, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/045,169

(22) Filed: Jul. 25, 2018

(65) Prior Publication Data
US 2019/0084540 A1   Mar. 21, 2019

Related U.S. Application Data

(63) Continuation-in-part of application No. 15/706,404, filed on Sep. 15, 2017, now Pat. No. 10,493,965, and (Continued)

(51) Int. Cl.
*B60T 8/72* (2006.01)
*B60T 8/32* (2006.01)
(Continued)

(52) U.S. Cl.
CPC .............. *B60T 8/72* (2013.01); *B60T 8/1701* (2013.01); *B60T 8/176* (2013.01); *B60T 8/1761* (2013.01);
(Continued)

(58) Field of Classification Search
CPC ...... B60T 8/72; B60T 8/1701; B60T 8/17558; B60T 8/176; B60T 8/1761; B60T 8/321;
(Continued)

(56) References Cited

U.S. PATENT DOCUMENTS

| | | |
|---|---|---|
| 3,168,352 A | 2/1965 | Stelzer |
| 3,237,994 A | 3/1966 | Brandon |

(Continued)

FOREIGN PATENT DOCUMENTS

| | | |
|---|---|---|
| DE | 199 64 164 A1 | 7/2001 |
| DE | 10114673 A1 | 10/2002 |

(Continued)

OTHER PUBLICATIONS

Non-Final Office Action for related U.S. Appl. No. 15/706452, dated Aug. 21, 2019.

(Continued)

*Primary Examiner* — Behrang Badii
*Assistant Examiner* — Daniel L Greene
(74) *Attorney, Agent, or Firm* — Tucker Ellis LLP

(57) ABSTRACT

A braking controller and method in a towing vehicle towing one or more towed vehicles as a combination vehicle provides brake control of the one or more towed vehicles based on a level of braking force applied to the towing vehicle. A non-enhanced braking mode applies a first level of braking force to the towed vehicles in a predetermined reduced proportion relative to the level of braking force applied to the towing vehicle, and an enhanced braking mode applies a second level of braking force to the towed vehicles greater than the first level of braking force. A controller deceleration command input receives a deceleration command signal which is compared against predetermined threshold deceleration rate value or against a current deceleration value being executed by the combination (Continued)

vehicle and, based on a result of the comparisons, either the enhanced or the non-enhanced braking modes are implemented by the controller.

54 Claims, 14 Drawing Sheets

Related U.S. Application Data a continuation-in-part of application No. 15/706,432, filed on Sep. 15, 2017.

(51) Int. Cl.

| | | |
|---|---|---|
| *G08G 1/00* | (2006.01) | |
| *B60T 8/17* | (2006.01) | |
| *B60T 8/176* | (2006.01) | |
| *B60T 8/1755* | (2006.01) | |
| *B60T 8/1761* | (2006.01) | |

(52) U.S. Cl.
CPC .......... *B60T 8/17558* (2013.01); *B60T 8/321* (2013.01); *G08G 1/22* (2013.01); *B60T 2210/20* (2013.01); *B60T 2250/00* (2013.01); *B60T 2250/02* (2013.01); *B60T 2250/03* (2013.01); *B60T 2250/04* (2013.01); *B60T 2270/10* (2013.01); *B60T 2270/30* (2013.01)

(58) Field of Classification Search
CPC ............ B60T 2210/20; B60T 2250/00; B60T 2250/02; B60T 2250/03; B60T 2250/04; B60T 2270/10; B60T 2270/30; G08G 1/22

See application file for complete search history.

(56) References Cited

U.S. PATENT DOCUMENTS

| | | | | |
|---|---|---|---|---|
| 4,180,223 A * | 12/1979 | Amberg | ................ | B60T 8/1703 244/111 |
| 4,804,237 A | 2/1989 | Gee | | |
| 5,409,301 A | 4/1995 | Topfer | | |
| 5,920,128 A | 7/1999 | Hines | | |
| 5,986,544 A | 11/1999 | Kaisers | | |
| 6,068,352 A | 5/2000 | Kulkarni | | |
| 6,545,593 B2 | 4/2003 | DeWilde | | |
| 7,124,003 B1 | 10/2006 | West | | |
| 7,301,479 B2 | 11/2007 | Regan | | |
| 8,874,346 B2 * | 10/2014 | Kontz | ................... | B60T 8/1755 701/30.1 |
| 9,290,203 B2 | 3/2016 | Lavoie | | |
| 9,632,507 B1 | 4/2017 | Korn | | |
| 9,738,125 B1 | 8/2017 | Brickley | | |
| 2001/0056544 A1 | 12/2001 | Walker | | |
| 2002/0095251 A1 | 7/2002 | Oh | | |
| 2002/0147538 A1 | 10/2002 | Marra | | |
| 2005/0278098 A1 | 12/2005 | Breed | | |
| 2006/0214506 A1 * | 9/2006 | Albright | ................... | B60T 7/20 303/123 |
| 2007/0260384 A1 | 11/2007 | Romanchok | | |
| 2010/0222979 A1 | 9/2010 | Culbert | | |
| 2013/0085649 A1 | 4/2013 | Matoy et al. | | |
| 2013/0124059 A1 * | 5/2013 | Funder | ..................... | B60D 1/30 701/70 |
| 2013/0151088 A1 | 6/2013 | Ricci | | |
| 2014/0226010 A1 | 8/2014 | Molin et al. | | |
| 2016/0114772 A1 | 4/2016 | Vietor | | |
| 2016/0357188 A1 | 12/2016 | Ansari | | |
| 2017/0235307 A1 | 8/2017 | Asakura | | |
| 2018/0154874 A1 | 6/2018 | Kulkarni | | |
| 2018/0186381 A1 | 7/2018 | Erlien | | |
| 2018/0190119 A1 | 7/2018 | Miller | | |
| 2018/0210463 A1 | 7/2018 | Switkes | | |

FOREIGN PATENT DOCUMENTS

| | | |
|---|---|---|
| JP | H0463751 A | 2/1992 |
| JP | H0463759 A | 2/1992 |
| JP | H07257345 A | 10/1995 |
| JP | H09249047 A | 9/1997 |
| WO | 03022650 A1 | 3/2003 |

OTHER PUBLICATIONS

International Search Report and Written Opinion from correlating International Application No. PCT/US2018/050967, dated Jan. 18, 2019; 13 pages.
International Search Report and Written Opinion from correlating International Application No. PCT/US2018/050964, dated Jan. 18, 2019; 13 pages.
U.S. Office Action from corresponding U.S. Appl. No. 15/706,404, dated Mar. 22, 2019, 47 pages.
Notice of allowance for related U.S. Appl. No. 16/045,490, dated Sep. 18, 2019.
Notice of allowance for related U.S. Appl. No. 15/706,404, dated Jul. 11, 2019.
International Search Report and Written Opinion for related international application No. PCT/US2019/043277, dated Nov. 4, 2019. 12 pages.
International Search Report and Written Opinion for related international application No. PCT/US2019/043285, dated Nov. 4, 2019. 13 pages.

* cited by examiner

TOWING VEHICLE CONTROLLER USING TRAILER BRAKING STRATEGY AND TRAILER BRAKING CONTROL METHOD

CROSS REFERENCE TO RELATED APPLICATIONS

This application is a continuation-in-part of U.S. application Ser. No. 15/706,404, filed Sep. 15, 2017, entitled: BRAKING CONTROLLER AND METHOD USING VERIFICATION OF REPORTED TRAILER CAPABILITIES; and a continuation-in-part of U.S. application Ser. No. 15/706,432, filed Sep. 15, 2017, entitled: BRAKING CONTROLLER AND METHOD USING VERIFICATION OF REPORTED TRAILER CAPABILITIES, the contents of each of these applications being incorporated herein by reference in their entirety.

TECHNICAL FIELD

The embodiments herein relate generally to highway vehicle brake control. More specifically, particular embodiments relate to braking control devices and methods for use in a vehicle towing one or more associated towed vehicles as an combination vehicle for providing brake control enhancement to the one or more towed vehicles relative to a level of braking applied to the towing vehicle.

BACKGROUND

It is known that two or more vehicles moving along a roadway can cooperate as a road train or a "platoon" for mutually providing various efficiency benefits to the vehicles within the platoon. A typical vehicle platoon includes a leader vehicle and one or more follower vehicles arranged serially along a single roadway lane. Larger platoons can involve many follower vehicles for spanning multiple lanes thereby providing enhanced efficiency to more vehicles. However, ensuring the safety of both the platooned vehicles as well as of the other non-platooning vehicles on the roadway usually dictates the short single lane platoon incarnation.

The aerodynamic geometry of a group of vehicles arranged in a platoon provides wind resistance loss benefits superior to the aggregated individual wind resistance losses of the vehicles when travelling separately. A maximum aerodynamic benefit and resultant fuel savings is realized by the vehicles maintaining a small inter-vehicle distance or spacing in terms of reduced energy consumption. However, holding a tight head-to-tail distance or spacing between platooned vehicles requires that careful attention be paid to various functional or environmental and operational characteristics and capabilities of the vehicles and other external conditions including for example the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platooning vehicles follow each other on the roadway in close proximity to each other and often at highway speeds as explained above, and for this they typically use a Radar to control the inter-vehicle distance(s). For emergency braking situations such as Autonomous Emergency Braking (AEB) events for example, forward-directed cameras and/or other sensor(s) on a following vehicle may detect the actuation by a forward vehicle of a rearward facing brake light so that appropriate emergency stopping or other actions can suitably be initiated.

Platoons that operate on public roadways, however, sometimes encounter conditions that require more complicated platoon arrangements and brake monitoring and platooning control and maintenance operations. The close distance between the platooning vehicles poses a risk when the lead vehicle has to decelerate in an emergency situation such as might be required by stopping forward traffic. Therefore in the interest of protecting the platooning vehicles from inadvertent collision with each other, a particular platoon order or arrangement has been devised. More particularly, many platoons are ordered so that the platoon vehicle that is least capable of deceleration is placed at the front of the platoon. This helps to mitigate the chance that the one or more platoon follower vehicles will be unable to adequately decelerate in order to avoid a collision with the platoon leader vehicle. In this platoon topology, the platooning vehicle having the lightest or least braking capabilities or parameters is located at the front of the platoon chain, the vehicle having the highest braking capabilities or parameters is located at the back or rear of the platoon chain, and any one or more intermediate vehicles are arranged from front to back in an order of increasing braking capabilities or parameters. This platoon topology also gives each rearward or following vehicle more time gap for braking in turn relative to the next immediately forward or leading vehicle.

In roadway vehicles, however, braking efficiency is affected by many factors such as brake temperature, brake type, burnishing, vehicle weight, number of tires, tire wear, vehicle loading, road surface type and weather conditions. In addition, the braking efficiency of any vehicle can also change over time, and also can change differently for each vehicle. One or more changes in braking capabilities and any other braking performance characteristics of a first vehicle of a set of platooning vehicles does not necessarily imply that any of the other vehicles of the set of platooning vehicles are experiencing the same one or more changes. That is, one or more changes in braking capabilities of any single vehicle in a platoon cannot reliably be imputed any of the other vehicles of the platoon. This makes management of inter-vehicle gap distances between the platooning vehicles dynamic and therefore more difficult.

Currently towing vehicle safety systems use a "non-enhanced" braking mode when the braking capabilities of the one or more towed vehicles is indeterminate. The non-enhanced braking mode pulses the braking signal from the towing vehicle to the one or more towed vehicles in order to prevent potential instability if the towed unit (or units) does not have functional ABS. The non-enhanced braking mode applies a first level of braking force to the one or more towed vehicles in a predetermined reduced proportion relative to the level of braking force applied to the towing vehicle. This may present a problem for vehicle platooning because sometimes it might be necessary and/or desirable for a following vehicle to apply more braking force to the one or more towed vehicles than the first level of braking force would allow or otherwise permit. This situation could result in potentially less deceleration on the following vehicle which could lead to a collision between the two vehicles.

Given the above, therefore, it will be helpful to provide a system and method to enhance the trailer braking on the following vehicle without the need to know the trailer ABS state, while still minimizing risks.

It would further also be desirable to dynamically adapt the trailer braking strategy for platooning to account for various vehicle and environmental characteristics and performance to maximize equipment value and to enhance the safety of the platooning as well as the non-platooning vehicles.

It would further be desirable to provide a system and method to selectively enhance the braking of the one or more towed vehicles to effect an "enhanced" braking mode, even when the braking capabilities of the one or more towed vehicles is indeterminate, whenever there is a need for braking above a level of braking available in the non-enhanced mode of operation.

It would further be desirable to provide a system and method to selectively enhance the braking of the one or more towed vehicles to effect the enhanced braking mode in response to a deceleration command input having a deceleration command value that is greater than a predetermined threshold deceleration value that is available for operating the combination vehicle in the non-enhanced braking mode.

It would further be desirable to provide a system and method to selectively enhance the braking of the one or more towed vehicles to effect the enhanced braking mode in response to a deceleration command input derived from an operator of the towing vehicle having a deceleration command value that is greater than a predetermined threshold deceleration value that is available for operating the combination vehicle in the non-enhanced braking mode.

It would further be desirable to provide a system and method to selectively enhance the braking of the one or more towed vehicles to effect the enhanced braking mode in response to a deceleration command input derived from a sensor fitted to the towing vehicle for sensing a distance and/or closing between the towing vehicle and one or more forward vehicles, the deceleration command input derived from the sensor having a deceleration command value that is greater than a predetermined threshold deceleration value that is available for operating the combination vehicle in the non-enhanced braking mode.

SUMMARY OF THE EXAMPLE EMBODIMENTS

The embodiments herein provide for new and improved systems and methods for providing brake control of one or more towed vehicles of a combination vehicle.

The embodiments herein provide a braking controller and method in a towing vehicle towing one or more towed vehicles as a combination vehicle providing brake control of the one or more towed vehicles based on a level of braking force applied to the towing vehicle. A non-enhanced braking mode applies a first level of braking force to the towed vehicles in a predetermined reduced proportion relative to the level of braking force applied to the towing vehicle, and an enhanced braking mode applies a second level of braking force to the towed vehicles greater than the first level of braking force. In one form, control logic stored in a non-transient memory device is executable by a processor to determine the braking mode of the one or more towed vehicles of the combination vehicle as one of: the non-enhanced braking mode in accordance with a received deceleration command value being less than a stored predetermined threshold deceleration rate value, or the enhanced braking mode in accordance with the deceleration command value being greater than the predetermined threshold deceleration rate value. And in another form, the control logic determines the braking mode as one of: the non-enhanced braking mode in accordance with a sum of a current deceleration value and the deceleration command value being less than the predetermined threshold deceleration rate value, or the enhanced braking mode in accordance with a sum of the current deceleration value and the deceleration command value being greater than the predetermined threshold deceleration rate value. The deceleration command value may be from a braking sub-system of the towing vehicle such as by a signal representative of an operation of a foot pedal, from a forward vehicle sensing sub-system of the towing vehicle such as by a signal from a forward distance sensor, or from a combination of these manual and/or automatic inputs or others.

In accordance with an embodiment, a braking control device is provided for use in an associated towing vehicle towing one or more associated towed vehicles as a combination vehicle for providing brake control enhancement to the one or more towed vehicles relative to a level of braking applied to the towing vehicle. The braking control device includes a processor, a deceleration command input operatively coupled with the processor, a non-transient memory device operatively coupled with the processor, and control logic stored in the non-transient memory device and executable by the processor. The deceleration command input receives a deceleration command signal including deceleration command data representative of a deceleration command value. The non-transient memory device stores braking deceleration threshold data representative of a predetermined threshold deceleration rate value related to a predetermined threshold deceleration rate of the combination vehicle for operating the combination vehicle in a non-enhanced braking mode applying a first level of braking force to the one or more towed vehicles in a predetermined reduced proportion relative to the level of braking force applied to the towing vehicle. The control logic stored in the non-transient memory device is executable by the processor to perform a comparison between the predetermined threshold deceleration rate value and the deceleration command value, and to determine a braking mode of the one or more towed vehicles of the combination vehicle as a one of the non-enhanced braking mode or an enhanced braking mode in accordance with a result of the comparison, the enhanced braking mode applying a second level of braking force to the one or more towed vehicles greater than the first level of braking force. The non-enhanced braking mode is determined in accordance with a first result of the comparison between the predetermined threshold deceleration rate value and the deceleration command value. The enhanced braking mode is determined in accordance with a second result of the comparison between the predetermined threshold deceleration rate value and the deceleration command value. Preferably, the non-enhanced braking mode is selected in accordance with the deceleration command value being less than the predetermined threshold deceleration rate value, or the enhanced braking mode is selected in accordance with the deceleration command value being greater than the predetermined threshold deceleration rate value.

In accordance with a further embodiment, a braking control device is provided for use in an associated towing vehicle towing one or more towed vehicles as a combination vehicle for providing brake control enhancement to the one or more towed vehicles relative to a level of braking applied to the towing vehicle. The braking controller includes a processor, a current deceleration input operatively coupled with the processor, a deceleration command input operatively coupled with the processor, a non-transient memory device operatively coupled with the processor, and control logic stored in the non-transient memory device and executable by the processor. The current deceleration input receives a current deceleration signal including current deceleration data representative of a current deceleration value being executed by the combination vehicle. The deceleration command input receives a deceleration command signal including deceleration command data representative of a deceleration command value. The non-transient memory device stores control logic. The control logic stored in the non-transient memory device is executable by the processor to perform a comparison between the current deceleration value and the deceleration command value relative to the predetermined threshold deceleration rate value, and determine a braking mode of the one or more towed vehicles of the combination vehicle as a one of the non-enhanced braking mode or an enhanced braking mode in accordance with a result of the comparison, the enhanced braking mode applying a second level of braking force to the one or more towed vehicles greater than the first level of braking force. The non-enhanced braking mode is determined in accordance with a first result of the comparison between the current deceleration value and the deceleration command value, and the enhanced braking mode is determined in accordance with a second result of the comparison between the current deceleration value and the deceleration command value. Preferably, the braking controller further includes a deceleration sensor operatively coupled with the processor and with the controller current deceleration input for sensing a deceleration of the combination vehicle and generating the current deceleration signal including the current deceleration data representative of the current deceleration value being executed by the combination vehicle, wherein the control logic determines the braking mode of the one or more towed vehicles of the combination vehicle as the one of the non-enhanced braking mode in accordance with a sum of the current deceleration value and the deceleration command value being less than the predetermined threshold deceleration rate value, or the enhanced braking mode in accordance with a sum of the current deceleration value and the deceleration command value being greater than the predetermined threshold deceleration rate value.

In accordance with a further embodiment, a braking control method is provided for use in an associated towing vehicle towing one or more towed vehicles as a combination vehicle for providing brake control enhancement to the one or more towed vehicles relative to a level of braking applied to the towing vehicle. In the braking control method, a deceleration command signal is received at a deceleration command input operatively coupled with a processor. The deceleration command signal includes deceleration command data representative of a deceleration command value. The method further includes storing, in a non-transient memory device operatively coupled with the processor, braking deceleration threshold data representative of a predetermined threshold deceleration rate value related to a deceleration rate of the combination vehicle when operating in a non-enhanced braking mode applying a first level of braking force to the one or more towed vehicles in a predetermined reduced proportion relative to the level of braking force applied to the towing vehicle. The method still further includes performing, by control logic stored in the non-transient memory device and executable by the processor, a comparison between the predetermined threshold deceleration rate value and the deceleration command value. The control logic determines a braking mode of the one or more towed vehicles of the combination vehicle as a one of the non-enhanced braking mode in accordance with a first result of the comparison between the predetermined threshold deceleration rate value and the deceleration command value, or an enhanced braking mode applying a second level of braking force to the one or more towed vehicles greater than the first level of braking force in accordance with a second result of the comparison between the predetermined threshold deceleration rate value and the deceleration command value different than the first result of the comparison. A first brake control transmission signal is selectively generated by the control logic based on the first result of the comparison between the predetermined threshold deceleration rate value and the deceleration command value, the first brake control transmission signal effecting the deceleration command value in accordance with the non-enhanced braking mode of operation. Similarly, a second brake control transmission signal is selectively generated by the control logic based on the second result of the comparison between the predetermined threshold deceleration rate value and the deceleration command value, the second brake control transmission signal effecting the deceleration command value in accordance with the enhanced braking mode of operation.

In accordance with yet a still further embodiment, a braking control method is provided for use in an associated towing vehicle towing one or more towed vehicles as a combination vehicle for providing brake control enhancement to the one or more towed vehicles based on a level of braking force applied to the towing vehicle. The braking control method includes receiving a current deceleration signal at a controller current deceleration input operatively coupled with a processor. The current deceleration signal includes current deceleration data representative of a current deceleration value being executed by the combination vehicle. A deceleration command signal is received at a deceleration command input operatively coupled with the processor, the deceleration command signal including deceleration command data representative of a deceleration command value. Control logic is stored in a non-transient memory device operatively coupled with the processor. The control logic stored in the non-transient memory device is executed by the processor to perform a comparison between the current deceleration value and the deceleration command value, and determine a braking mode of the one or more towed vehicles of the combination vehicle as a one of the non-enhanced braking mode in accordance with a first result of the comparison between the current deceleration value and the deceleration command value, or an enhanced braking mode applying a second level of braking force to the one or more towed vehicles greater than the first level of braking force in accordance with a second result of the comparison between the current deceleration value and the deceleration command value. A first brake control transmission signal is generated to effect the deceleration command value in accordance with the non-enhanced braking mode of operation, and a second brake control transmission signal is generated to effect the deceleration command value in accordance with the enhanced braking mode of operation.

In accordance with yet a still further embodiment, a braking control device is provided for use in an associated towing vehicle towing one or more associated towed vehicles as a combination vehicle for providing brake control enhancement to the one or more towed vehicles relative to a level of braking applied to the towing vehicle. The braking control device of the example embodiment includes a processor, a current deceleration input, a deceleration command input, a non-transient memory device, and control logic stored in the non-transient memory device and executable by the processor. The current deceleration input is operatively coupled with the processor, and is operable to receive a current deceleration signal comprising current deceleration data representative of a current deceleration value being executed by the combination vehicle. The deceleration command input is also operatively coupled with the processor, and is operable to receive a deceleration command signal comprising deceleration command data representative of a deceleration command value. The non-transient memory device is operatively coupled with the processor and stores braking deceleration threshold data representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle. The control logic stored in the non-transient memory device is executable by the processor to perform a comparison between the current deceleration value and the deceleration command value; and determine a braking mode of the one or more towed vehicles of the combination vehicle as a one of: the non-enhanced braking mode applying a first level of braking to the one or more towed vehicles in a predetermined reduced proportion relative to the level of braking being applied to the towing vehicle in accordance with a first result of the comparison between the current deceleration value and the deceleration command value, or the enhanced braking mode applying a second level of braking to the one or more towed vehicles greater than the first level of braking in accordance with a second result of the comparison between the current deceleration value and the deceleration command value, the second result of the comparison being different than the first result of the comparison. The control logic stored in the non-transient memory device is further executable by the processor to perform a comparison between the predetermined threshold deceleration rate value and the deceleration command value; and determine the braking mode of the one or more towed vehicles of the combination vehicle as a one of: the non-enhanced braking mode applying the first level of braking to the one or more towed vehicles in accordance with a first result of the comparison between the predetermined threshold deceleration rate value and the deceleration command value, or an enhanced braking mode applying a second level of braking to the one or more towed vehicles greater than the first level of braking in accordance with a second result of the comparison between the predetermined threshold deceleration rate value and the deceleration command value, the second result of the comparison being different than the first result of the comparison.

In accordance with yet a still further embodiment, a braking control method is provided for use in an associated towing vehicle towing one or more associated towed vehicles as a combination vehicle for providing brake control enhancement to the one or more towed vehicles relative to a level of braking applied to the towing vehicle. The braking control method of the example embodiment includes receiving at a deceleration command input operatively coupled with a processor, a deceleration command signal comprising deceleration command data representative of a deceleration command value. The method further includes receiving at a current deceleration input operatively coupled with a processor a current deceleration signal comprising current deceleration data representative of a current deceleration value being executed by the combination vehicle. The method further includes storing in a non-transient memory device operatively coupled with the processor braking deceleration threshold data representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle. The method further includes performing by control logic stored in the non-transient memory device and executable by the processor a comparison between the predetermined threshold deceleration rate value and the deceleration command value. The method further includes performing by the processor executing the control logic stored in the non-transient memory device a comparison between the current deceleration value and the deceleration command value. The method further includes determining by the control logic stored in the non-transient memory device and executable by the processor a braking mode of the one or more towed vehicles of the combination vehicle as a one of: the non-enhanced braking mode applying the first level of braking to the one or more towed vehicles in accordance with a first result of the comparison between the predetermined threshold deceleration rate value and the deceleration command value, or an enhanced braking mode applying a second level of braking to the one or more towed vehicles greater than the first level of braking in accordance with a second result of the comparison between the predetermined threshold deceleration rate value and the deceleration command value, the second result of the comparison being different than the first result of the comparison. The method further includes selectively generating by the control logic stored in the non-transient memory device and executable by the processor based on the first result of the comparison between the predetermined threshold deceleration rate value and the deceleration command value, a first brake control transmission signal to effect the deceleration command value in accordance with the non-enhanced braking mode. The method further includes selectively generating by the control logic stored in the non-transient memory device and executable by the processor based on the second result of the comparison between the predetermined threshold deceleration rate value and the deceleration command value, a second brake control transmission signal to effect the deceleration command value in accordance with the enhanced braking mode. The method further includes determining by the processor executing the control logic stored in the non-transient memory device a braking mode of the one or more towed vehicles of the combination vehicle as a one of: the a non-enhanced braking mode applying a first level of braking to the one or more towed vehicles in a predetermined reduced proportion relative to the level of braking being applied to the towing vehicle in accordance with a first result of the comparison between the current deceleration value and the deceleration command value, or the enhanced braking mode applying a second level of braking to the one or more towed vehicles greater than the first level of braking in accordance with a second result of the comparison between the current deceleration value and the deceleration command value, the second result of the comparison being different than the first result of the comparison. The method further includes selectively determining by the control logic based on the first result of the comparison between the current deceleration value and the deceleration command value a first brake control transmission signal to effect the deceleration command value in accordance with the non-enhanced braking mode. The method further includes selectively determining by the control logic based on the second result of the comparison between the current deceleration value and the deceleration command value a second brake control transmission signal to effect the deceleration command value in accordance with the enhanced braking mode.

The embodiments herein further provide controlled transition between braking modes of operation ranging from a non-enhanced braking mode of operation applying modulated full brake pressure of the towing vehicle to the towed vehicle, and an enhanced braking mode of operation applying unmodulated full brake pressure of the towing vehicle to the towed vehicle.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
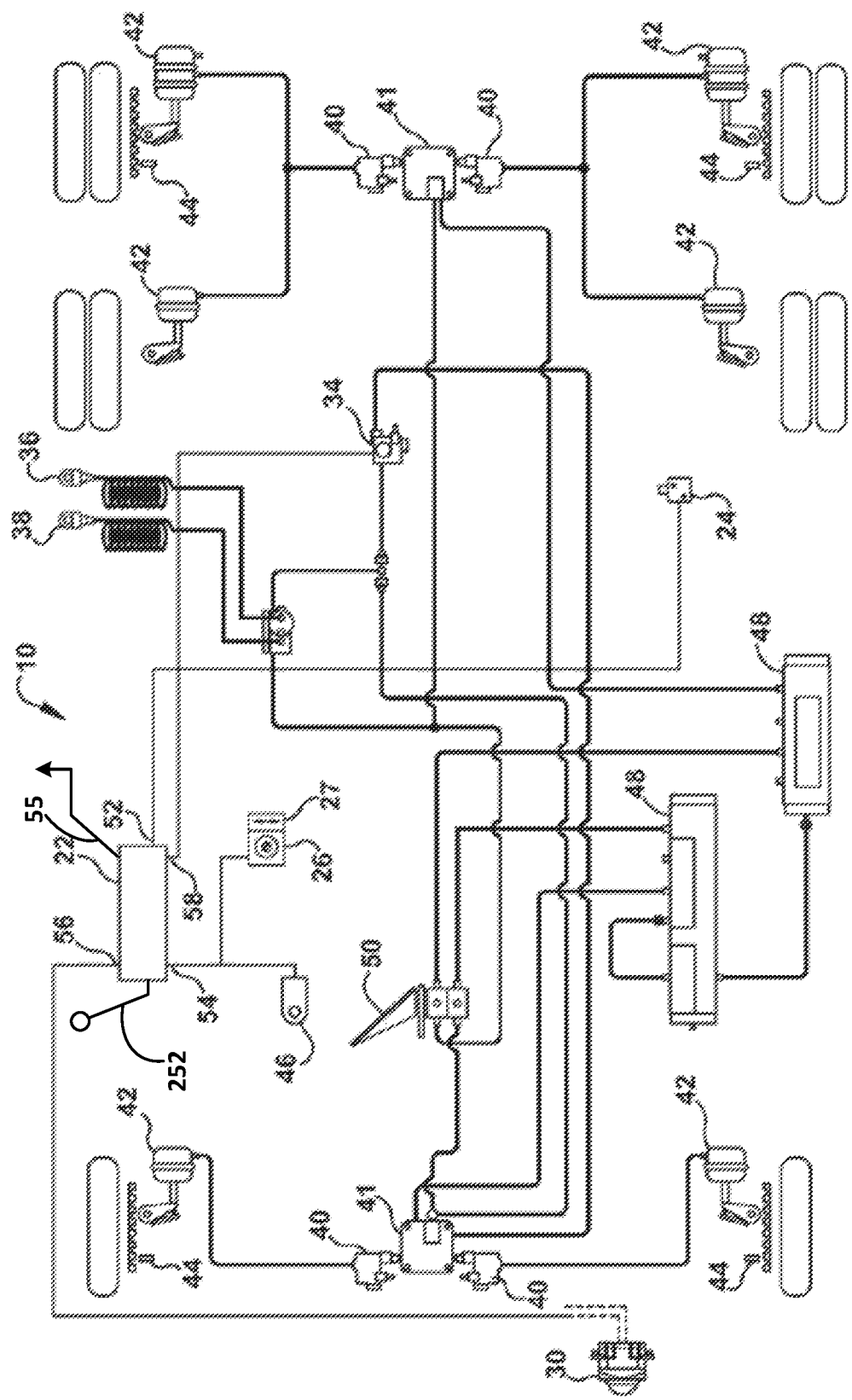
FIG. 1 illustrates a schematic representation of a braking system on a towing vehicle including a towing vehicle controller in accordance with an example embodiment.

Referring now to the drawings, wherein the showings are for the purpose of illustrating the example embodiments providing braking strategies for towing and towed vehicles while travelling on roadways and for only, and not for purposes of limiting the same, FIG. 1 illustrates an air brake system 10 of a towing vehicle, or tractor, by way of an example application. The system 10 includes an electronic towing vehicle controller 22 with inputs for electrically connecting to, either directly or through a vehicle communication bus such as for example a serial communication bus, at least four modulators 40, at least four wheel speed sensors 44, at least two traction relay valves 41, a trailer pressure control device 34, a steering angle sensor 46, a lateral acceleration sensor 27, a yaw rate sensor 26, and a load sensor 24. The pneumatic portion of the tractor air brake system 10 includes at least four brake actuators 42, at least two reservoirs 48, and an operator actuated brake pedal 50. Each of the at least four wheel speed sensors 44 communicates the individual wheel speeds to the towing vehicle controller 22 for use in antilock braking system (ABS), automatic slip regulation (ASR), and electronic stability control (ESC) algorithms. Each of the at least four modulators 40 is connected pneumatically to one of the at least two traction relay valves 41 and to one of the at least four brake actuators 42. When equipped with ESC, the towing vehicle controller 22 is capable of actuating the tractor brakes independently of the operator in order to maintain vehicle stability. It is to be appreciated that, in accordance with the example embodiments, the towing vehicle controller 22 is also capable of actuating the tractor brakes independently of the operator in order to react to various commands from other platooning vehicles and to react to forward collision warning event data as may be necessary and/or desired.

The tractor air brake system 10 is pneumatically connected to a towed vehicle, or trailer, air brake system (not shown) through a trailer control connection 36 and a trailer supply connection 38. The trailer supply connection 38 is pneumatically connected to the reservoirs 48 on the tractor through a control valve (not shown). The trailer control connection 36 is pneumatically connected to the trailer pressure control device 34. The trailer pressure control device 34 is typically an electro-pneumatic valve, for example, a Bendix® M-32™ modulator. The trailer pressure control device 34 receives a brake control transmission signal from an output 58 of the towing vehicle controller 22 and converts the brake control transmission signal to a control air signal for the towed vehicle. Through the trailer pressure control device 34, the towing vehicle controller 22 of the tractor air brake system 10 is able to control the control air signal supplied to the trailer brake system. In particular, in the example embodiment, the towing vehicle controller 22 of the tractor air brake system 10 is able to control the control air signal supplied to the trailer brake system through the trailer pressure control device 34 for effecting the enhanced and the non-enhanced brake control strategies and for effecting transitions from the platooning operation in ways to be described below in greater detail.

The towing vehicle controller 22 receives a signal indicative of the combined load of the tractor and the coupled trailer from the load sensor 24 at a controller input 52. In one embodiment, the load sensor 24 is a pressure sensor connected to a tractor air suspension air bag. As the pressure in the air bag increases, the load signal value indicative of the combined load increases and, therefore, the load as determined by the towing vehicle controller 22 from the load signal increases. Other means may be used to determine the tractor-trailer load, such as on board scales, linear displacement sensors on the tractor chassis or vehicle mass estimation based on engine torque data. It is understood that the signal indicative of the tractor-trailer load may be received either directly through a controller input or through a vehicle serial communications bus.

The towing vehicle controller 22 also receives a signal or signals concerning a stability condition of the tractor, such as, for example, a yaw rate signal and a lateral acceleration signal from a yaw rate sensor 26 and lateral acceleration sensor 27, respectively. The yaw rate sensor 26 and the lateral acceleration sensor 27 are mounted on the tractor and may be discrete or packaged as a combination sensor, such as the Bendix® YA-S60™ sensor. The yaw rate sensor 26 and lateral acceleration sensor 27 may communicate directly with an input 54 at the towing vehicle controller 22 or over the vehicle serial communication bus. Other sensors may be used to determine a stability condition at a tractor, including the steering angle sensor 46 or the one or more wheel speed sensors 44. The towing vehicle controller 22 is able to use at least the load signal and stability condition signals to enhance the tractor and trailer braking response when the operator actuates the brake pedal 50, independently of the operator, or independently and in combination with actuation of the brake pedal 50 by the operator.

In many situations, the tractor may be equipped with an automatic cruise control (ACC) system. In such cases, the towing vehicle controller 22 also receives information from a radar sensor 30 when the ACC system is activated by the operator. The radar sensor 30 is mounted on the tractor or towing vehicle. The information from the radar sensor 30 is received by an input 56 on the towing vehicle controller 22 and/or over the vehicle serial communication bus. The information transmitted by the radar sensor 30 typically includes automated deceleration requests. A deceleration signal is created in response to the automated deceleration request when the ACC system determines the tractor needs to decelerate in order to maintain a certain following distance between the tractor and a forward target vehicle. Automated deceleration requests can be received into the towing vehicle controller 22 from other sources as well such as for example from one or more remote sources or from other vehicles travelling in a platoon with the towing vehicle or tractor by way of the example application. The towing vehicle controller 22 typically responds to a deceleration signal first by de-throttling the engine, then activating a vehicle retarder. Lastly, the towing vehicle controller 22 applies the individual wheel end brakes on the tractor and sends the brake control transmission signal to the trailer pressure control device 34. If the vehicle is equipped with a Collision Mitigation System, then the towing vehicle controller 22 is continuously receiving and responding to deceleration signals from the radar sensor 30, first by alerting the operator of the reduced distance between the towing vehicle and the target object and then by applying the towing vehicle and towed vehicle brakes.

Similarly and in accordance with an example embodiment, the tractor or towing vehicle may be equipped with an automatic platooning control (APC) system. In such cases, the towing vehicle controller 22 also receives information from one or more other platooning vehicle platoon members via one or more radio frequency (RF) antennas 252 for wireless communication of platoon control and command data, GPS data, and the like when the APC system is activated by the operator. The one or more antennas 252 are mounted on the tractor or towing vehicle. The information from the one or more radio frequency (RF) antennas 252 is received by an input 55 on the towing vehicle controller 22 or over the vehicle serial communication bus. The information received by the one or more radio frequency (RF) antennas 252 includes, in example embodiments herein, towed vehicle braking capability data communicated to the controller 22 from an associated source other than the operator and/or indirectly from the one or more towed vehicles such as through an intermediary cellular, satellite or other similar infrastructure. The information received by the one or more radio frequency (RF) antennas 252 may typically also include automated deceleration requests. A deceleration signal is created in response to the automated deceleration request when the APC system determines that the automated deceleration request is valid and that the tractor needs to decelerate in order to maintain a certain following distance between the tractor and a target vehicle transmitting the automated deceleration request to the tractor. The towing vehicle controller 22 typically responds to a deceleration signal first by de-throttling the engine, then activating a vehicle retarder. Lastly, the towing vehicle controller 22 applies the individual wheel end brakes on the tractor and sends the brake control transmission signal to the trailer pressure control device 34. If the vehicle is equipped with a Collision Mitigation System, then the towing vehicle controller 22 is continuously receiving and responding to automated deceleration request from the target vehicle, first by alerting the operator of the automated deceleration request reduced distance between the towing vehicle and the target object and then by applying the towing vehicle and towed vehicle brakes.

In the example embodiments herein, the towing vehicle controller 22 selectively applies the towed vehicle brakes commensurate with a reduced brake level as applied to the towing vehicle and selectively in accordance with capabilities and dynamic performance data related to the towing and towed vehicle combination. In further example embodiments herein, the towing vehicle controller 22 selectively applies the towed vehicle brakes commensurate with or the same as the brake level applied to the towing vehicle responsive to receiving the automated deceleration request from the target vehicle and in accordance with capabilities and dynamic performance data related to the towing and towed vehicle combination. In further example embodiments, the towing vehicle controller 22 selectively applies the towed vehicle brakes commensurate with or the same as the brake level applied to the towing vehicle responsive to receiving the automated deceleration request from the target vehicle and in order to maintain a predetermined minimum distance between the towing vehicle and the target object.

In the example embodiments herein, a non-enhanced braking mode applies a first level of braking force to the one or more towed vehicles in a predetermined reduced proportion relative to the level of braking force applied to the towing vehicle. Further in the example embodiments herein, an enhanced braking mode applies a second level of braking force to the one or more towed vehicles greater than the first level of braking force. The controller determines the conditions for each of the modes, and selects the appropriate braking mode as between the enhanced and non-enhanced modes for realizing highly efficient braking of the combination vehicle for superior safety and stopping effectiveness.

Figure 2:
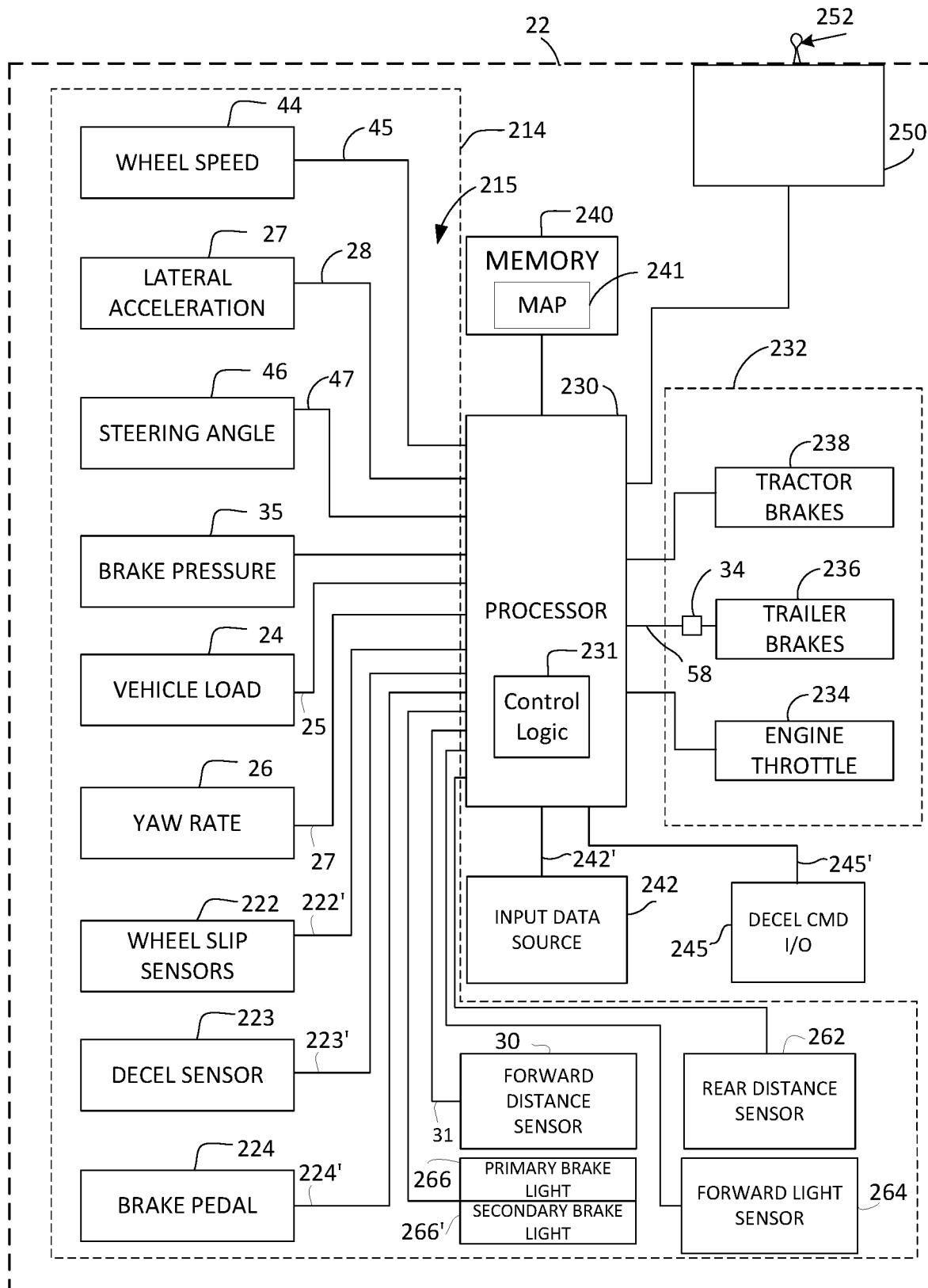
FIG. 2 is a schematic block diagram depiction that illustrates details of the towing vehicle controller of FIG. 1 in accordance with an example embodiment.

FIG. 2 is a schematic block diagram depiction that illustrates details of the towing vehicle controller 22 of FIG. 1 in accordance with an example embodiment. According to principles of the example embodiment as illustrated, the towing vehicle controller 22 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the towing vehicle controller 22 may include one or more devices or systems 214 for providing input data indicative of one or more operating parameters or one or more conditions of a commercial vehicle. For example, the devices 214 may be one or more sensors, such as but not limited to, one or more wheel speed sensors 44, a lateral acceleration sensor 27, a steering angle sensor 46, a brake pressure sensor 34, a vehicle load sensor 24, a yaw rate sensor 26, a set of one or more wheel slip sensor(s) 222, a vehicle deceleration sensor 223, and a brake pedal position sensor 224. The towing vehicle controller 22 may also utilize additional devices or sensors in the exemplary embodiment including for example a forward distance sensor 30, a rear distance sensor 262, one or more rear lights such as a primary rear brake light 266 and a secondary rear brake light 266', and a forward light sensor 264. Each of the one or more rear lights such as the secondary rear brake light 266' and the forward light sensor 264 may operate in the Infrared (IR) range as necessary or desired. Other sensors and/or actuators or energy generation devices or combinations thereof may be used of otherwise provided as well, and one or more devices or sensors may be combined into a single unit as may be necessary and/or desired.

The towing vehicle controller 22 may also include a logic applying arrangement such as a controller or a processor means such as processor 230, and control logic 231, in communication with the one or more devices or systems 214. The processor 230 may include one or more inputs for receiving input data from the devices or systems 214. The processor 230 may be adapted to process the input data and compare the raw or processed input data to a stored threshold value. The processor 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the processor 230 may generate and send the control signal to an engine electronic control unit or an actuating device to reduce the engine throttle 234 and slowing the vehicle down. The control signal may be an electric signal, a wireless signal, or a signal having any other characteristic as may be necessary or desired for interfacing with the engine electronic control unit(s) and/or the actuating device(s) of the towing vehicle. Further, the processor 230 may send the control signal to a vehicle brake system to selectively engage the brakes. The brake control signal may be an electric signal, a wireless signal, a pneumatic signal or a signal having any other characteristic as may be necessary or desired for interfacing with the vehicle brake system. In the tractor-trailer arrangement of the example embodiment, the processor 230 may engage the brakes 236 on one or more wheels of a trailer portion of the vehicle, and the brakes 238 on one or more wheels of a tractor portion of the vehicle, and then report this corrective action to the wireless service or simply store the data locally to be used for determining a driver quality. A variety of corrective actions may be possible and multiple corrective actions may be initiated at the same time.

The processor 230 may also include a memory means such as for example a memory portion 240 for storing and accessing system information, such as for example the system control logic 231 and control tuning. The memory portion 240, however, may be separate from the processor 230. The sensors 214 and processor 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the processor 230 of the present invention. Therefore, many of the components to support the towing vehicle controller 22 of the present invention may be present in a vehicle equipped with the Bendix® ESP® system, thus, not requiring the installation of additional components. The towing vehicle controller 22, however, may utilize independently installed components if desired.

The towing vehicle controller 22 may also include a source of input data 242 indicative of a configuration/condition of a commercial vehicle. The processor 230 may sense or estimate the configuration/condition of the vehicle based on the input data, and may select a control tuning mode or sensitivity based on the vehicle configuration/condition. The processor 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. As another example, in a vehicle with a towed portion, the source of input data 242 may communicate an anti-lock braking system (ABS) capability of the towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the towing vehicle controller 22 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the processor 230 is operatively coupled with a deceleration command interface 245 via a deceleration command input 245' The deceleration command interface 245 receives deceleration commands including deceleration command data representative of a deceleration command value to be performed by the vehicle.

Still yet further, the data collection and communication module 210 may also include a transmitter/receiver (transceiver) module 250 such as, for example, a radio frequency (RF) transmitter including one or more antennas 252 for wireless communication of the automated deceleration requests, GPS data, one or more various vehicle configuration and/or condition data, or the like between the vehicles and one or more destinations such as, for example, to one or more wireless services (not shown) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 is operative to communicate the acquired data to the one or more receivers in a raw data form, that is without processing the data, in a processed form such as in a compressed form, in an encrypted form or both as may be necessary or desired. In this regard, the processor 230 may combine selected ones of the vehicle parameter data values into processed data representative of higher level vehicle condition data such as, for example, data from the lateral acceleration sensor 27 may be combined with the data from the steering angle sensor 26 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

A basic platoon includes a host or leader vehicle in traffic with a second or follower vehicle in accordance with the present disclosure. Typically, the follower vehicle travels proximate to the leader vehicle seriatim in an ordered platoon along a roadway. The leader vehicle is provided with an electronic control system 22 which includes data collection and communication module logic and brake monitoring and platooning control logic. Similarly, the follower vehicle is also provided with an electronic control system which includes data collection and communication module logic and brake monitoring and platooning control logic. In the example embodiments to be described herein, each of the two or more vehicles comprising the various platoons that will be described include the same or equivalent electronic control system 22, the same or equivalent data collection and communication module logic, and the same or equivalent brake monitoring and platooning control logic, although other control systems having the functionality to be described herein may equivalently be used as necessary or desired.

In the example embodiment illustrated, the towing vehicle controllers 22 of the respective vehicles of the platoon are configured for mutually communicating signals and exchanging data between each other, and also for communicating signals and exchanging data with various other communication systems including for example a remote wireless communication system and a remote satellite system. These remote systems can provide, for example, global position system (GPS) data to the vehicles as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to trailer braking strategies for platooning for inter-vehicle platoon distance and/or spacing management i.e. platoon ordering and spacing beneficially without the need to consult with or act under the direction of or in concert with the remote satellite system, the remote fleet management facility, a Network Operations Center (NOC), a Central Command Center (CCC), or the like.

In addition to the above, the towing vehicle controller 22 of each platooning vehicle operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming a basic platoon can communicate with each other locally for self-ordering and spacing into a platoon without the need for input from the NOC in accordance with the embodiments herein. The vehicles forming the basic platoon can also communicate with one or more other vehicles locally without the need for input from the NOC for negotiating the one or more other vehicles into the platoon in accordance with the embodiments herein. The vehicles forming the basic platoon can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

The towing vehicle controller 22 of FIG. 2 is suitable for executing embodiments of one or more software systems or modules that perform trailer brake strategies and trailer braking control methods according to the subject application. The example towing vehicle controller 22 may include a bus or other communication mechanism for communicating information, and a processor 230 coupled with the bus for processing information. The computer system includes a main memory 240, such as random access memory (RAM) or other dynamic storage device for storing information and instructions to be executed by the processor 230, and read only memory (ROM) or other static storage device for storing static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 causes the processor 230 to perform the process steps described herein. In an alternative implementation, hard-wired circuitry may be used in place of or in combination with software instructions to implement the invention. Thus implementations of the example embodiments are not limited to any specific combination of hardware circuitry and software.

A set of desired dynamic stability values may be read into or otherwise stored in the non-transient memory device 240, wherein the set of desired dynamic stability values are preferably stored as a dynamic stability map 241 representative of a mapping of the set of one or more vehicle characteristic inputs onto a plurality of instantaneous stability values representative of a corresponding plurality of instantaneous stability determinations of the combination vehicle relative to a range of operating conditions of the combination vehicle. The values stored in the dynamic stability map 241 are representative of a mapping of a set of values of one or more vehicle characteristics such as yaw rate, steering angle, lateral acceleration, wheel speed, wheel slip, allocated vehicle load characteristics comprising weight data representative of a weight allocated to a selected portion of the combination vehicle overall combined weight characteristics comprising overall combined weight data representative of an overall combined weight of the combination vehicle, and curvilinear travel path characteristics, for example, onto a plurality of instantaneous stability values representative of a corresponding plurality of instantaneous stability determinations of the combination vehicle relative to a range of operating conditions of the combination vehicle.

In accordance with the descriptions herein, the term "computer-readable medium" as used herein refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The example embodiments use rich and full information about brake system performance on a vehicle-by-vehicle basis. Knowing the deceleration capabilities of the vehicle may result in lower maximum braking performance than may be expected by the operator. In this regard, an example embodiment includes an algorithm adapted to have a real-time quantification of the wheel end brake system performance. In particular, the time from brake apply to when the vehicle decelerates is monitored during every stop of the vehicle relative to wheel slippage of the one or more wheels of the tractor and/or of the trailer. This information together with information regarding the vehicle and axle loads during every stop and is entered or otherwise used as a data point defining the vehicle response delay. Similarly, knowing the axle loads and the ABS Activation of a wheel end for a given pressure such as determined by or from a brake pressure sensor 35 for example is used to create another data point. From all of these data points an overall performance of the brake system is developed in accordance with the vehicle brake performance monitoring of the example embodiment. This performance may define variables such as how long it takes the system to respond, how much deceleration the vehicle may be able to achieve for a given vehicle and axle loading, or the like. In addition, this information could then further be used to inform the operator that vehicle brake system maintenance is required or the order that a vehicle must be placed within a platoon.

In accordance with the example embodiment, the towing vehicle controller 22 further includes control logic 231 for determining a towed vehicle brake control transmission signal based on braking deceleration threshold data representative of a predetermined maximum deceleration rate achievable by a towed and towing vehicle combination in a non-enhanced braking mode of operation applying modulated full brake pressure of the towing vehicle to the towed vehicle, and based on deceleration command data representative of a deceleration command value contained in the automated deceleration request received from the target vehicle. In the example embodiment, the control logic selectively determines determine the non-enhanced braking mode of operation applying modulated full brake pressure of the towing vehicle to the towed vehicle in accordance with a first result of a comparison between the predetermined maximum deceleration rate and the deceleration command value. Further in the example embodiment, the control logic selectively determines an enhanced braking mode of operation applying unmodulated full brake pressure of the towing vehicle to the towed vehicle in accordance with a second result of the comparison between the predetermined maximum deceleration rate and the deceleration command value.

Responsive to receiving the automated deceleration request received from the target vehicle, the control logic is operative to selectively determine a first brake control transmission signal to effect the deceleration command value in accordance with the non-enhanced braking mode of operation based on the first result of the comparison between the predetermined maximum deceleration rate and the deceleration command value. In the example embodiment, the first result is the deceleration command value being less than the predetermined maximum deceleration rate.

Responsive to receiving the automated deceleration request received from the target vehicle the control logic is operative to selectively determine a second brake control transmission signal to effect the deceleration command value in accordance with the enhanced braking mode of operation based on the second result of the comparison between the predetermined maximum deceleration rate and the deceleration command value. In the example embodiment, the second result is the deceleration command value being greater than the predetermined maximum deceleration rate.

In accordance with the example embodiment, the control logic is further operative to selectively determine the first and second brake control transmission signals to effect the deceleration command value in accordance with the enhanced and the non-enhanced braking modes of operation based on various factors and parameters including without limitation the towed and towing vehicle combination load, at least one of the stability conditions and the deceleration request, wheel slippage, yaw rates, a relative tractor-trailer alignment value, and the like. The towed vehicle brake control transmission signal is transmitted via an output 58 on the towing vehicle controller 22 to the trailer pressure control device 34 for controlling the brakes on the trailer.

Figure 3:
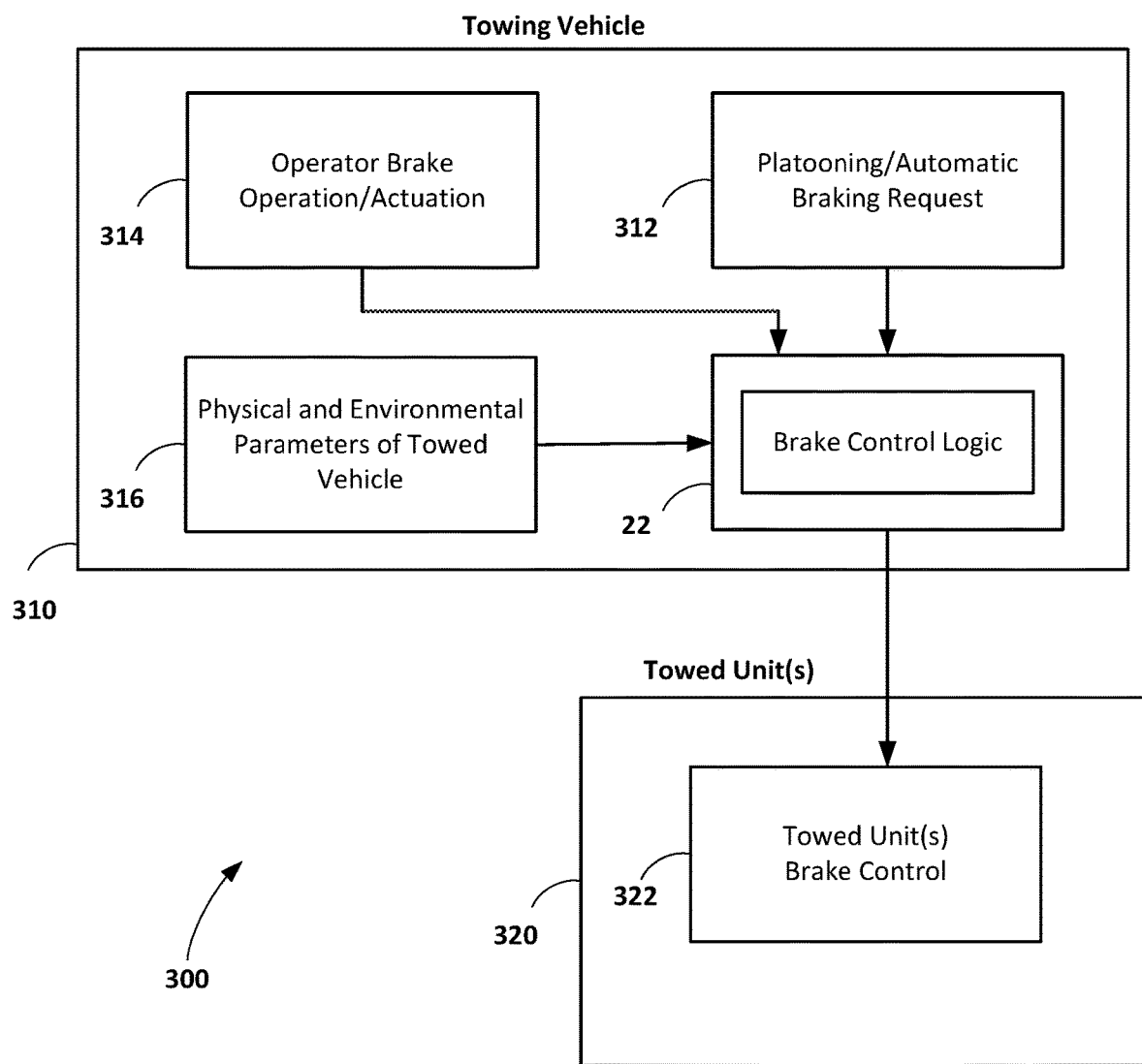
FIG. 3 is a functional block diagram illustrating the towing vehicle controller of FIG. 1 applied in a towing vehicle of a towing and towed vehicle combination.

FIG. 3 is a functional block diagram illustrating the towing vehicle controller 22 of FIG. 1 applied in a towing vehicle 310 of a towing and towed vehicle 320 combination vehicle 300. The towing vehicle controller 22 may receive information from one or more other platooning vehicle platoon members via one or more radio frequency (RF) antennas 252 for wireless communication of platoon control and command data, GPS data, and the like when the APC system is activated by the operator. The one or more antennas 252 are mounted on the tractor or towing vehicle. The information from the one or more radio frequency (RF) antennas 252 is received by an input 55 on the towing vehicle controller 22 or over the vehicle serial communication bus. The information received by the one or more radio frequency (RF) antennas 252 typically includes automated deceleration requests 312. A deceleration signal is created in response to the automated deceleration request when the APC system determines that the automated deceleration request is valid and that the tractor needs to decelerate in order to maintain a certain following distance between the tractor and a target vehicle transmitting the automated deceleration request to the tractor. The brake control logic of the towing vehicle controller 22 processes the automated deceleration request to generate a brake control transmission signal to be sent to the brake control unit 322 of the towed vehicle 320. The brake control unit of the towed vehicle 322 reacts to the signal to appropriately apply the trailer brakes in accordance with the brake control transmission signal.

A deceleration signal may also be created in response to actuation by the vehicle driver/operator of the brake foot pedal 50. The braking system determines that the tractor needs to decelerate in response to the brake command form the operator. The brake control logic of the towing vehicle controller 22 processes the manual deceleration request to generate a brake control transmission signal to be sent to the brake control unit 322 of the towed vehicle 320. The brake control unit of the towed vehicle 322 reacts to the signal to appropriately apply the trailer brakes in accordance with the brake control transmission signal.

The towing vehicle controller 22 may also derive information regarding the one or more other platooning vehicle platoon members via one or more sensors such as for example the forward distance sensor sensing the relative distance between the towing vehicle 310 and the next forward vehicle in the platoon. Multiple distance measurements using the forward distance sensor over a predetermined or selected time period results in a derivation of a relative closing speed between the towing vehicle 310 and the next forward vehicle in the platoon which enables a calculation of a deceleration needed in order to avoid a possible collision.

In addition to the above and in accordance with the example embodiment, the brake control logic of the towing vehicle controller 22 is operable to receive capabilities and dynamic performance data related to the towing and towed vehicle combination. In further example embodiments herein, the towing vehicle controller 22 selectively applies the towed vehicle brakes commensurate with a reduced brake level as applied to the towing vehicle and in accordance with capabilities and dynamic performance data related to the towing and towed vehicle combination. The capabilities and dynamic performance data includes in the example, a signal 314 indicative of activation by an operator of a brake pedal of the towing vehicle, and one or more physical and/or environmental parameters 316 of the towed vehicle such as, for example, a stability condition of the tractor, such as, for example, a yaw rate signal and a lateral acceleration signal from a yaw rate sensor 26 and lateral acceleration sensor.

Figure 4:
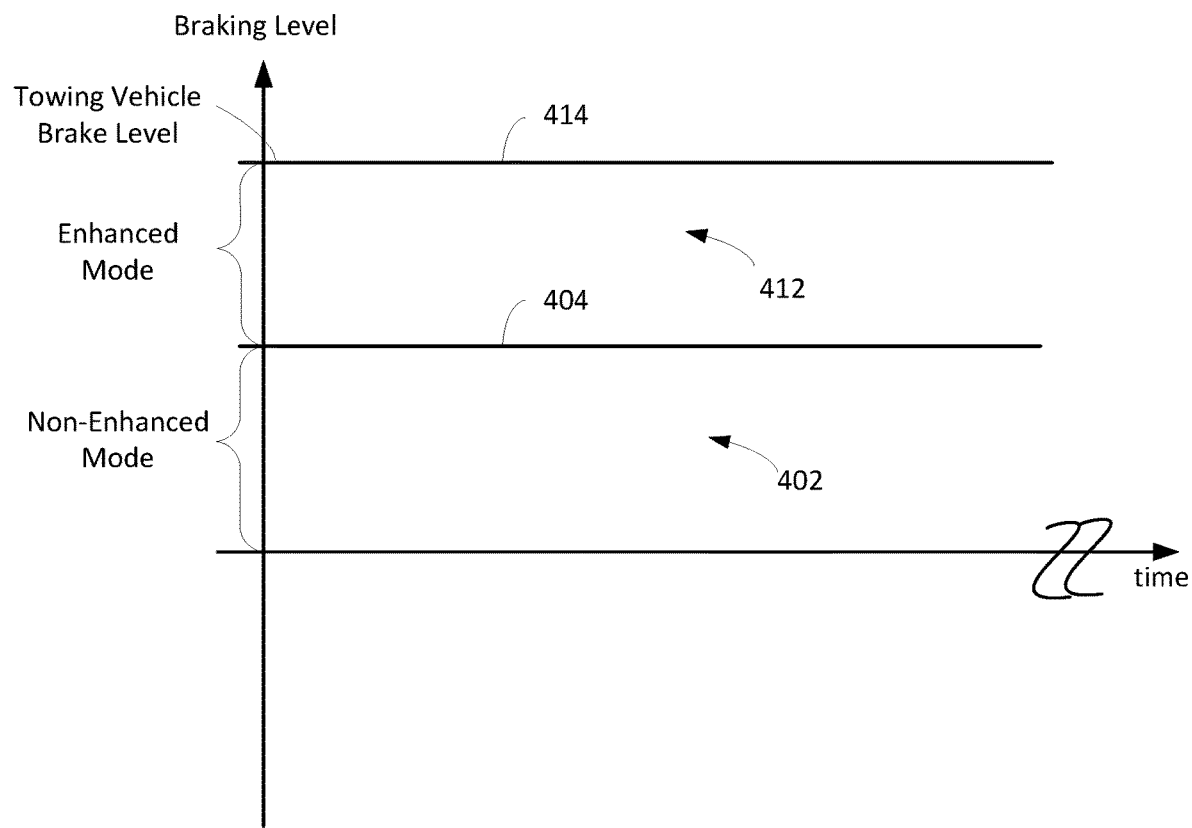
FIG. 4 is a graph representative of the various braking modes, thresholds, and relative braking values in accordance with the example embodiment.

FIG. 4 is a graph representative of the various braking modes, thresholds, and relative braking values in accordance with the example embodiments. As shown, the combination vehicle comprising an associated towing vehicle 310 towing one or more towed vehicles 320 as the combination vehicle 300 may operate in a Non-Enhanced braking mode 402 by applying a first level 404 of braking, braking force, braking signal, etc. to the one or more towed vehicles 320 in a predetermined reduced proportion relative to the level 414 of braking, braking force, braking signal, etc. applied to the towing vehicle 310. The combination vehicle 300 may also alternatively operate in an Enhanced braking mode 412 by applying a second level 414 of braking, braking force, braking signal, etc. to the one or more towed vehicles 320 greater than the first level 404 of braking, braking force, braking signal, etc.

It is to be appreciated that the predetermined reduced proportion 404 relative to the level of braking force applied to the towing vehicle 414 may be adjusted upwardly (more braking force) or downwardly (less braking force) as may be deemed necessary or desired. The adjustment of the predetermined reduced proportion 404 may be made manually by an operator of the towing vehicle, for example. The adjustment of the predetermined reduced proportion 404 may also be made automatically such as by a remote host fleet controller system (not shown) communicating the new or updated predetermined reduced proportion value to the towing vehicle via the transmitter/receiver (transceiver) module 250 described above, or by any other expedient means as may be desired.

With continued reference to FIG. 4, it is further to be appreciated that, preferably, the Non-Enhanced braking mode applies a first level of braking force to the one or more towed vehicles in the predetermined reduced proportion 404 relative to the level of braking force applied to the towing vehicle 414. However, the Non-Enhanced braking mode may be used to apply any level of braking force to the one or more towed vehicles that is less than the predetermined reduced proportion 404 relative to the level of braking force applied to the towing vehicle 414. Therefore, the Non-Enhanced braking mode is shown in the Figure as being a range of braking level that is less than the predetermined reduced proportion 404 relative to the level of braking force applied to the towing vehicle 414. Similarly, the Non-Enhanced braking mode is shown in the Figure as being a range of braking level that is greater than the predetermined reduced proportion 404 relative to the level of braking force applied to the towing vehicle 414 and less than or equal to the level of braking force applied to the towing vehicle 414.

It is to be appreciated that the Enhanced braking mode 412 of operation may be selected to be any value of braking, braking force, braking signal, etc. between the first level 404 and the second level 414. It is to further be appreciated that the braking signal applied by the towing vehicle to the towed vehicle(s) may be a physical signal or any other type of signal as may be necessary or desired such as, for example, an electric signal, a hydraulic signal, an electromagnetic signal, or the like. In this regard, the control logic is executable by the processor to, responsive to receiving a deceleration command signal, selectively generate a first brake control transmission signal to effect an automatic deceleration command value in accordance with the non-enhanced braking mode, and selectively generate a second brake control transmission signal to effect the automatic deceleration command value in accordance with the enhanced braking mode. The braking control device according an embodiment comprises a brake signal output 58 operatively coupled with the processor 230. The brake signal output selectively 58 transmits a one of the first or second brake control transmission signals from the braking control device.

Figure 5:
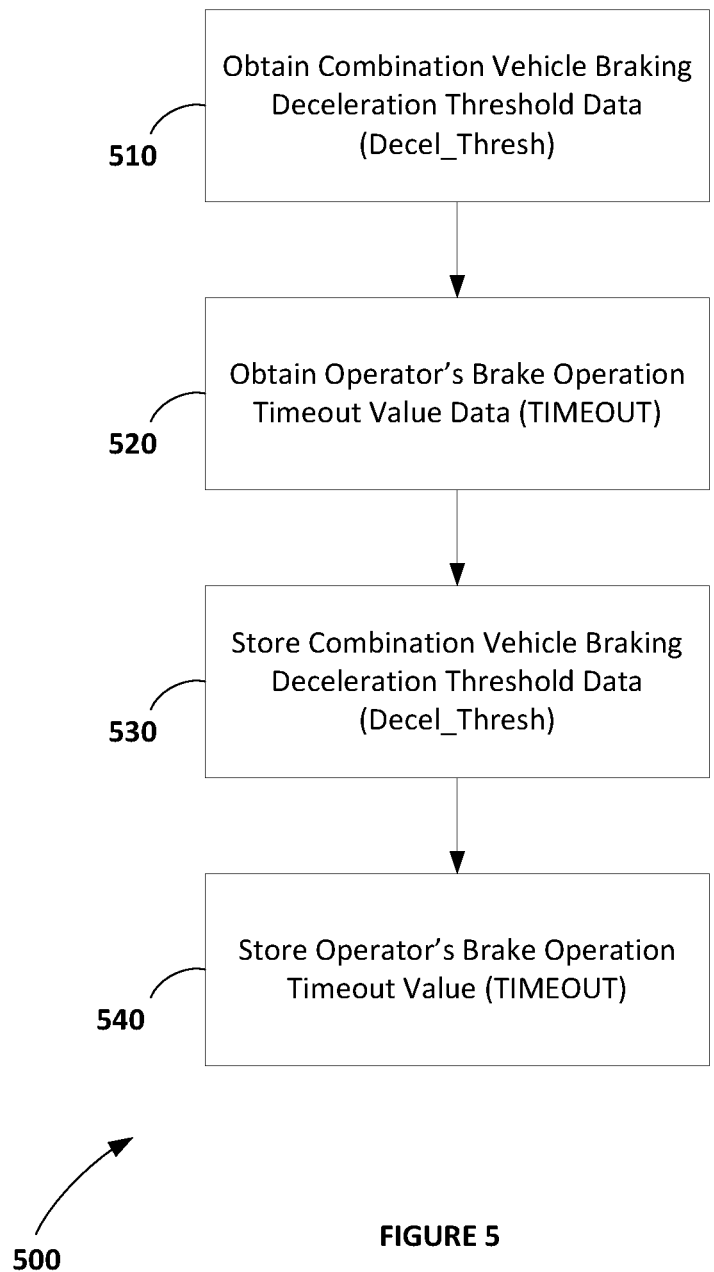
FIG. 5 is a flow diagram showing a method of obtaining and storing foundational characteristic and capabilities data related to the towing and towed vehicle combination of FIG. 3, and used by the towing vehicle controller for trailer braking strategy while platooning in accordance with an example embodiment.

FIG. 5 is a flow diagram showing a method 500 of obtaining and storing foundational characteristic and capabilities data related to the towing and towed vehicle combination of FIG. 3, and used by the towing vehicle controller for trailer braking strategy while platooning or otherwise travelling along a roadway in accordance with an example embodiment.

As noted above, the towing vehicle controller 22 is provided for communication and control functions. Logic such as software or other forms of executable instructions or the like are executed by the processor of the towing vehicle controller 22 in order to conduct communication functionality, vehicle and driver parameter manipulation, and braking strategy management including, in the example embodiment, brake strategy management for vehicle operation. Although the portions of the methods and sub-methods to be described herein are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing a method may be embodied as a logic 231 (FIG. 2) encoded in one or more tangible media for execution. When executed, the instructions may perform a method. Thus, in one example, logic encoded in one or more tangible media may store computer executable instructions that when executed by a machine (e.g., processor) cause the machine to perform the methods and sub-methods described herein. While executable instructions associated with the above method are described as being embodied as logic encoded in one or more tangible media, it is to be appreciated that executable instructions associated with other example methods described herein may also be stored on a tangible media, and that the instructions may be performed by discrete hardware devices or by combinations of discrete hardware devices working together with logic encoded in the one or more tangible media and executable by the processor.

With continued reference to the method 500 of FIG. 5, overall and in general, Combination Vehicle Braking Deceleration Threshold Data (Decel_Thresh) is obtained in step 510. An Operator's Brake Operation Timeout Value Data (TIMEOUT) is obtained in step 520. The Combination Vehicle Braking Deceleration Threshold Data (Decel_Thresh) obtained in step 510 is stored in step 530 in the non-transient memory device 240, wherein the combination vehicle braking deceleration threshold data is representative of a deceleration rate of the combination vehicle when operating in a non-enhanced braking mode applying a first level of braking force to the one or more towed vehicles in a predetermined reduced proportion relative to the level of braking force applied to the towing vehicle. The Operator's Brake Operation Timeout Value (TIMEOUT) obtained in step 420 is stored in step 440 in the non-transient memory device 240.

In an embodiment and with reference to FIGS. 1-5 as described above, a braking control device 22 for use in the associated towing vehicle 310 towing one or more associated towed vehicles 320 as an associated combination vehicle 300 is provided enabling brake control enhancement to the one or more towed vehicles 320 relative to a level of braking applied to the towing vehicle 310. The braking control device 22 of the embodiment includes a processor 230 and a deceleration command input 245' operatively coupled with the processor. The deceleration command input receives a deceleration command signal 245 comprising deceleration command data representative of a deceleration command value. Although shown separately for clarity and ease of illustration, the input may be an automated deceleration request 312 received by the one or more radio frequency (RF) antennas 252, and the input may also be sourced from electronics coupled with the brake foot pedal 50 of the towing vehicle 310 and function as a manual input signal. In the example embodiment, a non-transient memory device 240 is operatively coupled with the processor of the braking control device and stores braking deceleration threshold data representative of a predetermined threshold deceleration rate value related to a predetermined threshold deceleration rate of the combination vehicle 300 for operating the combination vehicle 300 in the Non-Enhanced braking mode 402 applying a first level of braking to the one or more towed vehicles 320 in a predetermined reduced proportion relative to the level of braking being applied to the towing vehicle 310. In addition, the non-transient memory device stores control logic 231 which is executable by the processor to perform a comparison between the predetermined threshold deceleration rate value and the deceleration command value and determine a braking mode of the one or more towed vehicles 320 of the combination vehicle 300 as a one of the non-enhanced braking mode applying the first level of braking to the one or more towed vehicles or an enhanced braking mode applying a second level of braking to the one or more towed vehicles greater than the first level of braking. The control logic determines the Non-enhanced braking mode 402 in accordance with a first result of the comparison between the predetermined threshold deceleration rate value and the deceleration command value. The control logic determines the Enhanced braking mode 412 in accordance with a second result of the comparison between the predetermined threshold deceleration rate value and the deceleration command value, the second result of the comparison being different than the first result of the comparison.

In another embodiment and with continued reference to FIGS. 1-5 as described above, a braking control device 22 for use in the associated towing vehicle 310 towing one or more associated towed vehicles 320 as an associated combination vehicle 300 is provided enabling brake control enhancement to the one or more towed vehicles 320 relative to a level of braking applied to the towing vehicle 310. The braking control device of the embodiment includes a processor 230, a current deceleration input 223' operatively coupled with the processor, and a deceleration command input 245' also operatively coupled with the processor. The current deceleration input 223' receives a current deceleration signal comprising current deceleration data representative of a current deceleration value being executed by the combination vehicle. The current deceleration input may be a deceleration sensor 223 affixed to the towing vehicle 310 and provide an electrical signal having a level in proportion to the sensed deceleration of the vehicle. The deceleration command input 245' receives a deceleration command signal comprising deceleration command data representative of a deceleration command value. Although shown separately for clarity and ease of illustration, the input may be an automated deceleration request 312 received by the one or more radio frequency (RF) antennas 252, and the input may also be sourced from electronics coupled with the brake foot pedal 50 of the towing vehicle 310. The braking control device of the embodiment includes a processor 230 and a non-transient memory device 240 operatively coupled with the processor. Control logic 231 stored in the non-transient memory device is executable by the processor to perform a comparison between the current deceleration value and the deceleration command value, and to determine a braking mode of the one or more towed vehicles 320 of the combination vehicle 300 as a one of the Non-enhanced braking mode 402 applying a first level of braking to the one or more towed vehicles in a predetermined reduced proportion relative to the level of braking being applied to the towing vehicle or control logic determines the Enhanced braking mode 412 in accordance with a second result of the comparison between the current deceleration value and the deceleration command value, the second result of the comparison being different than the first result of the comparison.

In yet another embodiment and with further continued reference to FIGS. 1-5 as described above, a braking control device 22 for use in the associated towing vehicle 310 towing one or more associated towed vehicles 320 as an associated combination vehicle 300 is provided enabling brake control enhancement to the one or more towed vehicles 320 relative to a level of braking applied to the towing vehicle 310. The braking control device of the embodiment includes a processor 230, a forward relative distance input 31 operatively coupled with the processor, and a non-transient memory device 240 also operatively coupled with the processor. The forward relative distance input 31 selectively receives such as from a forward distance sensor 30 a forward relative distance signal comprising forward relative distance data representative of a forward relative distance between the towing vehicle 310 of the combination vehicle 300 and an associated vehicle traveling forward of the combination vehicle 300. The non-transient memory device stores braking deceleration threshold data representative of a predetermined threshold deceleration rate value related to a predetermined threshold deceleration rate of the combination vehicle for operating the combination vehicle 300 in a non-enhanced braking mode applying a first level of braking to the one or more towed vehicles 320 in a predetermined reduced proportion relative to the level of braking being applied to the towing vehicle 310. The non-transient memory device also stores control logic which is executable by the processor to determine, based on the forward relative distance, a forward relative speed between the towing vehicle of the combination vehicle and the associated vehicle traveling forward of the combination vehicle. The control logic is further executable by the processor to determine, in accordance with the forward relative distance and the forward relative speed, an automatic deceleration command value required to mitigate a chance of a collision between the towing vehicle of the combination vehicle and the associated vehicle traveling forward of the towing vehicle. The control logic is further executable by the processor to perform a comparison between the predetermined threshold deceleration rate value and the automatic deceleration command value, and determine a braking mode of the one or more towed vehicles of the combination vehicle as a one of the Non-enhanced braking mode 402 applying the first level of braking to the one or more towed vehicles or the Enhanced braking mode 412 applying a second level of braking to the one or more towed vehicles greater than the first level of braking. The control logic determines the Non-enhanced braking mode 402 in accordance with a first result of the comparison between the predetermined threshold deceleration rate value and the automatic deceleration command value, and the control logic determines the Enhanced braking mode 412 in accordance with a second result of the comparison between the predetermined threshold deceleration rate value and the automatic deceleration command value, the second result of the comparison being different than the first result of the comparison.

In yet another embodiment and with still further continued reference to FIGS. 1-5 as described above, a braking control device 22 for use in the associated towing vehicle 310 towing one or more associated towed vehicles 320 as an associated combination vehicle 300 is provided enabling brake control enhancement to the one or more towed vehicles 320 relative to a level of braking applied to the towing vehicle 310. The braking control device of the embodiment includes a processor 230, a forward relative distance input 31 operatively coupled with the processor, and a non-transient memory device 240 also operatively coupled with the processor. The forward relative distance input 31 selectively receives such as from a forward distance sensor 30 a forward relative distance signal comprising forward relative distance data representative of a forward relative distance between the towing vehicle 310 of the combination vehicle 300 and an associated vehicle traveling forward of the combination vehicle 300. The non-transient memory device stores control logic 231 which is executable by the processor to determine, based on the forward relative distance, a forward relative speed between the towing vehicle of the combination vehicle and the associated vehicle traveling forward of the combination vehicle. The control logic is further executable by the processor to determine, in accordance with the forward relative distance and the forward relative speed, an automatic deceleration command value required to mitigate a chance of a collision between the towing vehicle of the combination vehicle and the associated vehicle traveling forward of the towing vehicle, and to perform a comparison between the forward relative distance and an automated deceleration distance resulting from executing the automatic deceleration command value by the combination vehicle. The control logic is further executable by the processor to determine a braking mode of the one or more towed vehicles of the combination vehicle as a one of the Non-enhanced braking mode 402 applying a first level of braking to the one or more towed vehicles in a predetermined reduced proportion relative to the level of braking being applied to the towing vehicle, or the Enhanced braking mode applying a second level of braking to the one or more towed vehicles greater than the first level of braking. The Non-enhanced braking mode 402 is determined by the control logic in accordance with a first result of the comparison between the forward relative distance and the automated deceleration distance resulting from executing the automatic deceleration command value by the combination vehicle. The Enhanced braking mode 402 is determined by the control logic in accordance with a second result of the comparison between the forward relative distance and the automated deceleration distance resulting from executing the automatic deceleration command value by the combination vehicle, the second result of the comparison being different than the first result of the comparison.

In an example embodiment the control logic 231 of the braking control device 22 is executable by the processor 230 to, responsive to receiving the deceleration command signal 245 selectively generate, based on the first result of the comparison between the predetermined threshold deceleration rate value and the deceleration command value, a first brake control transmission signal to effect the deceleration command value in accordance with the non-enhanced braking mode, and to selectively generate, based on the second result of the comparison between the predetermined threshold deceleration rate value and the deceleration command value, a second brake control transmission signal to effect the deceleration command value in accordance with the enhanced braking mode. The first and second brake control transmission signals to effect the deceleration command value in accordance with the non-enhanced and enhanced braking modes of operation may be transmitted via the output 58 on the towing vehicle controller 22 to the trailer pressure control device 34 for thereby controlling the brakes on the trailer.

In an example embodiment the control logic 231 of the braking control device 22 is executable by the processor 230 to determine the braking mode of the one or more towed vehicles of the combination vehicle as the one of the Non-enhanced braking mode 402 applying the first level of braking to the one or more towed vehicles in accordance with the deceleration command value being less than the predetermined threshold deceleration rate value, or the Enhanced braking mode 412 applying the second level of braking to the one or more towed vehicles greater than the first level of braking in accordance with the deceleration command value being greater than the predetermined threshold deceleration rate value.

The braking control device 22 of the embodiment may further include in accordance with a further example embodiment a brake signal output 58 operatively coupled with the processor 230. The brake signal output 58 selectively transmits a one of the first or second brake control transmission signals from the braking control device 22. The braking control device 22 of the embodiment may further include an anti-lock braking system (ABS) capability input 242' operatively coupled with the processor 230. The ABS capability input 242' selectively receives an ABS functionality signal from the one or more towed vehicles of the combination vehicle. The ABS functionality signal includes ABS functionality data representative of a functional ABS capability of the one or more towed vehicles of the combination vehicle, wherein the control logic is executable by the processor to, responsive to receiving the ABS functionality signal and to determining the enhanced braking mode selectively transmit the second brake control transmission signal via the brake signal output 58.

The braking control device 22 of the embodiment may further include in accordance with a further example embodiment a relative forward distance input 31 operatively coupled with the processor 230. The relative forward distance input 31 selectively receiving from an associated distance sensor 30 a forward relative distance signal comprising forward relative distance data representative of a forward relative distance between the towing vehicle of the combination vehicle and an associated vehicle traveling forward of the towing vehicle. The control logic 231 is executable by the processor 230 to determine a relative speed between the towing vehicle of the combination vehicle and the associated vehicle traveling forward of the towing vehicle. The control logic 231 is further executable by the processor to determine, in accordance with the forward relative distance and the relative speed, a deceleration operation value required to mitigate a chance of a collision between the towing vehicle of the combination vehicle and the associated vehicle traveling forward of the towing vehicle. The control logic is still further executable by the processor to, responsive to receiving the forward relative distance signal and to determining the deceleration operation value selectively determine the Non-enhanced braking mode 402 applying the first level of braking to the one or more towed vehicles in accordance with a first result of a comparison between the predetermined threshold deceleration rate value and the deceleration operation value, and selectively determine the Enhanced braking mode 412 applying the second level of braking to the one or more towed vehicles greater than the first level of braking in accordance with a second result of the comparison between the predetermined threshold deceleration rate value and the deceleration operation value.

The braking control device 22 of the embodiment may further include in accordance with a further example embodiment a brake signal output 58 operatively coupled with the processor, the brake signal output selectively transmitting a one of the first or second brake control transmission signals from the braking control device, and combination vehicle stability data stored in the non-transient memory device 240. The combination vehicle stability data is representative of a predetermined combination vehicle stability value reflecting a stable driving condition of the combination vehicle. The braking control device 22 of the embodiment may further include a set of one or more vehicle characteristic inputs 215 operatively coupled with the processor. The set of one or more vehicle characteristic inputs 215 selectively receiving a corresponding set of vehicle characteristic signals, wherein each of the set of vehicle characteristic signals includes vehicle characteristic data representative of a physical characteristic of the combination vehicle. In the example embodiment, the control logic is executable by the processor to determine a dynamic stability value of the combination vehicle in accordance with the set of vehicle characteristic data. In particular, in the example embodiment, the control logic is executable by the processor to selectively determine the Non-enhanced braking mode 402 applying the first level of braking to the one or more towed vehicles in accordance with a first result of a comparison between the predetermined combination vehicle stability value and the dynamic stability value, or selectively determine the Enhanced braking mode 412 applying the second level of braking to the one or more towed vehicles in accordance with a second result of the comparison between the predetermined combination vehicle stability value and the dynamic stability value, the second result of the comparison being different than the first result of the comparison.

The set of one or more vehicle characteristic inputs of the braking control device of the embodiment may further include in accordance with a further example embodiment a wheel slip input 222' for receiving from one or more associated wheel slip sensors 222 a wheel slip signal comprising wheel slip data representative of wheel slippage of one or more wheels of the towing and/or the one or more towed vehicles. The control logic 231 is executable by the processor 230 to determine the dynamic stability value of the combination vehicle in accordance with the wheel slip data.

The set of one or more vehicle characteristic inputs of the braking control device of the embodiment may yet further include in accordance with a further example embodiment a combination vehicle yaw rate input 27 for receiving from one or more associated yaw sensors 26 a yaw rate signal comprising yaw rate data representative of a yaw rate of one or more of the towed and/or towing vehicles, a steering angle input 47 for receiving from one or more associated steering angle sensors 46 a steering angle signal comprising steering angle data representative of a steering angle of a steerable wheel of the towing vehicle, a lateral acceleration input 28 for receiving from one or more associated acceleration sensors 27 a lateral acceleration signal comprising lateral acceleration data representative of a lateral acceleration of the towed and/or towing vehicles, and/or a wheel speed input 45 for receiving from one or more associated wheel speed sensors 44 a wheel speed signal comprising wheel speed data representative of wheel speed of one or more wheels of the towing and/or the one or more towed vehicles. The control logic 231 is executable by the processor 230 to determine a curvilinear travel path value representative of a curvilinear path traveled by the combination vehicle in accordance with one or more of the yaw rate data, the steering angle data, the lateral acceleration data, and/or the wheel speed data. The control logic 231 is further executable by the processor 230 to determine the dynamic stability value of the combination vehicle in accordance with the curvilinear travel path value.

The non-transient memory device 240 of the braking control device 22 according to a further example embodiment stores a set of desired dynamic stability values as a dynamic stability map 241 representative of a mapping of the set of one or more vehicle characteristic inputs onto a plurality of instantaneous stability values representative of a corresponding plurality of instantaneous stability determinations of the combination vehicle relative to a range of operating conditions of the combination vehicle. In the example embodiment, the set of one or more vehicle characteristic inputs may include one or more of a load input 25 for receiving from one or more associated load sensors 24 a weight signal comprising weight data representative of a weight of a selected portion of the combination vehicle, a towed and/or towing vehicle combination yaw rate input 27 for receiving from one or more associated yaw sensors 26 a yaw rate signal comprising yaw rate data representative of a yaw rate of one or more of the towed and/or towing vehicles, a steering angle input 47 for receiving from one or more associated steering angle sensors 46 a steering angle signal comprising steering angle data representative of a steering angle of a steerable wheel of the towing vehicle, a lateral acceleration input 28 for receiving from one or more associated acceleration sensors 27 a lateral acceleration signal comprising lateral acceleration data representative of a lateral acceleration of the towed and/or towing vehicles, and/or a wheel speed input 45 for receiving from one or more associated wheel speed sensors 44 a wheel speed signal comprising wheel speed data representative of wheel speed of one or more wheels of the towing and/or the one or more towed vehicles. In the embodiment, the control logic 231 is executable by the processor 230 to determine the dynamic stability value of the combination vehicle by applying the set of one or more vehicle characteristic inputs 215 to the dynamic stability map 241 and assigning an output of the mapping to the dynamic stability value.

It is to be appreciated that the load input 25 of the set of one or more vehicle characteristic inputs 215 may include a combination vehicle load input for receiving an overall combined weight signal comprising overall combined weight data representative of an overall combined weight of the combination vehicle.

It is to be further appreciated that the load input 25 of the set of one or more vehicle characteristic inputs 215 may include an allocated vehicle load input for receiving an allocated weight signal comprising weight data representative of a weight allocated to a selected portion of the combination vehicle.

Figure 10A:
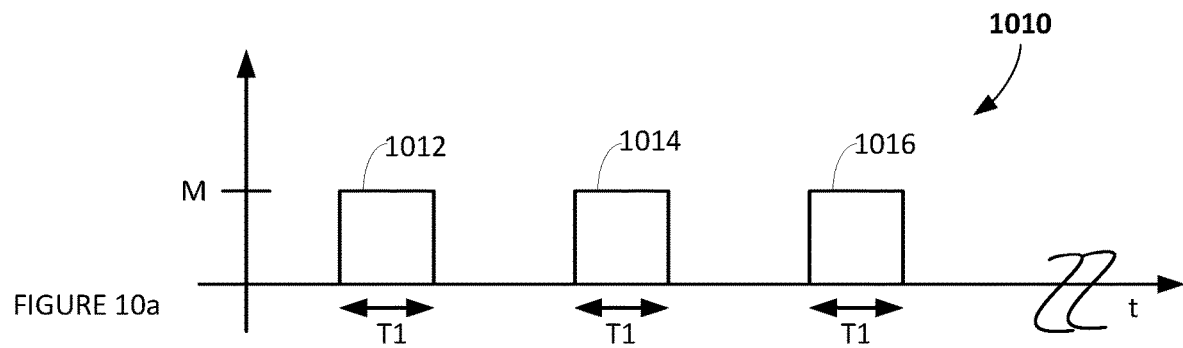
FIGS. 10a-10c illustrate a technique for transitioning trailer braking control from a non-enhanced or normal operational trailer braking mode to an enhanced operational mode by varying by increasing a pulse ON time that a brake command signal is generated by the towing vehicle controller of FIG. 1 and delivered to the one or more trailing unit(s) of the towing and towed vehicle combination of FIG. 3 in accordance with an example embodiment.
Figure 10B:
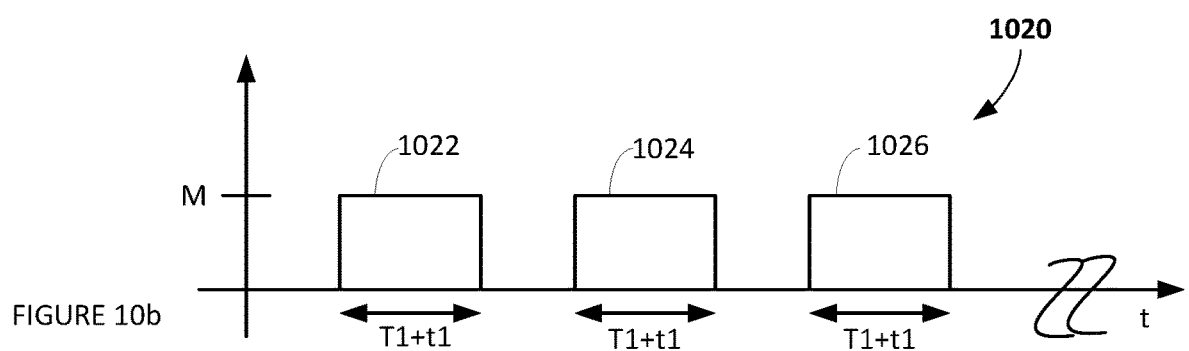
Figure 10C:
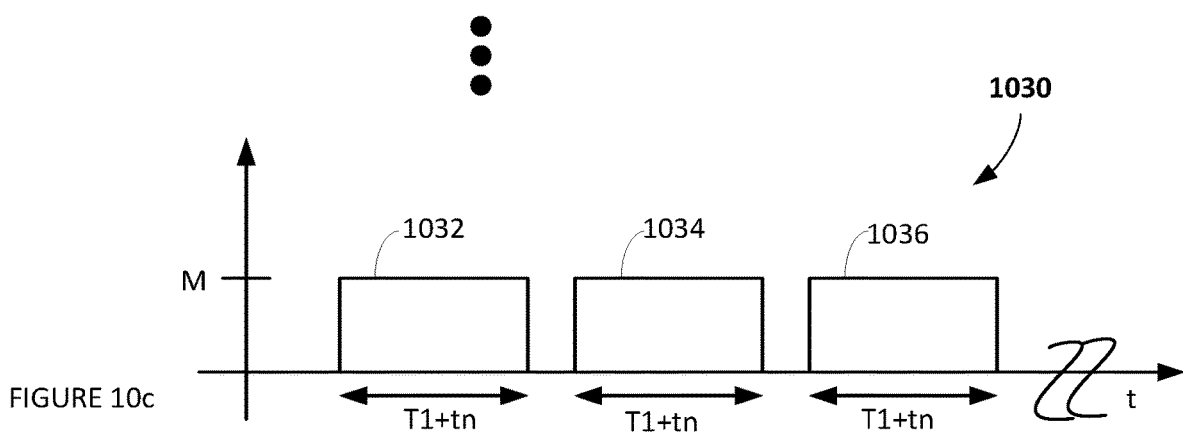

The braking control device 22 of the embodiment may further include in accordance with a further example embodiment a brake control output 58 operatively coupled with the processor 230 and with an associated brake control actuator 34, the associated brake control actuator 34 being configured to deliver brake pressure to the one or more towed vehicles in response to an electric actuator control signal delivered to the associated brake control actuator via the brake control output 58. In the example embodiment, the control logic 231 is executable by the processor 230 to implement the Enhanced braking mode 412 by controlling the electric actuator control signal to modify high pulse times of a modulated brake pressure applied by the towing vehicle to the one or more towed vehicles via the associated brake control actuator as shown in FIGS. 10a-10c to be described in greater detail below.

Figure 11A:
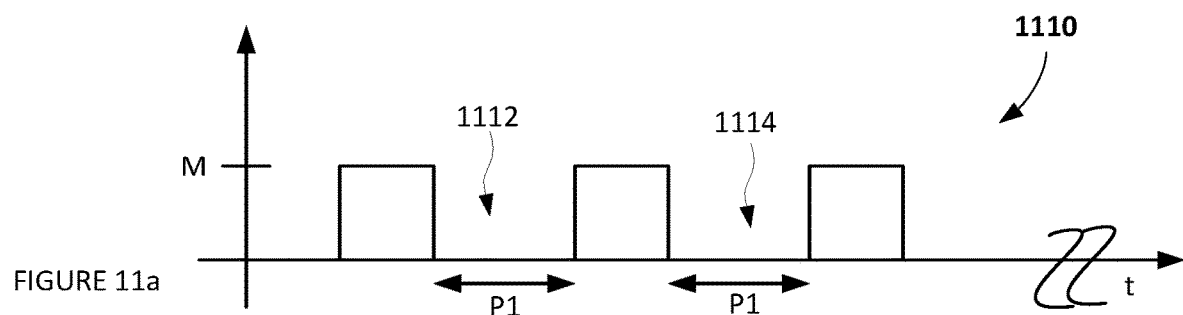
FIGS. 11a-11c illustrate a technique for transitioning trailer braking control from a non-enhanced or normal operational trailer braking mode to an enhanced operational mode by varying by decreasing a pulse OFF time that a brake command signal is generated by the towing vehicle controller of FIG. 1 and delivered to the one or more trailing unit(s) of the towing and towed vehicle combination of FIG. 3 in accordance with an example embodiment.
Figure 11B:
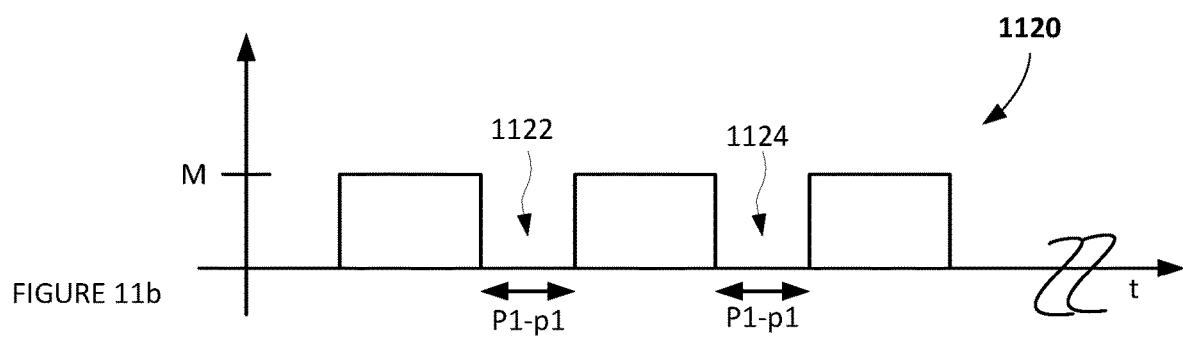
Figure 11C:
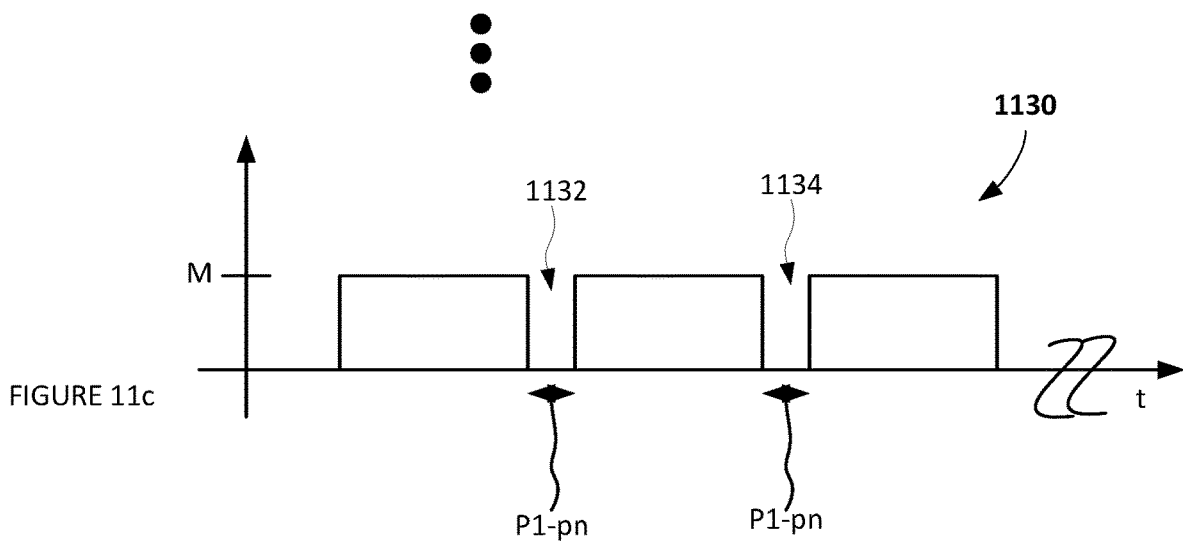

It is to be appreciated that in the example embodiment, the control logic 231 may be executed by the processor to implement the Enhanced braking mode 412 by controlling the electric actuator control signal to modify low pulse times of the modulated brake pressure applied by the towing vehicle to the one or more towed vehicles via the associated brake control actuator as shown in FIGS. 11a-11c to be described in greater detail below.

Figure 12A:
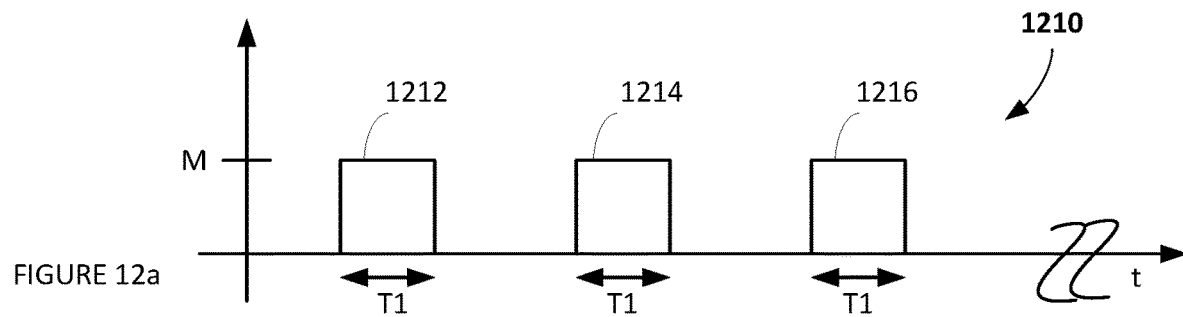
FIG. 12a illustrates a technique for providing a non-enhanced or normal operational trailer braking mode by generating a series of similar brake control pulses at regular intervals by the towing vehicle controller of FIG. 1 and delivered to the one or more trailing unit(s) of the towing and towed vehicle combination of FIG. 3 in accordance with an example embodiment.
Figure 12B:
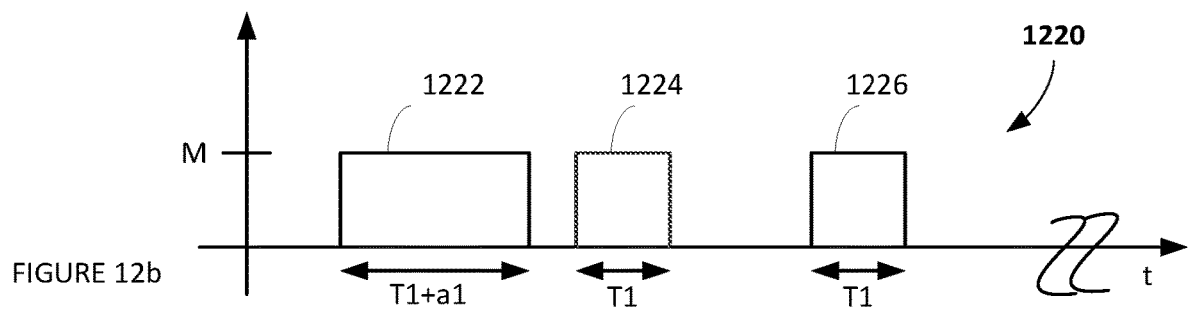
FIG. 12b illustrates a technique for transitioning trailer braking control from a non-enhanced or normal operational trailer braking mode to an enhanced operational mode by varying by increasing an initial pulse ON time that a brake command signal is generated by the towing vehicle controller of FIG. 1 and delivered to the one or more trailing unit(s) of the towing and towed vehicle combination of FIG. 3 in accordance with an example embodiment.
Figure 12C:
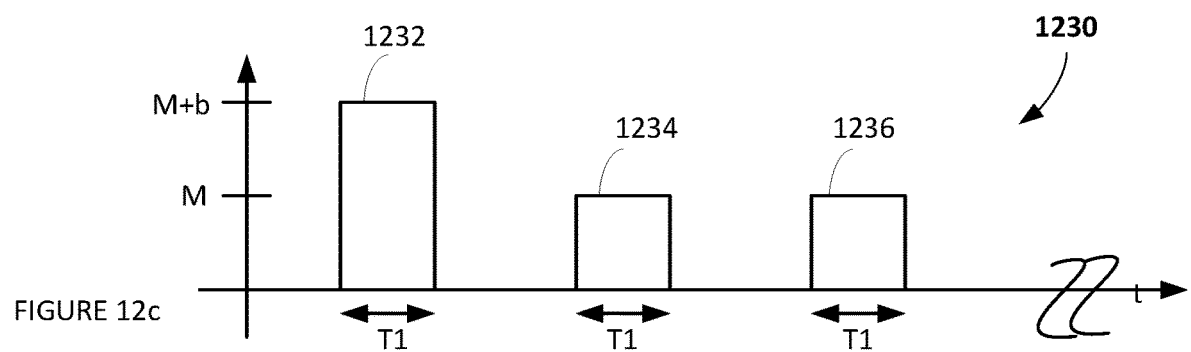
FIG. 12c illustrates a technique for transitioning trailer braking control from a non-enhanced or normal operational trailer braking mode to an enhanced operational mode by varying by increasing an initial pulse amplitude during an ON time that a brake command signal is generated by the towing vehicle controller of FIG. 1 and delivered to the one or more trailing unit(s) of the towing and towed vehicle combination of FIG. 3 in accordance with an example embodiment.

It is to be appreciated that in the example embodiment, the control logic 231 may be executed by the processor to implement the Enhanced braking mode 412 by controlling the actuator control signal to increase values of one or more pulses of the modulated brake pressure applied by the towing vehicle to the one or more towed vehicles via the associated brake control actuator as shown in FIG. 12c to be described in greater detail below.

It is to be appreciated that in the example embodiment, the brake control output 58 may be an electric brake control output, wherein the associated brake control actuator is configured to deliver brake pressure to the one or more towed vehicles in response to an electric actuator control signal delivered to the associated brake control actuator via the brake control output 58. In the embodiment, the control logic 231 is executable by the processor 230 to implement the Enhanced braking mode 412 by controlling the electric actuator control signal to modify pulses of a modulated brake pressure applied by the towing vehicle to the one or more towed vehicles via the associated brake control actuator.

It is to be appreciated that in the example embodiment, the brake control output 58 may be a wireless electric brake control output, wherein the associated brake control actuator is configured to deliver brake pressure to the one or more towed vehicles in response to a wireless actuator control signal delivered to the associated brake control actuator via the brake control output 58. In the embodiment, the control logic 231 is executable by the processor 230 to implement the Enhanced braking mode 412 by controlling the wireless actuator control signal to modify pulses of a modulated brake pressure applied by the towing vehicle to the one or more towed vehicles via the associated brake control actuator.

It is to be appreciated that in the example embodiment, the brake control output 58 may be a pneumatic electric brake control output, wherein the associated brake control actuator is configured to deliver brake pressure to the one or more towed vehicles in response to a pneumatic actuator control signal delivered to the associated brake control actuator via the brake control output 58. In the embodiment, the control logic 231 is executable by the processor 230 to implement the Enhanced braking mode 412 by controlling the pneumatic actuator control signal to modify pulses of a modulated brake pressure applied by the towing vehicle to the one or more towed vehicles via the associated brake control actuator.

In an example embodiment the control logic 231 of the braking control device 22 is executable by the processor 230 to determine one or more platooning operational parameters of the combination vehicle in accordance with the determined braking mode of the one or more towed vehicles of the combination vehicle. In particular, the control logic 231 determines a platooning following distance to be maintained by the towing vehicle relative to an associated vehicle forward of the towing vehicle as a one or more of the platooning operational parameters in accordance with the determined braking mode by increasing the platooning following distance responsive to the non-enhanced braking mode being determined and by decreasing the platooning following distance responsive to the enhanced braking mode being determined. Further, the control logic 231 determines a platooning travel speed limit to be maintained by the towing vehicle as a one or more of the platooning operational parameters in accordance with the determined braking mode by decreasing the platooning travel speed responsive to the non-enhanced braking mode being determined and by increasing the platooning travel speed responsive to the enhanced braking mode being determined. Yet still further, the control logic 231 determines a platooning participation gate of the towing vehicle as a one or more of the platooning operational parameters in accordance with the determined braking mode by not permitting the platooning participation responsive to the non-enhanced braking mode being determined and by permitting the platooning participation responsive to the enhanced braking mode being determined.

In accordance with an embodiment, a braking control method is provided for use in an associated towing vehicle towing one or more associated towed vehicles as a combination vehicle for enabling brake control enhancement to the one or more towed vehicles relative to a level of braking applied to the towing vehicle. The braking control method comprises receiving a deceleration command signal at a deceleration command input operatively coupled with a processor, the deceleration command signal comprising deceleration command data representative of a deceleration command value. The method further comprises storing braking deceleration threshold data in a non-transient memory device operatively coupled with the processor, the braking deceleration threshold data being representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle. The method further comprises executing control logic stored in the non-transient memory device to perform a comparison between the predetermined threshold deceleration rate value and the deceleration command value, and determining by the control logic a braking mode of the one or more towed vehicles of the combination vehicle as a one of the non-enhanced braking mode applying the first level of braking to the one or more towed vehicles or an enhanced braking mode applying a second level of braking to the one or more towed vehicles greater than the first level of braking. The non-enhanced braking mode is determined in accordance with a first result of the comparison between the predetermined threshold deceleration rate value and the deceleration command value. The enhanced braking mode is determined in accordance with a second result of the comparison between the predetermined threshold deceleration rate value and the deceleration command value, the second result of the comparison being different than the first result of the comparison. The control logic selectively generates, based on the first result of the comparison between the predetermined threshold deceleration rate value and the deceleration command value, a first brake control transmission signal to effect the deceleration command value in accordance with the non-enhanced braking mode, and selectively generates, based on the second result of the comparison between the predetermined threshold deceleration rate value and the deceleration command value, a second brake control transmission signal to effect the deceleration command value in accordance with the enhanced braking mode.

Figure 6:
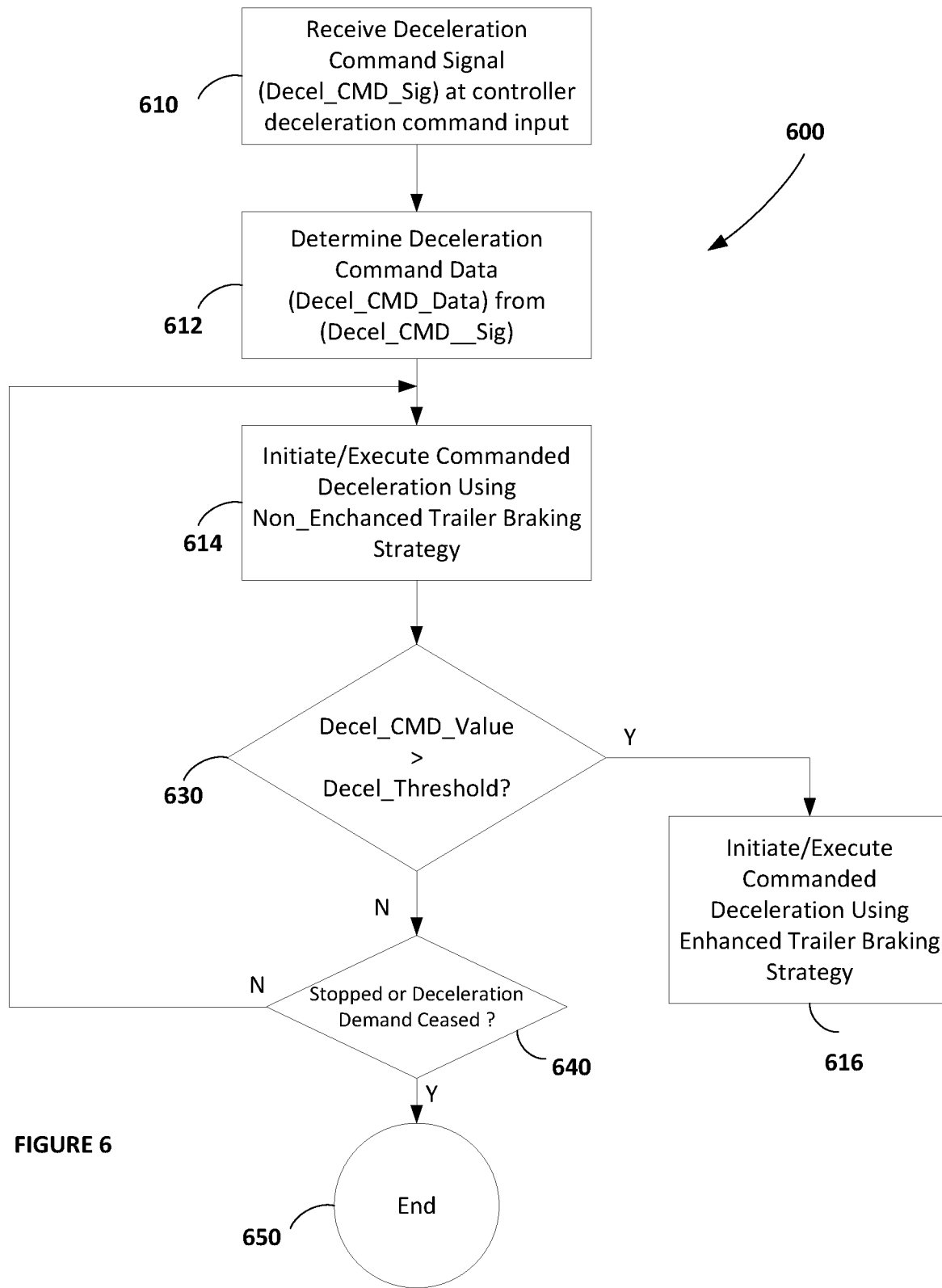
FIG. 6 is a flow diagram showing a method of initiating a trailer braking strategy by the towing vehicle controller in accordance with an example embodiment.

In accordance with the above, FIG. 6 is a flow diagram showing a method 600 of initiating a trailer braking strategy by the towing vehicle controller in accordance with an example embodiment. A Deceleration Command Signal (Decel_CMD_Sig) is received in step 610 at a controller deceleration command input operatively coupled with the processor. The Deceleration Command Signal may be received for example from the leading vehicle of a platooning vehicle pair or from other sources such as by result of a manual application of the brakes by an operator of the towing vehicle. Deceleration Command Data (Decel_CMD_Data) is determined at step 612 from the Deceleration Command Signal. The deceleration command data is in the example embodiment representative of a Deceleration Command Value (Decel_CMD_Value).

In order to best immediately execute the commanded deceleration, a trailer non-enhanced braking strategy is initiated in step 614. The trailer non-enhanced braking strategy is initiated in the example embodiment first by determining the braking mode of the one or more towed vehicles of the combination vehicle as the non-enhanced braking mode and then selectively generating, based on an assumed first result of the comparison between the predetermined threshold deceleration rate value (Decel_Threshold_Value) and the deceleration command value (Decel_CMD_Value), a first brake control transmission signal to effect the deceleration command value in accordance with the non-enhanced braking mode of operation.

As described above, the non-transient memory device operatively coupled with the processor stores braking deceleration threshold data representative of a predetermined threshold deceleration rate value (Decel_Threshold) related to a deceleration rate of the combination vehicle when operating in a non-enhanced braking mode applying a first level of braking force to the one or more towed vehicles in a predetermined reduced proportion relative to the level of braking force applied to the towing vehicle. As related to the method 600 of this example embodiment, if the Deceleration Command Value (Decel_CMD_Value) is determined in step 630 to exceed the predetermined threshold deceleration rate value (Decel_Threshold), an enhanced trailer braking mode is initiated in step 616 applying a second level of braking force to the one or more towed vehicles greater than the first level of braking force of the non-enhanced braking force. The trailer enhanced braking strategy is initiated in the example embodiment first by determining the braking mode of the one or more towed vehicles of the combination vehicle as the enhanced braking mode and then selectively generating, based the result of the comparison between the predetermined threshold deceleration rate value (Decel_Threshold_Value) and the deceleration command value (Decel_CMD_Value), a second brake control transmission signal to effect the deceleration command value in accordance with the enhanced braking mode of operation. If the vehicle combination has arrived at a stop as determined at step 540, the braking strategy ends at step 550.

In the method 600 shown in FIG. 6, braking deceleration threshold data is previously stored in the non-transient memory device 240. In the example embodiment, the non-transient memory device stores braking deceleration threshold data representative of a predetermined threshold deceleration rate value related to a deceleration rate of the combination vehicle when operating in a non-enhanced braking mode applying a first level of braking force to the one or more towed vehicles in a predetermined reduced proportion relative to the level of braking force applied to the towing vehicle. The deceleration command signal comprising the deceleration command data representative of the deceleration command value is received at an input 55 of the towing vehicle controller 22. The control logic 231 is executable by the processor 230 to i) initially determine in step 614 the non-enhanced braking mode of operation applying a first level of braking force to the one or more towed vehicles in a predetermined reduced proportion relative to the level of braking force applied to the towing vehicle in accordance with first receiving the deceleration command signal, and then to ii) selectively determine in step 630 the enhanced braking mode of operation 516 applying a second level of braking force to the one or more towed vehicles greater than the first level of braking force in accordance with a second result of the comparison between the predetermined maximum deceleration rate and the deceleration command value, or to iii) selectively continue application of the non-enhanced braking mode of operation applying the first level of braking force to the one or more towed vehicles in a predetermined reduced proportion relative to the level of braking force applied to the towing vehicle in accordance with a first result of a comparison between the predetermined maximum deceleration rate and the deceleration command value.

In addition, the towing vehicle controller 22 is responsive to receiving the deceleration command signal to selectively determine a first brake control transmission signal to effect the deceleration command value in accordance with the non-enhanced braking mode of operation based on the first result of the comparison between the predetermined maximum deceleration rate and the deceleration command value, and to selectively determine a second brake control transmission signal to effect the deceleration command value in accordance with the enhanced braking mode of operation based on the second result of the comparison between the predetermined maximum deceleration rate and the deceleration command value. Preferably, the control logic stored in the non-transient memory device is executable by the processor to determine the braking mode of the one or more towed vehicles of the combination vehicle as being one of the non-enhanced braking mode in accordance with the deceleration command value being less than the predetermined threshold deceleration rate value, or the enhanced braking mode in accordance with the deceleration command value being greater than the predetermined threshold deceleration rate value. The first and second brake control transmission signals to effect the deceleration command value in accordance with the non-enhanced and enhanced braking modes of operation may be transmitted via the output 58 on the towing vehicle controller 22 to the trailer pressure control device 34 for thereby controlling the brakes on the trailer.

In accordance with an embodiment, a further braking control method is provided for use in an associated towing vehicle towing one or more associated towed vehicles as a combination vehicle for enabling brake control enhancement to the one or more towed vehicles relative to a level of braking applied to the towing vehicle. The braking control method comprises receiving a current deceleration signal at a current deceleration input operatively coupled with a processor, the current deceleration signal comprising current deceleration data representative of a current deceleration value being executed by the combination vehicle. The braking control method further comprises receiving a deceleration command signal at a deceleration command input operatively coupled with the processor, the deceleration command signal comprising deceleration command data representative of a deceleration command value. The braking control method further comprises storing control logic in a non-transient memory device operatively coupled with the processor, and performing by the processor executing the control logic stored in the non-transient memory device a comparison between the current deceleration value and the deceleration command value. The braking control method further comprises determining by the processor executing the control logic stored in the non-transient memory device a braking mode of the one or more towed vehicles of the combination vehicle as a one of a non-enhanced braking mode applying a first level of braking to the one or more towed vehicles in a predetermined reduced proportion relative to the level of braking being applied to the towing vehicle, or an enhanced braking mode applying a second level of braking to the one or more towed vehicles greater than the first level of braking. The non-enhanced braking mode is determined in accordance with a first result of the comparison between the current deceleration value and the deceleration command value. The enhanced braking mode is determined in accordance with a second result of the comparison between the current deceleration value and the deceleration command value, the second result of the comparison being different than the first result of the comparison. The control logic selectively determines a first brake control transmission signal to effect the deceleration command value in accordance with the non-enhanced braking mode based on the first result of the comparison between the current deceleration value and the deceleration command value. The control logic selectively determines a second brake control transmission signal to effect the deceleration command value in accordance with the enhanced braking mode based on the second result of the comparison between the current deceleration value and the deceleration command value.

Figure 7:
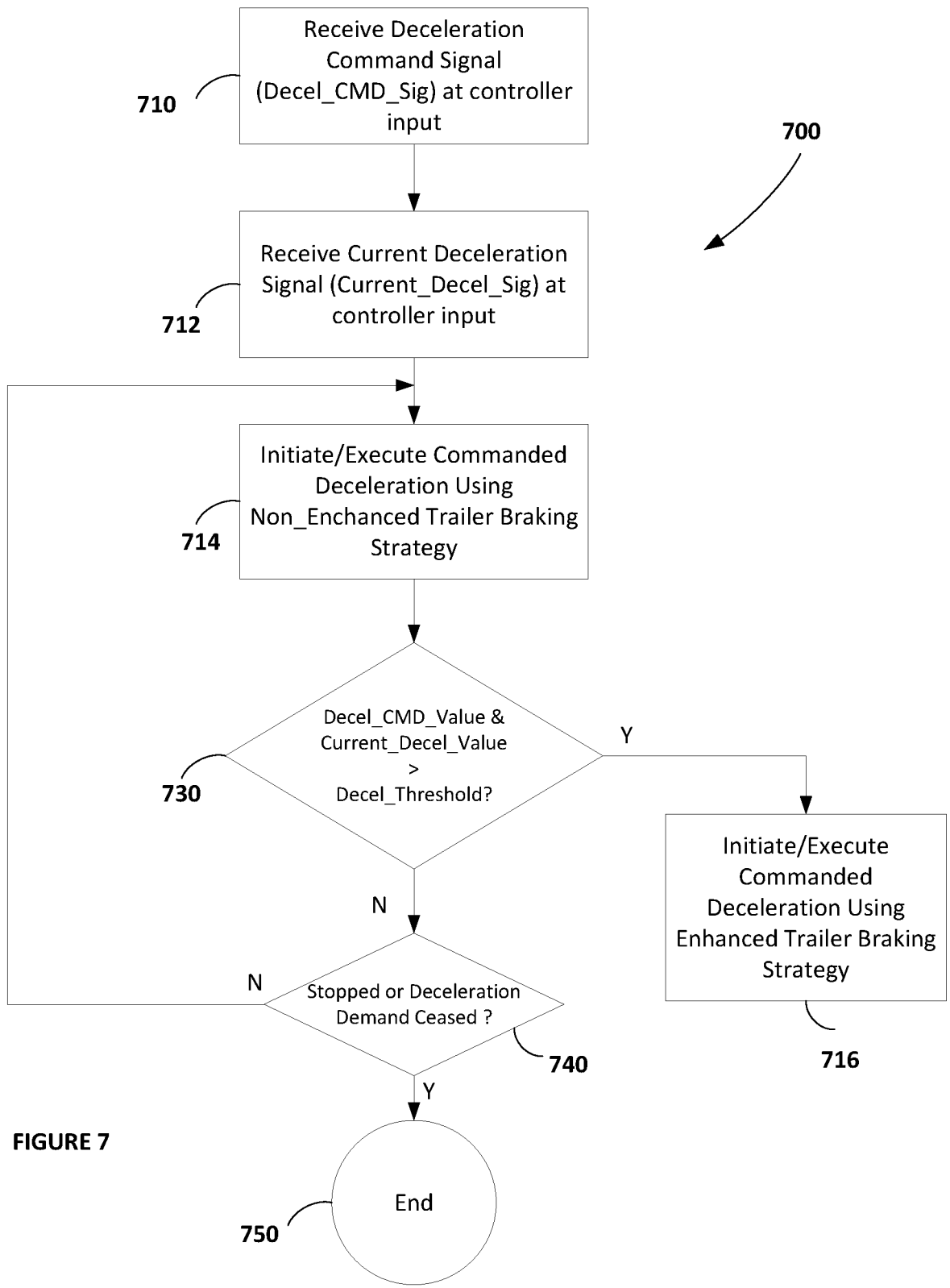
FIG. 7 is a flow diagram showing a method of initiating a trailer braking strategy by the towing vehicle controller in accordance with a further example embodiment.

In accordance with the above, FIG. 7 is a flow diagram showing a method 700 of initiating a trailer braking strategy by the towing vehicle controller in accordance with a further example embodiment. With reference now to that Figure, a current deceleration signal is received at step 710 at a controller current deceleration input operatively coupled with the processor. In this example embodiment, the current deceleration signal comprises current deceleration data representative of a current deceleration value being executed by the combination vehicle. A deceleration command signal is received at step 720 at a controller deceleration command input operatively coupled with the processor. The deceleration command signal comprises deceleration command data representative of a deceleration command value.

In order to best immediately execute the commanded deceleration, a trailer non-enhanced braking strategy is initiated in step 714. The trailer non-enhanced braking strategy is initiated in the example embodiment first by determining the braking mode of the one or more towed vehicles of the combination vehicle as the non-enhanced braking mode and then selectively generating, based on an assumed result of comparisons to be described below, a first brake control transmission signal to effect the deceleration command value in accordance with the non-enhanced braking mode of operation.

As described above, the non-transient memory device operatively coupled with the processor stores braking deceleration threshold data representative of a predetermined threshold deceleration rate value (Decel_Threshold) related to a deceleration rate of the combination vehicle when operating in a non-enhanced braking mode applying a first level of braking force to the one or more towed vehicles in a predetermined reduced proportion relative to the level of braking force applied to the towing vehicle. As related to the method 700 of this example embodiment, the non-enhanced braking mode is determined in accordance with a first result of a comparison between the current deceleration value and the deceleration command value relative to the predetermined threshold deceleration rate value. On the other hand, the enhanced braking mode is determined at step 716 in accordance with a second result of the comparison between the current deceleration value and the deceleration command value relative to the predetermined threshold deceleration rate value, wherein the enhanced braking mode applies a second level of braking force to the one or more towed vehicles greater than the first level of braking force.

The control logic is operable to selectively generate, based on the first result of the comparison between the current deceleration value and the deceleration command value relative to the predetermined threshold deceleration rate value, a first brake control transmission signal to effect the deceleration command value in accordance with the non-enhanced braking mode of operation. Further, the control logic is operable to selectively generate, based on the second result of the comparison between the current deceleration value and the deceleration command value relative to the predetermined threshold deceleration rate value, a second brake control transmission signal to effect the deceleration command value in accordance with the enhanced braking mode of operation.

A deceleration sensor is provided in the example embodiment operatively coupled with the processor and with the controller current deceleration input. The deceleration sensor senses a deceleration of the combination vehicle and generates the current deceleration signal comprising the current deceleration data representative of the current deceleration value being executed by the combination vehicle. The control logic stored in the non-transient memory device is executable by the processor to determine the braking mode of the one or more towed vehicles of the combination vehicle as the one of the non-enhanced braking mode in accordance with a sum of the current deceleration value and the deceleration command value being less than the predetermined threshold deceleration rate value, or the enhanced braking mode in accordance with a sum of the current deceleration value and the deceleration command value being greater than the predetermined threshold deceleration rate value.

The braking control device 22 of the embodiment may further include in accordance with a further example embodiment a brake signal output 58 operatively coupled with the processor, the brake signal output selectively transmitting a one of the first or second brake control transmission signals from the braking control device. The braking control device further includes brake pedal timeout data stored in the non-transient memory device, the brake pedal timeout data being representative of a predetermined response time for a physical actuation of a brake pedal by an associated operator of the towing vehicle. The braking control device further includes a brake pedal actuation input operatively coupled with the processor. The brake pedal actuation input selectively receives from an associated brake pedal sensor a brake pedal actuation signal comprising brake pedal actuation data representative of the physical actuation of the brake pedal by the associated operator of the towing vehicle. In the example embodiment the control logic is executable by the processor to, responsive to determining the enhanced braking mode generate a brake warning signal including brake warning data representative of an imminent need for the combination vehicle to perform a deceleration maneuver in excess of the deceleration rate of the combination vehicle for operating the combination vehicle in the non-enhanced braking mode, reset a pedal wait count time value stored in the non-transient memory device to a reset time value, initiate a pedal timer incrementing the pedal wait count time value from the reset time value, selectively transmit the first brake control transmission signal via the brake signal output responsive to the pedal wait count time value being less than the predetermined response time without receiving the brake pedal actuation signal, and selectively transmit the second brake control transmission signal in lieu of the first brake control transmission signal via the brake signal output responsive to the pedal wait count time value being greater than the predetermined response time.

The braking control device 22 of the embodiment may further include in accordance with a further example embodiment a transmitter device 250 operatively coupled with the processor. The transmitter device is configured to receive message data and to transmit the message data as a message signal comprising the message data. The transmitter device selectively receives the brake warning data and transmits the brake warning data as a brake warning signal comprising the brake warning data to an associated receiver of an associated vehicle other than the towing and one or more towed vehicles.

Figure 8A:
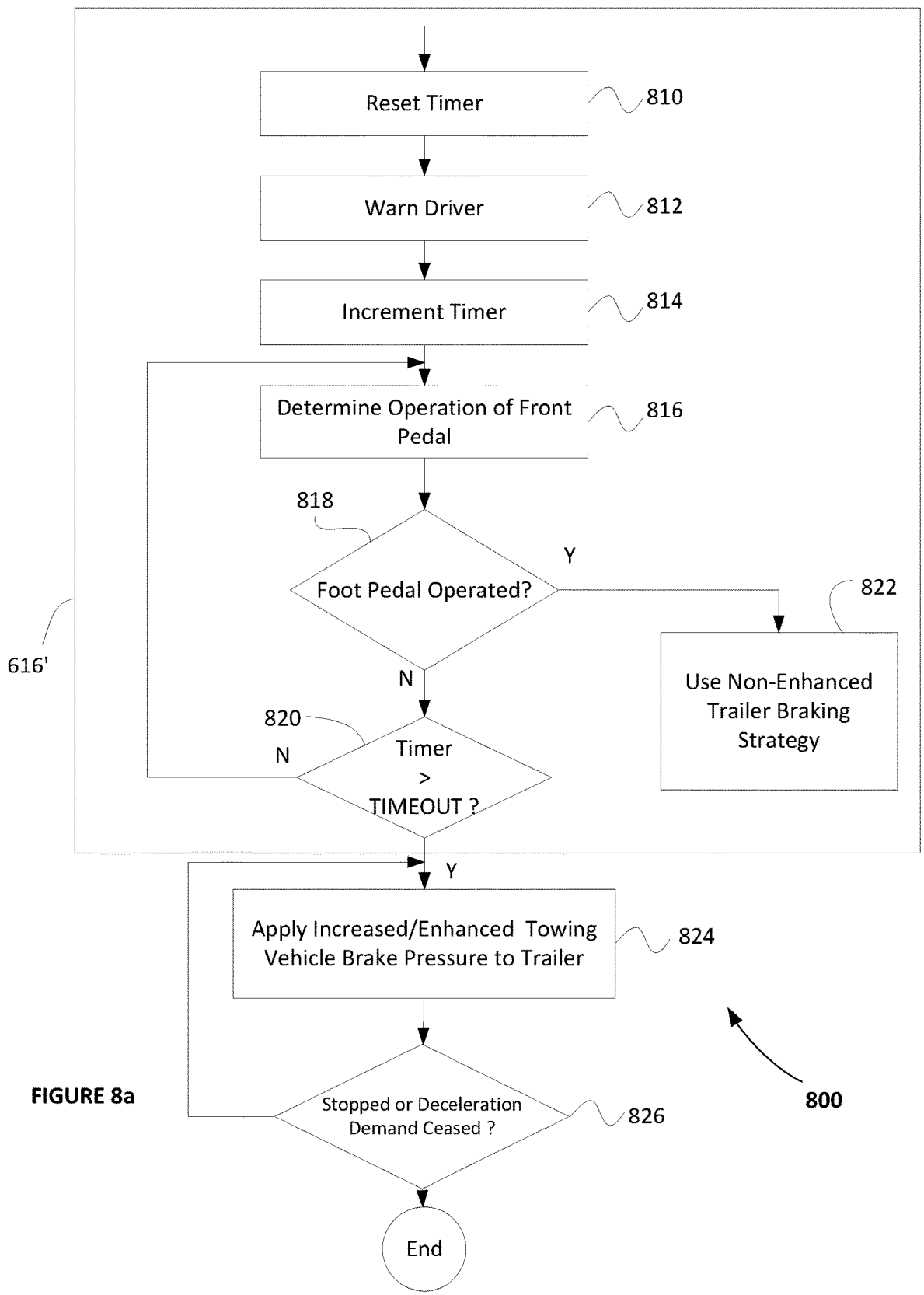
FIG. 8a is a flow diagram showing a method of implementing a trailer braking strategy for platooning that is sensitive to an operation of a brake pedal by an operator of the towing vehicle in accordance with an example embodiment accordance with an example embodiment.

In accordance with the above, FIG. 8a is a flow diagram showing a method 800 of implementing a trailer braking strategy that is sensitive to an operation of a brake pedal by an operator of the towing vehicle in accordance with an example embodiment accordance with an example embodiment. The method includes an alternative version 616' of the enhanced braking mode of operation 616 described above in connection with FIG. 6. In preparation for the method 800, brake pedal timeout data is stored in the non-transient memory device 240 of the vehicle controller 22. In The brake pedal timeout data is representative of a predetermined pedal response time for a physical actuation of a brake pedal by an associated operator of the towing vehicle.

At step 810 a pedal wait count value stored in the non-transient memory device 240 is reset. A driver warning signal is generated at step 812, and the pedal wait count value of the pedal timer is incremented at step 814. In the example embodiment the brake warning signal comprises brake warning data representative of an imminent need for the towed and towing vehicle combination to perform a deceleration maneuver. In a further embodiment, the brake warning signal comprises brake warning data representative of an imminent need for the towed and towing vehicle combination to perform a deceleration maneuver in excess of a predetermined maximum deceleration rate stored in the non-transient memory device 240.

A controller brake pedal actuation input is provided on the towing vehicle controller 22 for receiving a brake pedal actuation signal comprising brake pedal actuation data representative of the physical actuation of the brake pedal by the associated operator of the towing vehicle. In the method 800 of this example embodiment, overall, the first brake control transmission signal is transmitted via the controller brake signal output responsive to the pedal wait count value being less than the predetermined pedal response time without receiving the brake pedal actuation signal, and the second brake control transmission signal is transmitted in lieu of (in place/instead of) the first brake control transmission signal via the controller brake signal output responsive to a first to occur of receiving the brake pedal actuation signal or the pedal wait count value being greater than the predetermined pedal response time.

With the above in mind then, the controller 22 determines at step 818 whether the brake foot pedal has been operated by the driver of the towing vehicle. If the brake pedal is actuated before the timer is determined at step 820 to be timed out, the controller selectively determines the non-enhanced braking mode 822 of operation applying modulated brake pressure of the towing vehicle to the one or more towed vehicles. On the other hand, if the brake pedal is not actuated before the timer is determined at step 820 to be timed out, the controller selectively determines the enhanced braking mode 824 of operation applying unmodulated full brake pressure of the towing vehicle to the one or more towed vehicles.

The method 800 of the example embodiment ends when the towing and one or more towed vehicles come to a stop or when the demand for deceleration ceases.

In accordance with an embodiment, a further braking control method is provided for use in an associated towing vehicle towing one or more associated towed vehicles as a combination vehicle for enabling brake control enhancement to the one or more towed vehicles relative to a level of braking applied to the towing vehicle. The braking control method includes receiving at a forward relative distance input operatively coupled with a processor a forward relative distance signal comprising forward relative distance data representative of a forward relative distance between the towing vehicle of the combination vehicle and an associated vehicle traveling forward of the combination vehicle. The method further includes storing braking deceleration threshold data in a non-transient memory device operatively coupled with the processor, the braking deceleration threshold data being representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle. Control logic stored in the non-transient memory device is executed by the processor to determine a forward relative speed between the towing vehicle of the combination vehicle and the associated vehicle traveling forward of the combination vehicle, determine in accordance with the forward relative distance and the forward relative speed an automatic deceleration command value required to mitigate a chance of a collision between the towing vehicle of the combination vehicle and the associated vehicle traveling forward of the towing vehicle, perform a comparison between the predetermined threshold deceleration rate value and the automatic deceleration command value, determine a braking mode of the one or more towed vehicles of the combination vehicle as a one of the non-enhanced braking mode applying the first level of braking to the one or more towed vehicles in accordance with a first result of the comparison between the predetermined threshold deceleration rate value and the automatic deceleration command value, or an enhanced braking mode applying a second level of braking to the one or more towed vehicles greater than the first level of braking in accordance with a second result of the comparison between the predetermined threshold deceleration rate value and the automatic deceleration command value, the second result of the comparison being different than the first result of the comparison. Then, responsive to receiving the deceleration command signal, the control logic is executed by the processor to selectively generate, based on the first result of the comparison between the predetermined threshold deceleration rate value and the automatic deceleration command value, a first brake control transmission signal to effect the automatic deceleration command value in accordance with the non-enhanced braking mode, and selectively generate, based on the second result of the comparison between the predetermined threshold deceleration rate value and the automatic deceleration command value, a second brake control transmission signal to effect the automatic deceleration command value in accordance with the enhanced braking mode.

In accordance with an embodiment, a further braking control method is provided for use in an associated towing vehicle towing one or more associated towed vehicles as a combination vehicle for enabling brake control enhancement to the one or more towed vehicles relative to a level of braking applied to the towing vehicle. The braking control method includes receiving by a forward relative distance input operatively coupled with a processor a forward relative distance signal comprising forward relative distance data representative of a forward relative distance between the towing vehicle of the combination vehicle and an associated vehicle traveling forward of the combination vehicle, determining based on the forward relative distance by control logic stored in a non-transient memory device and executable by a processor a forward relative speed between the towing vehicle of the combination vehicle and the associated vehicle traveling forward of the combination vehicle, determining by the control logic in accordance with the forward relative distance and the forward relative speed, an automatic deceleration command value required to mitigate a chance of a collision between the towing vehicle of the combination vehicle and the associated vehicle traveling forward of the towing vehicle, performing by the control logic a comparison between the forward relative distance and an automated deceleration distance resulting from executing the automatic deceleration command value by the combination vehicle, determining by the control logic a braking mode of the one or more towed vehicles of the combination vehicle as a one of a non-enhanced braking mode applying a first level of braking to the one or more towed vehicles in a predetermined reduced proportion relative to the level of braking being applied to the towing vehicle in accordance with a first result of the comparison between the forward relative distance and the automated deceleration distance resulting from executing the automatic deceleration command value by the combination vehicle, or an enhanced braking mode applying a second level of braking to the one or more towed vehicles greater than the first level of braking in accordance with a second result of the comparison between the forward relative distance and the automated deceleration distance resulting from executing the automatic deceleration command value by the combination vehicle, the second result of the comparison being different than the first result of the comparison, selectively generating, based on the first result of the comparison between the forward relative distance and the automated deceleration distance resulting from executing the automatic deceleration command value by the combination vehicle, a first brake control transmission signal to effect the automatic deceleration command value in accordance with the non-enhanced braking mode, and selectively generating, based on the second result of the comparison between the forward relative distance and the automated deceleration distance resulting from executing the automatic deceleration command value by the combination vehicle, a second brake control transmission signal to effect the automatic deceleration command value in accordance with the enhanced braking mode.

Figure 8B:
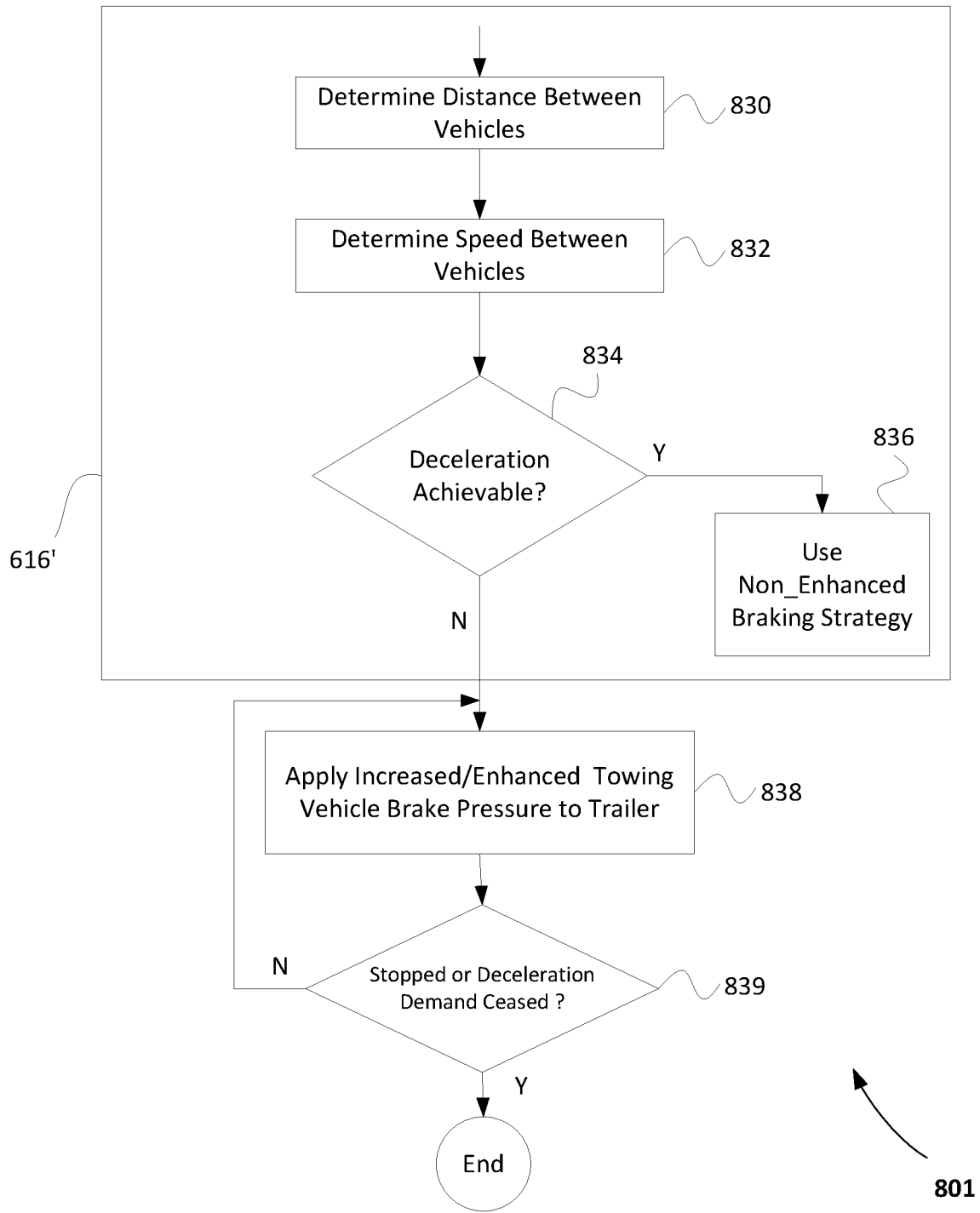
FIG. 8b is a flow diagram showing a method of implementing a trailer braking strategy for platooning that is sensitive to a relative speed and a relative distance between the towing vehicle and a vehicle forward of the towing vehicle in accordance with an example embodiment.

In accordance with the above, FIG. 8b is a flow diagram showing a method 801 of implementing a trailer braking strategy for platooning that is sensitive to a relative speed and a relative distance between the towing vehicle and a vehicle forward of the towing vehicle in accordance with an example embodiment. The method includes an alternative version 616" of the enhanced braking mode of operation 616 described above in connection with FIG. 6. The controller 22 includes a relative forward distance input for receiving a forward relative distance signal comprising forward relative distance data representative of a forward relative distance between the towing vehicle of the towed and towing vehicle combination and an associated vehicle traveling forward of the towing vehicle. The controller 22 is operable then in step 830 to determine a forward relative distance between the towing vehicle and the associated vehicle traveling forward of the towing vehicle. The control logic is further operable in step 832 to determine a relative speed between the towing vehicle of the towed and towing vehicle combination and the associated vehicle traveling forward of the towing vehicle.

In the method 801, in accordance with one example, an automatic deceleration command value is determined in accordance with the forward relative distance and the relative speed. The automatic deceleration command value is a deceleration operation value required to mitigate a chance of a collision between the towing vehicle of the combination vehicle and the associated vehicle traveling forward of the towing vehicle. Also in the method and in accordance with a further alternative example, a decision is made at step 834 on whether the determined automatic deceleration command value required to mitigate a chance of a collision between the towing vehicle of the combination vehicle and the associated vehicle traveling forward of the towing vehicle is achievable.

The wherein the control logic is operable to, responsive to determining the automatic deceleration command value selectively determine in step 836 the non-enhanced braking mode of operation applying modulated brake pressure of the towing vehicle to the towed vehicle or selectively determine in step 838 the enhanced braking mode of operation applying unmodulated full brake pressure of the towing vehicle to the towed vehicle.

The method 801 of the example embodiment ends when the towing and one or more towed vehicles come to a stop or when the demand for deceleration ceases.

Figure 8C:
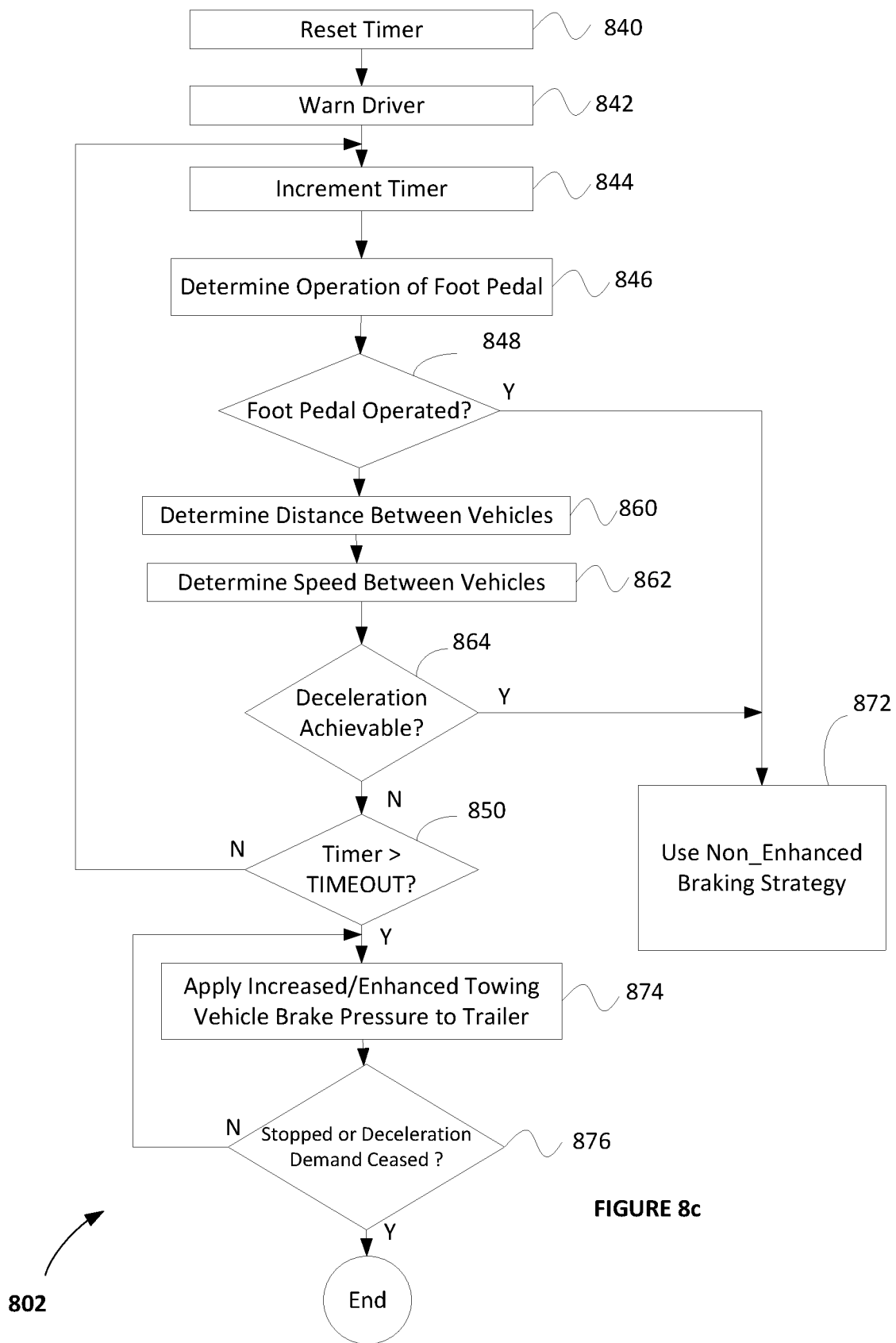
FIG. 8c is a flow diagram showing a method of implementing a trailer braking strategy for platooning that is sensitive to an operation of the brake pedal by the operator of the towing vehicle and to relative speed and distance parameters between the towing vehicle and a vehicle forward of the towing vehicle in accordance with an example embodiment.

FIG. 8c is a flow diagram showing a method 802 of implementing a trailer braking strategy for platooning that is sensitive to both an operation of the brake pedal by the operator of the towing vehicle and to relative speed and distance parameters between the towing vehicle and a vehicle forward of the towing vehicle in accordance with an example embodiment. In that regard, the method 802 of the example embodiment is at one level a combination of the braking control methods discussed above in connection with FIGS. 8a and 8b.

In preparation for the method 802, brake pedal timeout data is stored in the non-transient memory device 240 of the vehicle controller 22. In The brake pedal timeout data is representative of a predetermined pedal response time for a physical actuation of a brake pedal by an associated operator of the towing vehicle.

At step 840 a pedal wait count value stored in the non-transient memory device 240 is reset. A driver warning signal is generated at step 842, and the pedal wait count value of the pedal timer is incremented at step 844. In the example embodiment the brake warning signal comprises brake warning data representative of an imminent need for the towed and towing vehicle combination to perform a deceleration maneuver. In a further embodiment, the brake warning signal comprises brake warning data representative of an imminent need for the towed and towing vehicle combination to perform a deceleration maneuver in excess of a predetermined maximum deceleration rate stored in the non-transient memory device 240.

A controller brake pedal actuation input is provided on the towing vehicle controller 22 for receiving a brake pedal actuation signal comprising brake pedal actuation data representative of the physical actuation of the brake pedal by the associated operator of the towing vehicle. In the method 802 of this example embodiment, overall, the first brake control transmission signal is transmitted via the controller brake signal output responsive to the pedal wait count value being less than the predetermined pedal response time without receiving the brake pedal actuation signal, and the second brake control transmission signal is transmitted in lieu of (in place/instead of) the first brake control transmission signal via the controller brake signal output responsive to a first to occur of receiving the brake pedal actuation signal or the pedal wait count value being greater than the predetermined pedal response time.

With the above in mind then, the controller 22 receives a brake pedal actuation signal at step 846 and determines at step 848 whether the brake foot pedal has been operated by the driver of the towing vehicle. If the brake pedal is actuated before the timer is determined at step 850 to be timed out, the controller selectively determines the non-enhanced braking mode 872 of operation applying modulated brake pressure of the towing vehicle to the one or more towed vehicles. On the other hand, if the brake pedal is not actuated before the timer is determined at step 850 to be timed out, the controller selectively determines the enhanced braking mode 874 of operation applying unmodulated full brake pressure of the towing vehicle to the one or more towed vehicles.

The controller 22 includes a relative forward distance input for receiving a forward relative distance signal comprising forward relative distance data representative of a forward relative distance between the towing vehicle of the towed and towing vehicle combination and an associated vehicle traveling forward of the towing vehicle. The controller 22 is operable then in step 860 to determine a forward relative distance between the towing vehicle and the associated vehicle traveling forward of the towing vehicle. The control logic is further operable in step 862 to determine a relative speed between the towing vehicle of the towed and towing vehicle combination and the associated vehicle traveling forward of the towing vehicle.

In the method 802, in accordance with the example, an automatic deceleration command value is determined in accordance with the forward relative distance and the relative speed. The automatic deceleration command value is a deceleration value required to mitigate a chance of a collision between the towing vehicle of the combination vehicle and the associated vehicle traveling forward of the towing vehicle. Also in the method and in accordance with a further alternative example, a decision is made at step 864 on whether the determined automatic deceleration command value required to mitigate a chance of a collision between the towing vehicle of the combination vehicle and the associated vehicle traveling forward of the towing vehicle is achievable.

The wherein the control logic is operable to, responsive to determining the automatic deceleration command value selectively determine in step 872 the non-enhanced braking mode of operation applying modulated brake pressure of the towing vehicle to the one or more towed vehicles or selectively determine in step 874 the enhanced braking mode of operation applying unmodulated full brake pressure of the towing vehicle to the one or more towed vehicles.

The method 802 of the example embodiment ends when the towing and one or more towed vehicles come to a stop or when the demand for deceleration ceases.

Figure 9:
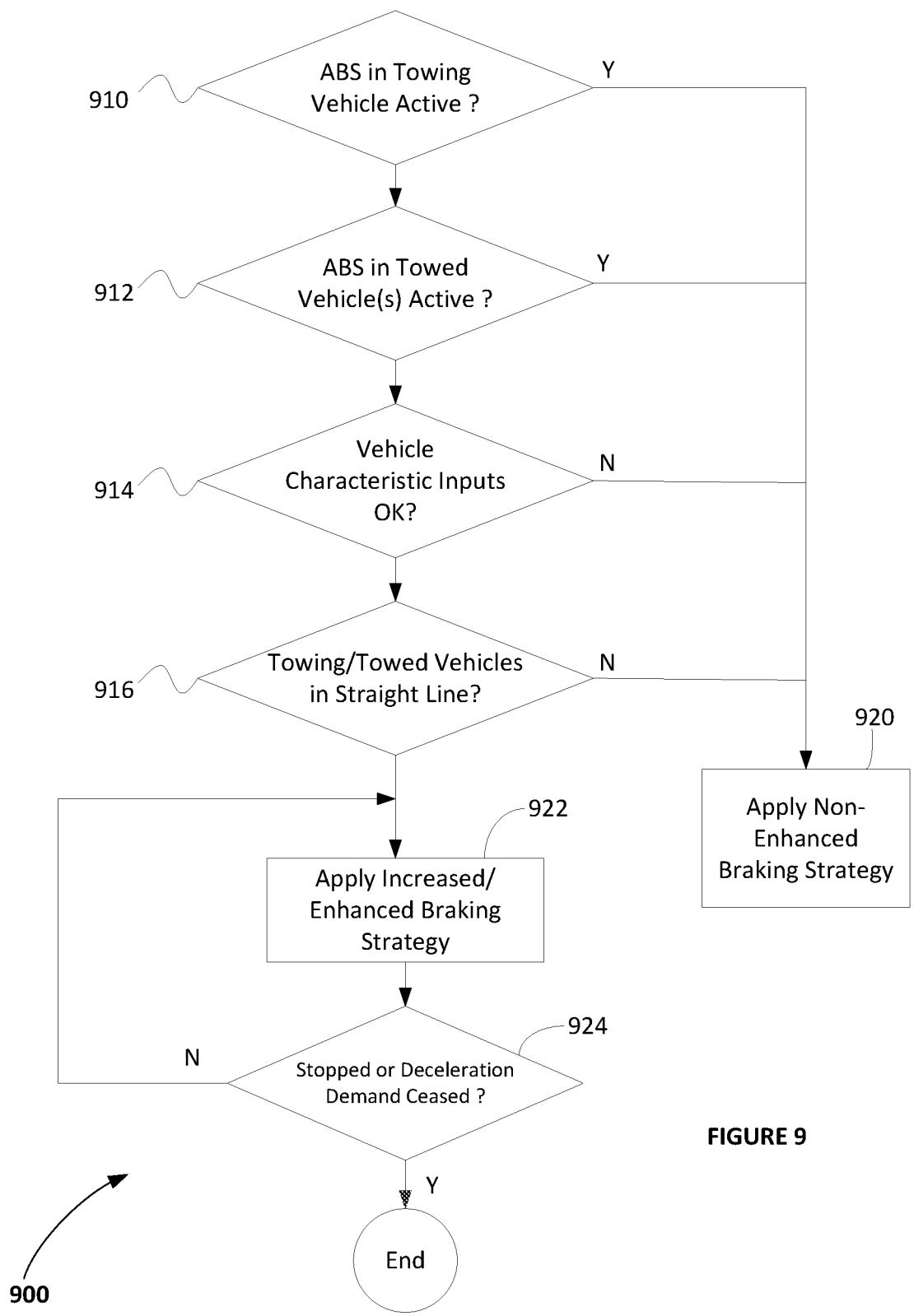
FIG. 9 is a flow diagram showing a method of implementing a trailer braking strategy for platooning that is sensitive to capabilities and dynamic performance data related to the towing and towed vehicle combination of FIG. 3 in accordance with an example embodiment

FIG. 9 is a flow diagram showing a method 900 of implementing a trailer braking strategy for platooning that is sensitive to capabilities and dynamic performance data related to the towing and towed vehicle combination of FIG. 3 in accordance with an example embodiment The vehicle antilock braking system (ABS) sensor is operable to sense activations of an ABS system of the associated vehicle during the plural activations of the braking system, and generate plural ABS data representative of the sensed ABS activations. Based on this, the logic of the control unit is executable by the processor to generate a brake control transmission signal to effect a deceleration command value received from a leading platooning vehicle in accordance with the determined braking mode of operation.

The towing vehicle controller 22 of the example embodiment includes a controller trailer capability input for receiving a trailer automated braking system (ABS) capability signal from the one or more towed vehicles and a controller brake signal output for selectively transmitting a one of first or second brake control transmission signals to the one or more towed vehicles. The trailer ABS capability signal comprising trailer capability data representative of an ABS capability of the towed vehicle. The control logic of the controller 22 is operable to determine at step 910 whether the ABS is active in the towing vehicle and, if active, to selectively determine at step 920 the non-enhanced braking mode of operation applying modulated brake pressure of the towing vehicle to the one or more towed vehicles. The control logic of the controller 22 is further operable to, responsive to receiving the trailer ABS capability signal, determine at step 912 whether the ABS is active in any of the one or more towed vehicles and, if active, to selectively determine at step 920 the non-enhanced braking mode of operation applying modulated brake pressure of the towing vehicle to the one or more towed vehicles.

The control logic of the controller 22 is further operable to determine a compatibility of the plural braking modes with one or more vehicle characteristic inputs such as, for example, a determined coefficient of adhesion between the towing and towed vehicle combination and the associated roadway. In this regard, the one or more vehicle characteristic inputs of the towing and towed vehicle combination is determined in step 914. If the determined values of the one or more vehicle characteristic inputs are inadequate, the controller 22 selectively determines at step 920 the non-enhanced braking mode of operation applying modulated brake pressure of the towing vehicle to the one or more towed vehicles.

In determining the adequacy of the coefficient of adhesion between the towing and towed vehicle combination and the associated roadway as an example of the one or more vehicle characteristic inputs, the controller receives in the example embodiment set of one or more controller vehicle characteristic inputs. To this end, the controller 22 includes a controller towed and towing vehicle combination load input and a controller wheel slip input. The controller towed and towing vehicle combination load input receives a load signal comprising load data representative of an overall combined weight of the towed and towing vehicle combination. The controller wheel slip input receives a wheel slip signal comprising wheel slip data representative of wheel slippage of one or more wheels of the towing and towed vehicles. In the example embodiment, the control logic of the controller is operable to determine the coefficient of adhesion based on the overall combined weight and the wheel slippage. Further, a dynamic stability value of the towed and towing vehicle combination in accordance with the load and wheel slip data is determined, wherein the dynamic stability value is used to select by the controller the trailer braking strategy.

In a further example embodiment, the set of one or more controller vehicle characteristic inputs receive a corresponding set of vehicle characteristic signals, each of the set of vehicle characteristic signals comprising vehicle characteristic data representative of the physical characteristic of the towing vehicle. The control logic of the controller is operable to determine a dynamic stability value of the towed and towing vehicle combination in accordance with the set of vehicle characteristic data representative of the physical characteristic of the towing. The control logic is operable to selectively determine the non-enhanced braking mode of operation applying modulated full brake pressure of the towing vehicle to the towed vehicle in accordance with a result of a comparison between a predetermined towed and towing vehicle combination stability value stored in the non-transient memory device 240 and the dynamic stability value.

In a further example embodiment, the set of one or more controller vehicle characteristic inputs includes a controller towed and towing vehicle combination yaw rate input for receiving a yaw rate signal comprising yaw rate data representative of a yaw rate of the towed and towing vehicle combination. The control logic of the controller is operable to determine the dynamic stability value of the towed and towing vehicle combination in accordance with the yaw rate data.

In a further example embodiment, the non-transient memory device of the braking control device stores a set of desired dynamic stability values as a dynamic stability map 241 representative of a mapping of a set of values of one or more vehicle characteristics such as yaw rate, steering angle, lateral acceleration, wheel speed, and curvilinear travel path characteristics, for example, onto a plurality of instantaneous stability values representative of a corresponding plurality of instantaneous stability determinations of the combination vehicle relative to a range of operating conditions of the combination vehicle. In an example embodiment, the braking control device includes inputs for receiving signals representative of the set of one or more vehicle characteristics. The braking control device includes a load input for receiving from one or more associated load sensors a weight signal comprising weight data representative of a weight of a selected portion of the combination vehicle. The braking control device further includes a towed and/or towing vehicle combination yaw rate input for receiving from one or more associated yaw sensors a yaw rate signal comprising yaw rate data representative of a yaw rate of one or more of the towed and/or towing vehicles. The braking control device further includes a steering angle input for receiving from one or more associated steering angle sensors a steering angle signal comprising steering angle data representative of a steering angle of a steerable wheel of the towing vehicle. The braking control device further includes a lateral acceleration input for receiving from one or more associated acceleration sensors a lateral acceleration signal comprising lateral acceleration data representative of a lateral acceleration of the towed and/or towing vehicles. The braking control device further includes a wheel speed input for receiving from one or more associated wheel speed sensors a wheel speed signal comprising wheel speed data representative of wheel speed of one or more wheels of the towing and/or the one or more towed vehicles. In an example embodiment, the control logic is executable by the processor of the braking control device to determine the curvilinear travel path characteristics of the combination vehicle by combining and processing one or more of the values of the yaw rate, steering angle, lateral acceleration, and wheel speed inputs. In an example embodiment, the control logic is executable by the processor of the braking control device to determine the dynamic stability value of the combination vehicle by applying the set of one or more vehicle characteristic inputs to the dynamic stability map 241, and assigning an output of the mapping to the dynamic stability value. In an embodiment, the load input of the set of one or more vehicle characteristic inputs may comprise a combination vehicle load input for receiving an overall combined weight signal comprising overall combined weight data representative of an overall combined weight of the combination vehicle. In an embodiment, the load input of the set of one or more vehicle characteristic inputs may comprise an allocated vehicle load input for receiving an allocated weight signal comprising weight data representative of a weight allocated to a selected portion of the combination vehicle.

In addition and in accordance with a further example embodiment, the control logic is operable to determine a dynamic stability value of the towed and towing vehicle combination in accordance with a relative alignment value. If the determined relative alignment value and/or the dynamic stability value is inadequate, the controller 22 selectively determines at step 920 the non-enhanced braking mode of operation applying modulated brake pressure of the towing vehicle to the one or more towed vehicles. In this example embodiment, the controller 22 has a set of one or more controller vehicle characteristic inputs. A controller towed and towing vehicle combination yaw rate input is provided for receiving a yaw rate signal comprising yaw rate data representative of a yaw rate of the towed and towing vehicle combination. A controller steering angle input is provided for receiving a steering angle signal comprising steering angle data representative of a steering angle of a steerable wheel of the towing vehicle. A controller wheel speed input is provided for receiving a wheel speed signal comprising wheel speed data representative of wheel speed of one or more wheels of the towing and towed vehicles. The control logic 231 of the controller 22 is operable to determine a relative alignment value representative of a relative alignment between the towed vehicle and the towing vehicle of the towed and towing vehicle combination in accordance with the yaw rate data, the steering angle data, and the wheel speed data. Then, the controller 22 selectively determines at step 920 the non-enhanced braking mode of operation applying modulated brake pressure of the towing vehicle to the one or more towed vehicles in accordance with one or more values of the result of the dynamic stability value calculation and/or the relative alignment value representative of the relative alignment between the towed vehicle and the towing vehicle of the towed and towing vehicle combination.

If the ABS is inactive on both the towing vehicle as well as on the towed vehicle(s), and if the coefficient of adhesion is adequate, and if the relative alignment value indicates an adequate relative alignment between the towed vehicle(s) and the towing vehicle, the controller determines the enhanced braking mode of operation applying unmodulated full brake pressure of the towing vehicle to the one or more towed vehicles.

The method 900 of the example embodiment ends when the towing and one or more towed vehicles come to a stop or when the demand for deceleration ceases.

In accordance with an embodiment, the braking control device 22 includes at least one brake control output operatively coupled with the processor and with an associated brake control actuator of the associated towing vehicle. The associated brake control actuator is configured to deliver brake pressure to the one or more towed vehicles in response to an actuator control signal delivered to the associated brake control actuator by the braking control device 22 via the brake control output. In one embodiment the actuator control signal delivered to the associated brake control actuator by the braking control device 22 via the brake control output is an electric actuator control signal. In another embodiment the actuator control signal delivered to the associated brake control actuator by the braking control device 22 via the brake control output is a wireless actuator control signal. In yet another embodiment the actuator control signal delivered to the associated brake control actuator by the braking control device 22 via the brake control output is a pneumatic actuator control signal.

In accordance with an embodiment, the control logic of the braking control device 22 is executable by the processor of the braking control device 22 to implement the enhanced braking mode by controlling the electric and/or wireless and/or pneumatic actuator control signal to modify high pulse times of a modulated brake pressure applied by the towing vehicle to the one or more towed vehicles via the associated brake control actuator.

In accordance with an embodiment, the control logic of the braking control device 22 is executable by the processor of the braking control device 22 to implement the enhanced braking mode by controlling the electric and/or wireless and/or pneumatic actuator control signal to modify low pulse times of a modulated brake pressure applied by the towing vehicle to the one or more towed vehicles via the associated brake control actuator.

In accordance with an embodiment, the control logic of the braking control device 22 is executable by the processor of the braking control device 22 to implement the enhanced braking mode by controlling the electric and/or wireless and/or pneumatic actuator control signal to increase values of one or more pulses of a modulated brake pressure applied by the towing vehicle to the one or more towed vehicles via the associated brake control actuator.

FIGS. 10a-10c illustrate a technique for transitioning trailer braking control from a non-enhanced or normal operational trailer braking mode to an enhanced operational mode by varying by increasing a pulse ON time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by increasing a high or ON pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by increasing a high or ON pulse time from having a pulse period of T1 and an amplitude of M as shown in FIG. 10a, to having a pulse period of (T1+t1) and an amplitude of M as shown in FIG. 10b. The towing vehicle controller 22 according to the example embodiment is further operable to implement the enhanced braking mode of operation by increasing the high or ON pulse time from having the pulse period of (T1+t1) and the amplitude of M as shown in FIG. 10b to having a pulse period of (T1+tn) and the amplitude of M as shown in FIG. 10c.

FIGS. 11a-11c illustrate a technique for transitioning trailer braking control from a non-enhanced or normal operational trailer braking mode to an enhanced operational mode by varying by decreasing a pulse OFF time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by decreasing a low or OFF pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by decreasing a low or OFF pulse time from having a low or OFF pulse period of P1 and an amplitude of M as shown in FIG. 11a, to having a low of OFF pulse period of (P1+p1) and an amplitude of M as shown in FIG. 11b. The towing vehicle controller 22 according to the example embodiment is further operable to implement the enhanced braking mode of operation by decreasing the low or OFF pulse time from having the pulse period of (P1+p1) and the amplitude of M as shown in FIG. 11b to having a pulse period of (P1+pn) and the amplitude of M as shown in FIG. 11c.

FIG. 12a illustrates a technique for providing a non-enhanced or normal operational trailer braking mode by generating a series of similar brake control pulses at regular intervals by the towing vehicle controller of FIG. 1 and delivered to the one or more trailing unit(s) of the towing and towed vehicle combination of FIG. 3 in accordance with an example embodiment.

FIG. 12b illustrates a technique for transitioning trailer braking control from a non-enhanced or normal operational trailer braking mode to an enhanced operational mode by varying by increasing an initial pulse ON time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by increasing a high or ON pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by increasing a high or ON pulse time from having a pulse period of T1 and an amplitude of M as shown in FIG. 12a, to having a pulse period for a first pulse of (T1+at1) and an amplitude of M and having a pulse period of T1 and an amplitude of M for subsequent pulses as shown in FIG. 12b. The towing vehicle controller 22 according to the example embodiment is further operable to implement the enhanced braking mode of operation by increasing the high or ON pulse time for plural initial pulses from having the pulse period of T1 and the amplitude of M as shown in FIG. 12a to having a pulse period of T1+a1 as may be necessary or desired to suitably effect the transition from the non-enhanced braking mode of operation to the enhanced braking mode of operation.

FIG. 12c illustrates a technique for transitioning trailer braking control from a non-enhanced or normal operational trailer braking mode to an enhanced operational mode by varying by increasing an initial pulse amplitude during an ON time that a brake command signal is generated by the towing vehicle controller of FIG. 1 and delivered to the one or more trailing unit(s) of the towing and towed vehicle combination of FIG. 3 in accordance with an example embodiment. For example, the towing vehicle controller 22 according to the example embodiment is operable to implement the enhanced braking mode of operation by increasing the pulse amplitude for the initial pulse from having an amplitude of M and a period of T1 as shown in FIG. 12a, to having an amplitude of (M+b) and having a pulse period of T1 as shown in FIG. 12c. The towing vehicle controller 22 according to the example embodiment is further operable to implement the enhanced braking mode of operation by increasing the pulse amplitude of M as shown in FIG. 12a to having the pulse amplitude of (M+b) for plural initial pulses as may be necessary or desired to suitably effect the transition from the non-enhanced braking mode of operation to the enhanced braking mode of operation.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description,

The invention claimed is:

1. A braking control device for use in an associated towing vehicle towing one or more associated towed vehicles as an associated combination vehicle for providing brake control enhancement to the one or more towed vehicles relative to a level of braking applied to the towing vehicle, the braking control device comprising:
   a processor;
   a deceleration command input operatively coupled with the processor, the deceleration command input receiving a deceleration command signal comprising deceleration command data representative of a deceleration command value;
   a non-transient memory device operatively coupled with the processor, the non-transient memory device storing braking deceleration threshold data representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle; and
   control logic stored in the non-transient memory device, the control logic being executable by the processor to:
      perform a comparison between the predetermined threshold deceleration rate value and the deceleration command value; and
      determine a braking mode of the one or more towed vehicles of the combination vehicle as a one of:
         the non-enhanced braking mode applying the first level of braking to the one or more towed vehicles in accordance with a first result of the comparison between the predetermined threshold deceleration rate value and the deceleration command value, or
         an enhanced braking mode applying a second level of braking to the one or more towed vehicles greater than the first level of braking in accordance with a second result of the comparison between the predetermined threshold deceleration rate value and the deceleration command value, the second result of the comparison being different than the first result of the comparison.

2. The braking control device according to claim 1, wherein the control logic stored in the non-transient memory device is executable by the processor to determine one or more platooning operational parameters of the combination vehicle in accordance with the determined braking mode of the one or more towed vehicles of the combination vehicle,
   wherein the control logic determines a platooning following distance to be maintained by the towing vehicle relative to an associated vehicle forward of the towing vehicle as a one or more of the platooning operational parameters in accordance with the determined braking mode by increasing the platooning following distance responsive to the non-enhanced braking mode being determined and by decreasing the platooning following distance responsive to the enhanced braking mode being determined,
   wherein the control logic determines a platooning travel speed limit to be maintained by the towing vehicle as a one or more of the platooning operational parameters in accordance with the determined braking mode by decreasing the platooning travel speed responsive to the non-enhanced braking mode being determined and by increasing the platooning travel speed responsive to the enhanced braking mode being determined,
   wherein the control logic determines a platooning participation gate of the towing vehicle as a one or more of the platooning operational parameters in accordance with the determined braking mode by not permitting the platooning participation responsive to the non-enhanced braking mode being determined and by permitting the platooning participation responsive to the enhanced braking mode being determined.

3. The braking control device according to claim 1, wherein the control logic is executable by the processor to, responsive to receiving the deceleration command signal:
   selectively generate, based on the first result of the comparison between the predetermined threshold deceleration rate value and the deceleration command value, a first brake control transmission signal to effect the deceleration command value in accordance with the non-enhanced braking mode; and
   selectively generate, based on the second result of the comparison between the predetermined threshold deceleration rate value and the deceleration command value, a second brake control transmission signal to effect the deceleration command value in accordance with the enhanced braking mode.

4. The braking control device according to claim 3, further comprising:
   a brake signal output operatively coupled with the processor, the brake signal output selectively transmitting a one of the first or second brake control transmission signals from the braking control device; and
   an anti-lock braking system (ABS) capability input operatively coupled with the processor, the ABS capability input selectively receiving an ABS functionality signal from the one or more towed vehicles of the combination vehicle, the ABS functionality signal comprising ABS functionality data representative of a functional ABS capability of the one or more towed vehicles of the combination vehicle,
   wherein the control logic is executable by the processor to, responsive to receiving the ABS functionality signal and to determining the enhanced braking mode:
      selectively transmit the second brake control transmission signal via the brake signal output.

5. The braking control device according to claim 3, further comprising:
   a relative forward distance input operatively coupled with the processor, the relative forward distance input selectively receiving from an associated distance sensor a forward relative distance signal comprising forward relative distance data representative of a forward relative distance between the towing vehicle of the combination vehicle and an associated vehicle traveling forward of the towing vehicle,
   wherein the control logic is executable by the processor to determine a relative speed between the towing vehicle of the combination vehicle and the associated vehicle traveling forward of the towing vehicle,
   wherein the control logic is executable by the processor to determine, in accordance with the forward relative distance and the relative speed, a deceleration operation value required to mitigate a chance of a collision between the towing vehicle of the combination vehicle and the associated vehicle traveling forward of the towing vehicle, wherein the control logic is executable by the processor to, responsive to receiving the forward relative distance signal and to determining the deceleration operation value:
- selectively determine the non-enhanced braking mode applying the first level of braking to the one or more towed vehicles in accordance with a first result of a comparison between the predetermined threshold deceleration rate value and the deceleration operation value; and
- selectively determine the enhanced braking mode applying the second level of braking to the one or more towed vehicles greater than the first level of braking in accordance with a second result of the comparison between the predetermined threshold deceleration rate value and the deceleration operation value.

6. The braking control device according to claim 3, further comprising:
- a brake control output operatively coupled with the processor and with an associated brake control actuator, the associated brake control actuator being configured to deliver brake pressure to the one or more towed vehicles in response to an electric actuator control signal delivered to the associated brake control actuator via the brake control output; and
- wherein the control logic is executable by the processor to implement the enhanced braking mode by controlling the electric actuator control signal to modify high pulse times of a modulated brake pressure applied by the towing vehicle to the one or more towed vehicles via the associated brake control actuator.

7. The braking control device according to claim 3, further comprising:
- a brake control output operatively coupled with the processor and with an associated brake control actuator, the associated brake control actuator being configured to deliver brake pressure to the one or more towed vehicles in response to an electric actuator control signal delivered to the associated brake control actuator via the brake control output; and
- wherein the control logic is executable by the processor to implement the enhanced braking mode by controlling the electric actuator control signal to modify low pulse times of a modulated brake pressure applied by the towing vehicle to the one or more towed vehicles via the associated brake control actuator.

8. The braking control device according to claim 3, further comprising:
- a brake control output operatively coupled with the processor and with an associated brake control actuator, the associated brake control actuator being configured to deliver brake pressure to the one or more towed vehicles in response to an actuator control signal delivered to the associated brake control actuator via the brake control output,
- wherein the control logic is executable by the processor to implement the enhanced braking mode by controlling the actuator control signal to increase values of one or more pulses of a modulated brake pressure applied by the towing vehicle to the one or more towed vehicles via the associated brake control actuator.

9. The braking control device according to claim 3, further comprising:
- a brake control output operatively coupled with the processor and with an associated brake control actuator, the associated brake control actuator being configured to deliver brake pressure to the one or more towed vehicles in response to an electric actuator control signal delivered to the associated brake control actuator via the brake control output,
- wherein the control logic is executable by the processor to implement the enhanced braking mode by controlling the electric actuator control signal to modify pulses of a modulated brake pressure applied by the towing vehicle to the one or more towed vehicles via the associated brake control actuator.

10. The braking control device according to claim 3, further comprising:
- a brake control output operatively coupled with the processor and with an associated brake control actuator, the associated brake control actuator being configured to deliver brake pressure to the one or more towed vehicles in response to a pneumatic actuator control signal delivered to the associated brake control actuator via the brake control output,
- wherein the control logic is executable by the processor to implement the enhanced braking mode by controlling the pneumatic actuator control signal to modify pulses of a modulated brake pressure applied by the towing vehicle to the one or more towed vehicles via the associated brake control actuator.

11. The braking control device according to claim 3, wherein the control logic stored in the non-transient memory device is executable by the processor to determine the braking mode of the one or more towed vehicles of the combination vehicle as the one of:
- the non-enhanced braking mode applying the first level of braking to the one or more towed vehicles in accordance with the deceleration command value being less than the predetermined threshold deceleration rate value, or
- the enhanced braking mode applying the second level of braking to the one or more towed vehicles greater than the first level of braking in accordance with the deceleration command value being greater than the predetermined threshold deceleration rate value.

12. The braking control device according to claim 3, further comprising:
- a brake signal output operatively coupled with the processor, the brake signal output selectively transmitting a one of the first or second brake control transmission signals from the braking control device;
- brake pedal timeout data stored in the non-transient memory device, the brake pedal timeout data being representative of a predetermined response time for a physical actuation of a brake pedal by an associated operator of the towing vehicle; and
- a brake pedal actuation input operatively coupled with the processor, the brake pedal actuation input selectively receiving from an associated brake pedal sensor a brake pedal actuation signal comprising brake pedal actuation data representative of the physical actuation of the brake pedal by the associated operator of the towing vehicle,
- wherein the control logic is executable by the processor to, responsive to determining the enhanced braking mode:
  - generate a brake warning signal comprising brake warning data representative of an imminent need for the combination vehicle to perform a deceleration maneuver in excess of the deceleration rate of the combination vehicle for operating the combination vehicle in the non-enhanced braking mode;

reset a pedal wait count time value stored in the non-transient memory device to a reset time value;

initiate a pedal timer incrementing the pedal wait count time value from the reset time value;

selectively transmit the first brake control transmission signal via the brake signal output responsive to the pedal wait count time value being less than the predetermined response time without receiving the brake pedal actuation signal; and selectively transmit the second brake control transmission signal in lieu of the first brake control transmission signal via the brake signal output responsive to the pedal wait count time value being greater than the predetermined response time.

13. The braking control device according to claim 12, further comprising:

a transmitter device operatively coupled with the processor, the transmitter device being configured to receive message data and to transmit the message data as a message signal comprising the message data, wherein the transmitter device selectively receives the brake warning data and transmits the brake warning data as a brake warning signal comprising the brake warning data to an associated receiver of an associated vehicle other than the towing and one or more towed vehicles.

14. The braking control device according to claim 3, further comprising:

a brake signal output operatively coupled with the processor, the brake signal output selectively transmitting a one of the first or second brake control transmission signals from the braking control device;

combination vehicle stability data stored in the non-transient memory device, the combination vehicle stability data being representative of a predetermined combination vehicle stability value reflecting a stable driving condition of the combination vehicle; and a set of one or more vehicle characteristic inputs operatively coupled with the processor, the set of one or more vehicle characteristic inputs selectively receiving a corresponding set of vehicle characteristic signals, each of the set of vehicle characteristic signals comprising vehicle characteristic data representative of a physical characteristic of the combination vehicle, wherein the control logic is executable by the processor to determine a dynamic stability value of the combination vehicle in accordance with the set of vehicle characteristic data, wherein the control logic is executable by the processor to:

selectively determine the non-enhanced braking mode applying the first level of braking to the one or more towed vehicles in accordance with a first result of a comparison between the predetermined combination vehicle stability value and the dynamic stability value, or selectively determine the enhanced braking mode applying the second level of braking to the one or more towed vehicles in accordance with a second result of the comparison between the predetermined combination vehicle stability value and the dynamic stability value, the second result of the comparison being different than the first result of the comparison.

15. The braking control device according to claim 14; wherein:

the set of one or more vehicle characteristic inputs comprises:

a wheel slip input for receiving from one or more associated wheel slip sensors a wheel slip signal comprising wheel slip data representative of wheel slippage of one or more wheels of the towing and/or the one or more towed vehicles; and the control logic is executable by the processor to determine the dynamic stability value of the combination vehicle in accordance with the wheel slip data.

16. The braking control device according to claim 14, wherein:

the set of one or more vehicle characteristic inputs comprises:

a combination vehicle yaw rate input for receiving from one or more associated yaw sensors a yaw rate signal comprising yaw rate data representative of a yaw rate of one or more of the towed and/or towing vehicles;

a steering angle input for receiving from one or more associated steering angle sensor a steering angle signal comprising steering angle data representative of a steering angle of a steerable wheel of the towing vehicle;

a lateral acceleration input for receiving from one or more associated acceleration sensors a lateral acceleration signal comprising lateral acceleration data representative of a lateral acceleration of the towed and/or towing vehicles; and/or a wheel speed input for receiving from one or more associated wheel speed sensors a wheel speed signal comprising wheel speed data representative of wheel speed of one or more wheels of the towing and/or the one or more towed vehicles; and the control logic is executable by the processor to determine a curvilinear travel path value representative of a curvilinear path traveled by the combination vehicle in accordance with one or more of the yaw rate data, the steering angle data, the lateral acceleration data, and/or the wheel speed data; and the control logic is executable by the processor to determine the dynamic stability value of the combination vehicle in accordance with the curvilinear travel path value.

17. The braking control device according to claim 14, wherein:

the non-transient memory device stores a set of desired dynamic stability values as a dynamic stability map representative of a mapping of the set of one or more vehicle characteristic inputs onto a plurality of instantaneous stability values representative of a corresponding plurality of instantaneous stability determinations of the combination vehicle relative to a range of operating conditions of the combination vehicle;

the set of one or more vehicle characteristic inputs comprises:

a load input for receiving from one or more associated load sensors a weight signal comprising weight data representative of a weight of a selected portion of the combination vehicle;

a towed and/or towing vehicle combination yaw rate input for receiving from one or more associated yaw sensors a yaw rate signal comprising yaw rate data representative of a yaw rate of one or more of the towed and/or towing vehicles;

a steering angle input for receiving from one or more associated steering angle sensors a steering angle signal comprising steering angle data representative of a steering angle of a steerable wheel of the towing vehicle;

a lateral acceleration input for receiving from one or more associated acceleration sensors a lateral acceleration signal comprising lateral acceleration data representative of a lateral acceleration of the towed and/or towing vehicles; and/or a wheel speed input for receiving from one or more associated wheel speed sensors a wheel speed signal comprising wheel speed data representative of wheel speed of one or more wheels of the towing and/or the one or more towed vehicles; and the control logic is executable by the processor to determine the dynamic stability value of the combination vehicle by:

applying the set of one or more vehicle characteristic inputs to the dynamic stability map; and assigning an output of the mapping to the dynamic stability value.

18. The braking control device according to claim 17, wherein:

the load input of the set of one or more vehicle characteristic inputs comprises:

a combination vehicle load input for receiving an overall combined weight signal comprising overall combined weight data representative of an overall combined weight of the combination vehicle.

19. The braking control device according to claim 17, wherein:

the load input of the set of one or more vehicle characteristic inputs comprises:

an allocated vehicle load input for receiving an allocated weight signal comprising weight data representative of a weight allocated to a selected portion of the combination vehicle.

20. The braking control device according to claim 3, further comprising:

a brake control output operatively coupled with the processor and with an associated brake control actuator, the associated brake control actuator being configured to deliver brake pressure to the one or more towed vehicles in response to an actuator control signal delivered to the associated brake control actuator via the brake control output, wherein the control logic is executable by the processor to implement the enhanced braking mode by controlling the actuator control signal to modify pulses of a modulated brake pressure applied by the towing vehicle to the one or more towed vehicles via the associated brake control actuator.

21. The braking control device according to claim 20, wherein:

the brake control output is configured to deliver the brake pressure to the one or more towed vehicles in response to a wireless actuator control signal delivered to the associated brake control actuator via the brake control output; and the control logic is executable by the processor to implement the enhanced braking mode by controlling the wireless actuator control signal to modify pulses of a modulated brake pressure applied by the towing vehicle to the one or more towed vehicles via the associated brake control actuator.

22. A braking control device for use in an associated towing vehicle towing one or more associated towed vehicles as a combination vehicle for providing brake control enhancement to the one or more towed vehicles relative to a level of braking applied to the towing vehicle, the braking control device comprising:

a processor;

a current deceleration input operatively coupled with the processor, the current deceleration input receiving a current deceleration signal comprising current deceleration data representative of a current deceleration value being executed by the combination vehicle;

a deceleration command input operatively coupled with the processor, the deceleration command input receiving a deceleration command signal comprising deceleration command data representative of a deceleration command value;

a non-transient memory device operatively coupled with the processor; and control logic stored in the non-transient memory device and executable by the processor to:

perform a comparison between the current deceleration value and the deceleration command value; and determine a braking mode of the one or more towed vehicles of the combination vehicle as a one of:

a non-enhanced braking mode applying a first level of braking to the one or more towed vehicles in a predetermined reduced proportion relative to the level of braking being applied to the towing vehicle in accordance with a first result of the comparison between the current deceleration value and the deceleration command value, or an enhanced braking mode applying a second level of braking to the one or more towed vehicles greater than the first level of braking in accordance with a second result of the comparison between the current deceleration value and the deceleration command value, the second result of the comparison being different than the first result of the comparison.

23. The braking control device according to claim 22, wherein the control logic stored in the non-transient memory device is executable by the processor to determine one or more platooning operational parameters of the combination vehicle in accordance with the determined braking mode of the one or more towed vehicles of the combination vehicle, wherein the control logic determines a platooning following distance to be maintained by the towing vehicle relative to an associated vehicle forward of the towing vehicle as a one or more of the platooning operational parameters in accordance with the determined braking mode by increasing the platooning following distance responsive to the non-enhanced braking mode being determined and by decreasing the platooning following distance responsive to the enhanced braking mode being determined, wherein the control logic determines a platooning travel speed limit to be maintained by the towing vehicle as a one or more of the platooning operational parameters in accordance with the determined braking mode by decreasing the platooning travel speed responsive to the non-enhanced braking mode being determined and by increasing the platooning travel speed responsive to the enhanced braking mode being determined, wherein the control logic determines a platooning participation gate of the towing vehicle as a one or more of the platooning operational parameters in accordance with the determined braking mode by not permitting the platooning participation responsive to the non-enhanced braking mode being determined and by permitting the platooning participation responsive to the enhanced braking mode being determined.

24. The braking control device according to claim 22, wherein the control logic is executable by the processor to, responsive to receiving the deceleration command signal:

selectively determine, based on the first result of the comparison between the current deceleration value and the deceleration command value, a first brake control transmission signal to effect the deceleration command value in accordance with the non-enhanced braking mode; and selectively determine, based on the second result of the comparison between the current deceleration value and the deceleration command value, a second brake control transmission signal to effect the deceleration command value in accordance with the enhanced braking mode.

25. The braking control device according to claim 24, further comprising:

a brake signal output operatively coupled with the processor, the brake signal output selectively transmitting a one of the first or second brake control transmission signals from the braking control device; and an anti-lock braking system (ABS) capability input operatively coupled with the processor, the ABS capability input selectively receiving an ABS functionality signal from the one or more towed vehicles of the combination vehicle, the ABS functionality signal comprising ABS functionality data representative of a functional ABS capability of the one or more towed vehicles of the combination vehicle, wherein the control logic is executable by the processor to, responsive to receiving the ABS functionality signal and to determining the enhanced braking mode:

selectively transmit the second brake control transmission signal via the brake signal output.

26. The braking control device according to claim 24, further comprising:

a brake control output operatively coupled with the processor and with an associated brake control actuator, the associated brake control actuator being configured to deliver brake pressure to the one or more towed vehicles in response to an actuator control signal delivered to the associated brake control actuator via the brake control output; and wherein the control logic is executable by the processor to implement the enhanced braking mode by controlling the actuator control signal to modify high pulse times of a modulated brake pressure applied by the towing vehicle to the one or more towed vehicles via the associated brake control actuator.

27. The braking control device according to claim 24, further comprising:

a brake control output operatively coupled with the processor and with an associated brake control actuator, the associated brake control actuator being configured to deliver brake pressure to the one or more towed vehicles in response to an actuator control signal delivered to the associated brake control actuator via the brake control output; and wherein the control logic is executable by the processor to implement the enhanced braking mode by controlling the actuator control signal to modify low pulse times of a modulated brake pressure applied by the towing vehicle to the one or more towed vehicles via the associated brake control actuator.

28. The braking control device according to claim 24, further comprising:

a brake control output operatively coupled with the processor and with an associated brake control actuator, the associated brake control actuator being configured to deliver brake pressure to the one or more towed vehicles in response to an actuator control signal delivered to the associated brake control actuator via the brake control output, wherein the control logic is executable by the processor to implement the enhanced braking mode by controlling the actuator control signal to modify values of one or more pulses of a modulated brake pressure applied by the towing vehicle to the one or more towed vehicles via the associated brake control actuator.

29. The braking control device according to claim 24, further comprising:

a brake control output operatively coupled with the processor and with an associated brake control actuator, the associated brake control actuator being configured to deliver brake pressure to the one or more towed vehicles in response to an electric actuator control signal delivered to the associated brake control actuator via the brake control output, wherein the control logic is executable by the processor to implement the enhanced braking mode by controlling the electric actuator control signal to modify pulses of a modulated brake pressure applied by the towing vehicle to the one or more towed vehicles via the associated brake control actuator.

30. The braking control device according to claim 24, further comprising:

a brake control output operatively coupled with the processor and with an associated brake control actuator, the associated brake control actuator being configured to deliver brake pressure to the one or more towed vehicles in response to a pneumatic actuator control signal delivered to the associated brake control actuator via the brake control output, wherein the control logic is executable by the processor to implement the enhanced braking mode by controlling the pneumatic actuator control signal to modify pulses of a modulated brake pressure applied by the towing vehicle to the one or more towed vehicles via the associated brake control actuator.

31. The braking control device according to claim 24, further comprising:

a deceleration sensor operatively coupled with the processor and with the current deceleration input, the deceleration sensor sensing a current physical deceleration of the combination vehicle and generating the current deceleration signal comprising the current deceleration data representative of a current physical deceleration value being executed by the combination vehicle, wherein the control logic stored in the non-transient memory device is executable by the processor to determine the braking mode of the one or more towed vehicles of the combination vehicle as the one of:

the non-enhanced braking mode applying the first level of braking to the one or more towed vehicles in accordance with the deceleration command value being less than the current physical deceleration value, or the enhanced braking mode applying the second level of braking to the one or more towed vehicles greater than the first level of braking in accordance with the current physical deceleration value being less than the deceleration command value.

32. The braking control device according to claim 24, further comprising:
a brake signal output operatively coupled with the processor, the brake signal output selectively transmitting a one of the first or second brake control transmission signals from the braking control device;
brake pedal timeout data stored in the non-transient memory device, the brake pedal timeout data being representative of a predetermined response time for a physical actuation of a brake pedal by an associated operator of the towing vehicle; and
a brake pedal actuation input operatively coupled with the processor, the brake pedal actuation input selectively receiving from an associated brake pedal sensor a brake pedal actuation signal comprising brake pedal actuation data representative of the physical actuation of the brake pedal by the associated operator of the towing vehicle,
wherein the control logic is executable by the processor to, responsive to determining the enhanced braking mode:
generate a brake warning signal comprising brake warning data representative of an imminent need for the combination vehicle to perform a deceleration maneuver in excess of the deceleration rate of the combination vehicle for operating the combination vehicle in the non-enhanced braking mode;
reset a pedal wait count time value stored in the non-transient memory device to a reset time value;
initiate a pedal timer incrementing the pedal wait count time value from the reset time value;
selectively transmit the first brake control transmission signal via the brake signal output responsive to the pedal wait count time value being less than the predetermined response time without receiving the brake pedal actuation signal; and
selectively transmit the second brake control transmission signal in lieu of the first brake control transmission signal via the brake signal output responsive to the pedal wait count time value being greater than the predetermined response time.

33. The braking control device according to claim 32, further comprising:
a transmitter device operatively coupled with the processor, the transmitter device being configured to receive message data and to transmit the message data as a message signal comprising the message data,
wherein the transmitter device selectively receives the brake warning data and transmits the brake warning data as a brake warning signal comprising the brake warning data to an associated receiver of an associated vehicle other than the towing and one or more towed vehicles.

34. The braking control device according to claim 24, further comprising:
a relative forward distance input operatively coupled with the processor, the relative forward distance input selectively receiving from an associated distance sensor a forward relative distance signal comprising forward relative distance data representative of a forward relative distance between the towing vehicle of the combination vehicle and an associated vehicle traveling forward of the towing vehicle,
wherein the control logic is executable by the processor to determine a relative speed between the towing vehicle of the combination vehicle and the associated vehicle traveling forward of the towing vehicle,
wherein the control logic is executable by the processor to determine, in accordance with the forward relative distance and the relative speed, a deceleration operation value required to mitigate a chance of a collision between the towing vehicle of the combination vehicle and the associated vehicle traveling forward of the towing vehicle,
wherein the control logic is executable by the processor to, responsive to receiving the forward relative distance signal and to determining the deceleration operation value:
selectively determine the non-enhanced braking mode applying the first level of braking to the one or more towed vehicles in accordance with a first result of a comparison between the current deceleration value and the deceleration operation value; and
selectively determine the enhanced braking mode applying the second level of braking to the one or more towed vehicles greater than the first level of braking in accordance with a second result of the comparison between the current deceleration value and the deceleration operation value.

35. The braking control device according to claim 34, further comprising:
a brake signal output operatively coupled with the processor, the brake signal output selectively transmitting a one of the first or second brake control transmission signals from the braking control device;
combination vehicle stability data stored in the non-transient memory device, the combination vehicle stability data being representative of a predetermined combination vehicle stability value reflecting a stable driving condition of the combination vehicle; and
a set of one or more vehicle characteristic inputs operatively coupled with the processor, the set of one or more vehicle characteristic inputs selectively receiving a corresponding set of vehicle characteristic signals, each of the set of vehicle characteristic signals comprising vehicle characteristic data representative of a physical characteristic of the combination vehicle,
wherein the control logic is executable by the processor to determine a dynamic stability value of the combination vehicle in accordance with the set of vehicle characteristic data,
wherein the control logic is executable by the processor to:
selectively determine the non-enhanced braking mode applying the first level of braking to the one or more towed vehicles in accordance with a first result of a comparison between the predetermined combination vehicle stability value and the dynamic stability value, or
selectively determine the enhanced braking mode applying the second level of braking to the one or more towed vehicles greater than the first level of braking in accordance with a second result of the comparison between the predetermined combination vehicle stability value and the dynamic stability value.

36. The braking control device according to claim 35, wherein:
the set of one or more vehicle characteristic inputs comprises:
a wheel slip input for receiving from one or more associated wheel slip sensors a wheel slip signal comprising wheel slip data representative of wheel slippage of one or more wheels of the towing and/or the one or more towed vehicles; and the control logic is executable by the processor to determine the dynamic stability value of the combination vehicle in accordance with the wheel slip data.

37. The braking control device according to claim 35, wherein:

the set of one or more vehicle characteristic inputs comprises:

a combination vehicle yaw rate input for receiving from one or more associated yaw sensors a yaw rate signal comprising yaw rate data representative of a yaw rate of one or more of the towed and/or towing vehicles;

a steering angle input for receiving from an associated steering angle sensor a steering angle signal comprising steering angle data representative of a steering angle of a steerable wheel of the towing vehicle;

a lateral acceleration input for receiving from one or more associated acceleration sensors a lateral acceleration signal comprising lateral acceleration data representative of a lateral acceleration of the towed and/or towing vehicles; and/or a wheel speed input for receiving from one or more associated wheel speed sensors a wheel speed signal comprising wheel speed data representative of wheel speed of one or more wheels of the towing and/or the one or more towed vehicles; and the control logic is executable by the processor to determine a curvilinear travel path value representative of a curvilinear path traveled by the combination vehicle in accordance with one or more of the yaw rate data, the steering angle data, the lateral acceleration data, and/or the wheel speed data; and the control logic is executable by the processor to determine the dynamic stability value of the combination vehicle in accordance with the curvilinear travel path value.

38. The braking control device according to claim 35, wherein:

the non-transient memory device stores a set of desired dynamic stability values as a dynamic stability map representative of a mapping of the set of one or more vehicle characteristic inputs onto a plurality of instantaneous stability values representative of a corresponding plurality of instantaneous stability determinations of the combination vehicle relative to a range of operating conditions of the combination vehicle;

the set of one or more vehicle characteristic inputs comprises:

a load input for receiving from one or more load sensors a weight signal comprising weight data representative of a weight of a selected portion of the combination vehicle;

a towed and/or towing vehicle combination yaw rate input for receiving from one or more associated yaw sensors a yaw rate signal comprising yaw rate data representative of a yaw rate of one or more of the towed and/or towing vehicles;

a steering angle input for receiving from an associated steering angle sensor a steering angle signal comprising steering angle data representative of a steering angle of a steerable wheel of the towing vehicle;

a lateral acceleration input for receiving from one or more associated acceleration sensors a lateral acceleration signal comprising lateral acceleration data representative of a lateral acceleration of the towed and/or towing vehicles; and/or a wheel speed input for receiving from one or more associated wheel speed sensors a wheel speed signal comprising wheel speed data representative of wheel speed of one or more wheels of the towing and/or the one or more towed vehicles; and the control logic is executable by the processor to determine the dynamic stability value of the combination vehicle by:

applying the set of one or more vehicle characteristic inputs to the dynamic stability map; and assigning an output of the mapping to the dynamic stability value.

39. The braking control device according to claim 38, wherein:

the load input of the set of one or more vehicle characteristic inputs comprises:

a combination vehicle load input for receiving from the one or more associated load sensors an overall combined weight signal comprising overall combined weight data representative of an overall combined weight of the combination vehicle.

40. The braking control device according to claim 38, wherein:

the load input of the set of one or more vehicle characteristic inputs comprises:

an allocated vehicle load input for receiving an allocated weight signal comprising weight data representative of a weight allocated to a selected portion of the combination vehicle.

41. The braking control device according to claim 24, further comprising:

a brake control output operatively coupled with the processor and with an associated brake control actuator, the associated brake control actuator being configured to deliver brake pressure to the one or more towed vehicles in response to an actuator control signal delivered to the associated brake control actuator via the brake control output, wherein the control logic is executable by the processor to implement the enhanced braking mode by controlling the actuator control signal to modify pulses of a modulated brake pressure applied by the towing vehicle to the one or more towed vehicles via the associated brake control actuator.

42. The braking control device according to claim 41, wherein:

the brake control output is configured to deliver the brake pressure to the one or more towed vehicles in response to a wireless actuator control signal delivered to the associated brake control actuator via the brake control output; and the control logic is executable by the processor to implement the enhanced braking mode by controlling the wireless actuator control signal to modify pulses of a modulated brake pressure applied by the towing vehicle to the one or more towed vehicles via the associated brake control actuator.

43. A braking control device for use in an associated towing vehicle towing one or more associated towed vehicles as a combination vehicle for providing brake control enhancement to the one or more towed vehicles relative to a level of braking applied to the towing vehicle, the braking control device comprising:

processor means;

deceleration command input means operatively coupled with the processor means, the deceleration command input means receiving a deceleration command signal comprising deceleration command data representative of a deceleration command value;

memory means operatively coupled with the processor means, the memory means storing braking deceleration threshold data representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle; and control logic means stored in the memory means, the control logic means being executable by the processor means to:
  perform a comparison between the predetermined threshold deceleration rate value and the deceleration command value;
  determine a braking mode of the one or more towed vehicles of the combination vehicle as a one of:
    the non-enhanced braking mode in accordance with a first result of the comparison between the predetermined threshold deceleration rate value and the deceleration command value, or
    an enhanced braking mode applying a second level of braking to the one or more towed vehicles greater than the first level of braking in accordance with a second result of the comparison between the predetermined threshold deceleration rate value and the deceleration command value, the second result of the comparison being different than the first result of the comparison;
  selectively generate, based on the first result of the comparison between the predetermined threshold deceleration rate value and the deceleration command value, a first brake control transmission signal to effect the deceleration command value in accordance with the non-enhanced braking mode; and
  selectively generate, based on the second result of the comparison between the predetermined threshold deceleration rate value and the deceleration command value, a second brake control transmission signal to effect the deceleration command value in accordance with the enhanced braking mode.

44. The braking control device according to claim 43, further comprising:
  brake signal output means operatively coupled with the processor means, the brake signal output means selectively transmitting a one of the first or second brake control transmission signals;
  combination vehicle stability data stored in the memory means, the combination vehicle stability data being representative of a predetermined combination vehicle stability value reflecting a stable driving condition of the combination vehicle; and
  a set of one or more vehicle characteristic input means operatively coupled with the processor means, the set of one or more vehicle characteristic input means selectively receiving a corresponding set of vehicle characteristic signals, each of the set of vehicle characteristic signals comprising vehicle characteristic data representative of a physical characteristic of the combination vehicle,
  wherein the control logic means is operable to determine a dynamic stability value of the combination vehicle in accordance with the set of vehicle characteristic data,
  wherein the control logic means is operable to:
    selectively determine the non-enhanced braking mode in accordance with a first result of a comparison between the predetermined combination vehicle stability value and the dynamic stability value; and
    selectively determine the enhanced braking mode in accordance with a second result of the comparison between the predetermined combination vehicle stability value and the dynamic stability value.

45. The braking control device according to claim 43, wherein the control logic means stored in the memory means is executable by the processor means to determine the braking mode of the one or more towed vehicles of the combination vehicle as the one of:
  the non-enhanced braking mode in accordance with the deceleration command value being less than the predetermined threshold deceleration rate value, or
  the enhanced braking mode in accordance with the deceleration command value being greater than the predetermined threshold deceleration rate value.

46. A braking control method for use in an associated towing vehicle towing one or more associated towed vehicles as a combination vehicle for providing brake control enhancement to the one or more towed vehicles relative to a level of braking applied to the towing vehicle, the braking control method comprising:
  receiving at a deceleration command input operatively coupled with a processor, a deceleration command signal comprising deceleration command data representative of a deceleration command value;
  storing in a non-transient memory device operatively coupled with the processor braking deceleration threshold data representative of a predetermined threshold deceleration rate value related to a predetermined threshold deceleration rate of the combination vehicle for operating the combination vehicle in a non-enhanced braking mode applying a first level of braking to the one or more towed vehicles in a predetermined reduced proportion relative to the level of braking being applied to the towing vehicle; and
  performing by control logic stored in the non-transient memory device and executable by the processor a comparison between the predetermined threshold deceleration rate value and the deceleration command value;
  determining by the control logic stored in the non-transient memory device and executable by the processor a braking mode of the one or more towed vehicles of the combination vehicle as a one of:
    the non-enhanced braking mode applying the first level of braking to the one or more towed vehicles in accordance with a first result of the comparison between the predetermined threshold deceleration rate value and the deceleration command value, or
    an enhanced braking mode applying a second level of braking to the one or more towed vehicles greater than the first level of braking in accordance with a second result of the comparison between the predetermined threshold deceleration rate value and the deceleration command value, the second result of the comparison being different than the first result of the comparison;
  selectively generating by the control logic stored in the non-transient memory device and executable by the processor based on the first result of the comparison between the predetermined threshold deceleration rate value and the deceleration command value, a first brake control transmission signal to effect the deceleration command value in accordance with the non-enhanced braking mode; and selectively generating by the control logic stored in the non-transient memory device and executable by the processor based on the second result of the comparison between the predetermined threshold deceleration rate value and the deceleration command value, a second brake control transmission signal to effect the deceleration command value in accordance with the enhanced braking mode.

47. The braking control method according to claim 46, further comprising:

selectively transmitting by the control logic stored in the non-transient memory device and executable by the processor a one of the first or second brake control transmission signals;

storing combination vehicle stability data stored in the memory means, the combination vehicle stability data being representative of a predetermined combination vehicle stability value reflecting a stable driving condition of the combination vehicle; and selectively receiving by a set of one or more vehicle characteristic input means operatively coupled with the control logic stored in the non-transient memory device a corresponding set of vehicle characteristic signals, each of the set of vehicle characteristic signals comprising vehicle characteristic data representative of a physical characteristic of the combination vehicle, wherein the control logic executable by the processor is operable to determine a dynamic stability value of the combination vehicle in accordance with the set of vehicle characteristic data, wherein the control logic executable by the processor is operable to:

selectively determine the non-enhanced braking mode in accordance with a first result of a comparison between the predetermined combination vehicle stability value and the dynamic stability value; and selectively determine the enhanced braking mode in accordance with a second result of the comparison between the predetermined combination vehicle stability value and the dynamic stability value.

48. The braking control method according to claim 46, further comprising executing the control logic stored in the memory to determine the braking mode of the one or more towed vehicles of the combination vehicle as the one of:

the non-enhanced braking mode in accordance with the deceleration command value being less than the predetermined threshold deceleration rate value, or the enhanced braking mode in accordance with the deceleration command value being greater than the predetermined threshold deceleration rate value.

49. A braking control device for use in an associated towing vehicle towing one or more associated towed vehicles as a combination vehicle for providing brake control enhancement to the one or more towed vehicles relative to a level of braking applied to the towing vehicle, the braking control device comprising:

processor means;

current deceleration input means operatively coupled with the processor means, the current deceleration input means receiving a current deceleration signal comprising current deceleration data representative of a current deceleration value being executed by the combination vehicle;

deceleration command input means operatively coupled with the processor means, the deceleration command input means receiving a deceleration command signal comprising deceleration command data representative of a deceleration command value;

memory means operatively coupled with the processor means; and control logic means stored in the memory means and executable by the processor means to:

perform a comparison between the current deceleration value and the deceleration command value;

determine a braking mode of the one or more towed vehicles of the combination vehicle as a one of:

a non-enhanced braking mode applying a first level of braking to the one or more towed vehicles in a predetermined reduced proportion relative to the level of braking being applied to the towing vehicle in accordance with a first result of the comparison between the current deceleration value and the deceleration command value, or an enhanced braking mode applying a second level of braking to the one or more towed vehicles greater than the first level of braking in accordance with a second result of the comparison between the current deceleration value and the deceleration command value, the second result of the comparison being different than the first result of the comparison;

selectively determine, based on the first result of the comparison between the current deceleration value and the deceleration command value, a first brake control transmission signal to effect the deceleration command value in accordance with the non-enhanced braking mode; and selectively determine, based on the second result of the comparison between the current deceleration value and the deceleration command value, a second brake control transmission signal to effect the deceleration command value in accordance with the enhanced braking mode.

50. The braking control device according to claim 49, further comprising:

brake signal output means operatively coupled with the processor means, the brake signal output means selectively transmitting a one of the first or second brake control transmission signals;

combination vehicle stability data stored in the memory means, the combination vehicle stability data being representative of a predetermined combination vehicle stability value reflecting a stable driving condition of the combination vehicle; and a set of one or more vehicle characteristic input means operatively coupled with the processor means, the set of one or more vehicle characteristic input means selectively receiving a corresponding set of vehicle characteristic signals, each of the set of vehicle characteristic signals comprising vehicle characteristic data representative of a physical characteristic of the combination vehicle, wherein the control logic means is operable to determine a dynamic stability value of the combination vehicle in accordance with the set of vehicle characteristic data, wherein the control logic means is operable to:

selectively determine the non-enhanced braking mode in accordance with a first result of a comparison between the predetermined combination vehicle stability value and the dynamic stability value; and selectively determine the enhanced braking mode in accordance with a second result of the comparison between the predetermined combination vehicle stability value and the dynamic stability value.

51. The braking control device according to claim 49, further comprising:

deceleration sensor means operatively coupled with the processor means and with the current deceleration input means, the deceleration sensor means sensing a physical deceleration of the combination vehicle and generating the current deceleration signal comprising the current deceleration data representative of a current physical deceleration value being executed by the combination vehicle, wherein the control logic means stored in the memory means is executable by the processor means to determine the braking mode of the one or more towed vehicles of the combination vehicle as the one of:

the non-enhanced braking mode in accordance with the deceleration command value being less than the current physical deceleration value, or the enhanced braking mode in accordance with the current physical deceleration value being less than the deceleration command value.

52. A braking control method for use in an associated towing vehicle towing one or more associated towed vehicles as a combination vehicle for providing brake control enhancement to the one or more towed vehicles relative to a level of braking applied to the towing vehicle, the braking control method comprising:

receiving at a current deceleration input operatively coupled with a processor a current deceleration signal comprising current deceleration data representative of a current deceleration value being executed by the combination vehicle;

receiving at a deceleration command input operatively coupled with the processor a deceleration command signal comprising deceleration command data representative of a deceleration command value;

storing control logic in a non-transient memory device operatively coupled with the processor;

performing by the processor executing the control logic stored in the non-transient memory device a comparison between the current deceleration value and the deceleration command value;

determining by the processor executing the control logic stored in the non-transient memory device a braking mode of the one or more towed vehicles of the combination vehicle as a one of:

a non-enhanced braking mode applying a first level of braking to the one or more towed vehicles in a predetermined reduced proportion relative to the level of braking being applied to the towing vehicle in accordance with a first result of the comparison between the current deceleration value and the deceleration command value, or an enhanced braking mode applying a second level of braking to the one or more towed vehicles greater than the first level of braking in accordance with a second result of the comparison between the current deceleration value and the deceleration command value, the second result of the comparison being different than the first result of the comparison;

selectively determining by the control logic based on the first result of the comparison between the current deceleration value and the deceleration command value a first brake control transmission signal to effect the deceleration command value in accordance with the non-enhanced braking mode; and selectively determining by the control logic based on the second result of the comparison between the current deceleration value and the deceleration command value a second brake control transmission signal to effect the deceleration command value in accordance with the enhanced braking mode.

53. The braking control method according to claim 52, further comprising:

selectively transmitting by a brake signal output operatively coupled with the processor a one of the first or second brake control transmission signals;

storing combination vehicle stability data in the non-transient memory device, the combination vehicle stability data being representative of a predetermined combination vehicle stability value reflecting a stable driving condition of the combination vehicle;

selectively receiving by a set of one or more vehicle characteristic inputs operatively coupled with the processor a corresponding set of vehicle characteristic signals, each of the set of vehicle characteristic signals comprising vehicle characteristic data representative of a physical characteristic of the combination vehicle, determining by the control logic a dynamic stability value of the combination vehicle in accordance with the set of vehicle characteristic data;

selectively determining by the control logic the non-enhanced braking mode in accordance with a first result of a comparison between the predetermined combination vehicle stability value and the dynamic stability value; and selectively determining by the control logic the enhanced braking mode in accordance with a second result of the comparison between the predetermined combination vehicle stability value and the dynamic stability value.

54. The braking control method according to claim 52, further comprising:

sensing, by a deceleration sensor operatively coupled with the processor and with the current deceleration input, a current physical deceleration of the combination vehicle;

generating by the deceleration sensor the current deceleration signal comprising the current deceleration data representative of a current physical deceleration value being executed by the combination vehicle; and determining by the control logic stored in the non-transient memory device and executing by the processor the braking mode of the one or more towed vehicles of the combination vehicle as the one of:

the non-enhanced braking mode in accordance with the deceleration command value being less than the current physical deceleration value, or the enhanced braking mode in accordance with the current physical deceleration value being less than the deceleration command value.

* * * * *